US009306761B2

(12) United States Patent
Morton et al.

(10) Patent No.: US 9,306,761 B2
(45) Date of Patent: Apr. 5, 2016

(54) VIDEO STREAMING SYSTEM AND METHOD

(71) Applicant: Gazoo, Inc., Bryan, TX (US)

(72) Inventors: Joseph Scott Morton, College Station, TX (US); Christopher Michael McDonald, Bryan, TX (US); Glenn Donald Knepp, College Station, TX (US)

(73) Assignee: GAZOO, INC., Bryan, TX (US)

( * ) Notice: Subject to any disclaimer, the term of this patent is extended or adjusted under 35 U.S.C. 154(b) by 0 days.

(21) Appl. No.: 14/642,732

(22) Filed: Mar. 9, 2015

(65) Prior Publication Data

US 2015/0256580 A1    Sep. 10, 2015

Related U.S. Application Data

(63) Continuation-in-part of application No. 14/642,639, filed on Mar. 9, 2015, now Pat. No. 9,197,697, and a continuation-in-part of application No. 14/642,718, filed on Mar. 9, 2015, now Pat. No. 9,195,429.

(60) Provisional application No. 61/950,289, filed on Mar. 10, 2014.

(51) Int. Cl.
*G06F 15/16* (2006.01)
*H04L 12/28* (2006.01)
(Continued)

(52) U.S. Cl.
CPC ............... *H04L 12/28* (2013.01); *H04L 29/06* (2013.01); *H04L 65/602* (2013.01); *H04N 7/00* (2013.01)

(58) Field of Classification Search
USPC .................. 709/217–219, 203, 223–229, 250
See application file for complete search history.

(56) References Cited

U.S. PATENT DOCUMENTS 8,200,796 B1     6/2012   Margulis
2006/0013390 A1  1/2006   Herz et al.
(Continued)

FOREIGN PATENT DOCUMENTS

CN          1220346 C      9/2005

OTHER PUBLICATIONS

Armstrong, "Amazon AppStream—Let the Cloud Do the Heavy Lifting", i Programmer, Publication [online]. Nov. 14, 2013 [retrieved May 19, 2015], Retrieved from the internet<URL: http://www.i-programmerinfoinews/141-cloud-computing/6604-amazon-appstream.html>; pp. 1-3.
(Continued)

*Primary Examiner* — Zarni Maung
(74) *Attorney, Agent, or Firm* — Kevin M. Klughart; David W. Carstens; Carstens & Cahoon, LLP

(57) ABSTRACT

A system and method implementing simultaneous video streaming to multiple end-user mobile user devices (MUD) is disclosed. The system/method utilizes an Ethernet/SATA bridge (ESB) to permit a host computer system (HCS) the ability to load video media content (VMC) on a local storage media (LSM) via a SATA multiplexer (MUX) using a hardware MAC-to-LBA transmission decoder (LTD). The HCS is configured to load a hardware service queue register (SQR) with end-user IP target address and VMC addressing information. A streaming FIFO controller (SFC) scans the SQR and retrieves data from the LSM via the SATA MUX and packetizes the IP target address and VMC data with an hardware Ethernet transport encoder (ETE) to transfer the VMC data stream directly from the LSM to the end-user MUD without HCS TCP/IP protocol intervention.

10 Claims, 48 Drawing Sheets

(51) Int. Cl.
   *H04L 29/06*     (2006.01)
   *H04N 7/00*      (2011.01)
   *G06F 12/00*     (2006.01)

(56) References Cited

U.S. PATENT DOCUMENTS

| | | |
|---|---|---|
| 2008/0056671 A1 | 3/2008  | Kamijo et al. |
| 2008/0263361 A1 | 10/2008 | Dutta et al. |
| 2010/0313226 A1 | 12/2010 | Cholas et al. |
| 2011/0093822 A1 | 4/2011  | Sherwani |
| 2011/0208837 A1 | 8/2011  | Sartori |
| 2011/0296179 A1 | 12/2011 | Templin et al. |
| 2011/0314356 A1 | 12/2011 | Grube et al. |
| 2012/0076197 A1 | 3/2012  | Byford et al. |
| 2012/0149476 A1 | 6/2012  | Perlman et al. |
| 2012/0254450 A1 | 10/2012 | Lejeune et al. |
| 2013/0013828 A1 | 1/2013  | Pang et al. |
| 2013/0239134 A1 | 9/2013  | Lajoie et al. |
| 2013/0268775 A1 | 10/2013 | Hawkins |
| 2013/0279877 A1 | 10/2013 | Boak |
| 2013/0291006 A1 | 10/2013 | Tam |
| 2013/0311768 A1 | 11/2013 | Fosmark et al. |
| 2014/0052770 A1 | 2/2014  | Gran et al. |
| 2014/0245339 A1 | 8/2014  | Zhang et al. |
| 2014/0372754 A1 | 12/2014 | Aissi et al. |

OTHER PUBLICATIONS

The International Search Report and the Written Opinion of the International Searching Authority for International Application No. PCT/US2015/019752.

FIG. 3  *Prior Art*

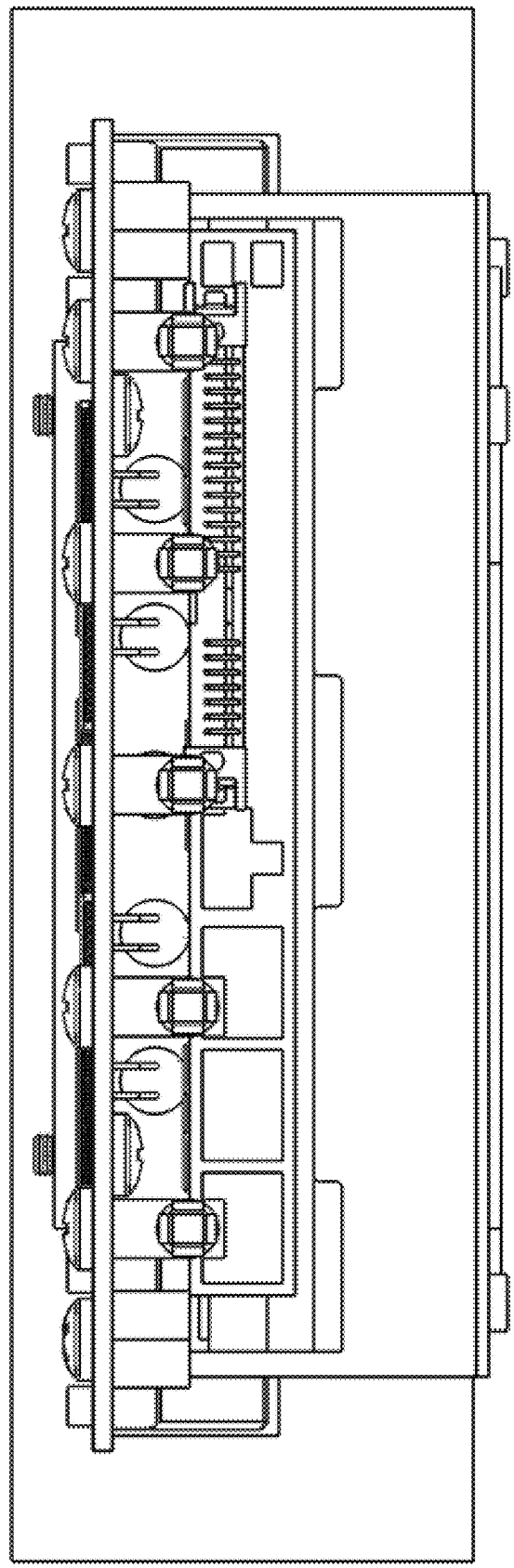
FIG. 36
3600

VIDEO STREAMING SYSTEM AND METHOD

CROSS REFERENCE TO RELATED APPLICATIONS

U.S. Provisional Patent Applications

This application claims benefit under 35 U.S.C. §119 and incorporates by reference U.S. Provisional patent application for CLOUD COMPUTING SYSTEM AND METHOD by inventors Joseph Scott Morton, Christopher Michael McDonald, and Glenn Donald Knepp, filed electronically with the USPTO on Mar. 10, 2014, with Ser. No. 61/950,289, EFS ID 18414620, confirmation number 2283.

U.S. Utility Patent Applications

This application claims benefit under 35 U.S.C. §120 and incorporates by reference United States Utility patent application for CLOUD COMPUTING SYSTEM AND METHOD by inventors Joseph Scott Morton, Christopher Michael McDonald, and Glenn Donald Knepp, filed electronically with the USPTO on Mar. 9, 2015, with Ser. No. 14/642,639, EFS ID 21718675, confirmation number 1436.

This application claims benefit under 35 U.S.C. §120 and incorporates by reference United States Utility patent application for MULTI-USER DISPLAY SYSTEM AND METHOD by inventors Joseph Scott Morton, Christopher Michael McDonald, and Glenn Donald Knepp, filed electronically with the USPTO on Mar. 9, 2015, with Ser. No. 14/642,718, EFS ID 21719217, confirmation number 1333.

PARTIAL WAIVER OF COPYRIGHT

All of the material in this patent application is subject to copyright protection under the copyright laws of the United States and of other countries. As of the first effective filing date of the present application, this material is protected as unpublished material.

However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

STATEMENT REGARDING FEDERALLY SPONSORED RESEARCH OR DEVELOPMENT

Not Applicable

REFERENCE TO A MICROFICHE APPENDIX

Not Applicable

FIELD OF THE INVENTION

The present invention generally relates to video streaming systems and methods for efficiently transmitting video media content (VMC) to a plurality of mobile user devices (MUD) operated by a corresponding plurality of end-users. More specifically and without limitation the present invention permits video content to be efficiently streamed to independent MUD displays over the Internet using custom hardware designed to eliminate operating system processing overhead associated with the transport of VMC data to the MUD.

PRIOR ART AND BACKGROUND OF THE INVENTION

Prior Art

Generally speaking, the state of the art in video media content (VMC) streaming involves the use of network connected computing servers that provide for TCP/IP connections to remote user devices (MUD) such as cellphones, tablet computers, laptops, etc. to display compressed VMC using web browsers or special-purpose software applications. These systems utilize standard computer hardware such as CPUs, memory, and disk drives to provide a computing platform receptive to remote TCP/IP requests for web browser data and associated video content. As such, the systems typically deployed to support large numbers of end-users require a multi-user operating system such as MICROSOFT® WINDOWS® or LINUX® in conjunction with standard disk drive storage interfaces and Ethernet network communication interfaces.

Application software and device drivers within the operating system are generally responsible for generating the software protocols necessary to support communication with the end-user MUD displays and support the display of VMC to a user interface. These components are entirely software in nature and have associated latencies that increase substantially with the number of end-users that must be supported by a given system. Scaling these systems requires replication of system motherboards and associated software for each "blade" of the server rack that supports the total number of end-users that are anticipated to be simultaneously connected to the video streaming system.

It is this replication of hardware and software that creates significant problems in the scalability of the overall video streaming system for large numbers of end-users. Server "blade CPU" cards tend to be both expensive and power hungry, resulting in a significant cost to support large numbers of end-users. Since the processing power of a given CPU is finite, the number of simultaneous end-users that can be supported with a given CPU blade is quite limited and constrained by available memory in the CPU blade, its processing power, and the speed of the memory and I/O busses that are associated with transferring data from a mass storage device (that is often accessed via a network connection) to an Ethernet interface for transmission to the remote end-user. Both the software and hardware overhead associated with data I/O from the data source (disk drive) to the remote end-user (via Ethernet interface and over TCP/IP protocol) are significant and represent a bottleneck within the CPU and its associated I/O and memory busses. As such, current video streaming blades are more processing and CPU resource limited than I/O bandwidth limited.

For example, a typical configuration in which a CPU blade communicates to a NAS storage device using gigabit Ethernet may only provide for 50-100 MB/s raw transfer rates for a locally attached disk drive (or far less than this for network attached storage (NAS)), which may support only 10-20 simultaneous end-users even with a gigabit Ethernet interface. Much of this bottleneck is in operating system overhead associated with the file system access and translation of the data to a form that can be properly interpreted by the remote end-user application. The generic nature of the hardware and software used by these video streaming systems introduces a significant performance penalty because none of the data paths are optimized for performing the video streaming function.

Deficiencies in the Prior Art

The prior art as detailed above suffers from the following deficiencies:
- Prior art video streaming systems and methods typically utilize conventional CPU blade servers and networking interfaces that are relatively expensive to deploy and scale.
- Prior art video streaming systems and methods typically utilize conventional CPU blade servers and networking interfaces that require significant power to operate and are thus expensive to support and operate.
- Prior art video streaming systems and methods typically are CPU bandwidth limited and do not fully utilize communication bandwidth associated with data storage.
- Prior art video streaming systems and methods typically are CPU bandwidth limited and do not fully utilize communication bandwidth associated with Ethernet communication interfaces.
- Prior art video streaming systems and methods typically cannot guarantee minimum throughput to end-users in highly scaled deployments.
- Prior art video streaming systems and methods typically must rely on separate data storage accessed via network connections that often have poor or unpredictable data access latencies.
- Prior art video streaming systems and methods typically incur significant software overhead in packetizing data for TCP/IP protocol communication to remote end-user MUD displays.
- Prior art video streaming systems and methods typically do not localize video content within a given server blade to improve throughput to remote end-user MUD displays.

While some of the prior art may teach some solutions to several of these problems, the core deficiencies in the prior art systems have not been addressed.

OBJECTIVES OF THE INVENTION

Accordingly, the objectives of the present invention are (among others) to circumvent the deficiencies in the prior art and affect the following objectives:

(1) Provide for a video streaming system and method that streamlines data transfer from VMC data storage to the Ethernet using hardware acceleration techniques.
(2) Provide for a video streaming system and method that increases the number of simultaneous users that can be supported by a video blade server.
(3) Provide for a video streaming system and method that reduces the power requirement for video streaming by eliminating the need for separate blade server processors for each video streaming blade device.
(4) Provide for a video streaming system and method that eliminates the software overhead associated with managing TCP/IP links to the remote end-user MUD.
(5) Provide for a video streaming system and method that bifurcates video content storage/definition and video content deployment/delivery.
(6) Provide for a video streaming system and method that permits localization of video content on specific video blades to improve overall throughput of that localized content to the end-user MUD.
(7) Provide for a video streaming system and method that takes advantage of storage caches present in modern disk drives.
(8) Provide for a video streaming system and method that leverages the high data transfer rates of SATA disk drives.
(9) Provide for a video streaming system and method that improves the utilization of gigabit-class Ethernet communication links.
(10) Provide for a video streaming system and method that improves data transfer rates between storage media containing the VMC data and the Ethernet communication interface tasked with transferring the VMC data to the end-user MUD.

While these objectives should not be understood to limit the teachings of the present invention, in general these objectives are achieved in part or in whole by the disclosed invention that is discussed in the following sections. One skilled in the art will no doubt be able to select aspects of the present invention as disclosed to affect any combination of the objectives described above.

BRIEF SUMMARY OF THE INVENTION

The present invention supports video streaming of video media content (VMC) to a plurality of end-users on mobile user devices (MUD) from a host computer system (HCS) over a computer communication network (CCN). The present invention bifurcates the distribution of streaming video into two phases. The first phase utilizes an Ethernet/SATA bridge (ESB) to directly write a local storage media (LSM) with the VMC data without the use of traditional TCP/IP or NAS storage protocols. The second phase involves writing hardware registers in a service queue register (SQR) with information on where the VMC stored on the LSM should be distributed. The SQR data is then sequenced by a streaming FIFO controller (SFC) that inspects information in the SQR and directly accesses this information from the LSM via a SATA multiplexer and bursts this information along with target IP information into a hardware Ethernet transport encoder (ETE) responsible for generating a proper Ethernet frame that is transferred via an Ethernet PHY to the CCN and the MUD for display to the end-user.

Traditional TCP/IP overhead normally handled by the HCS is processed in hardware by the SFC to ensure that the transmission delays in the ETE are minimized. Additionally, a direct hardware pipeline between the LSM and the ETE ensures that VMC data sourcing latencies are eliminated by removing potential NAS sourcing delays traditionally associated with video streaming systems. Deployment of video streaming blade servers using this technology is disclosed that permit the use of gigabit Ethernet backplanes to support large numbers of end-user MUD devices for video-on-demand, live video streaming media, and time-shifted viewing of VMC data as is typically required in cable TV and distributed gaming environments.

BRIEF DESCRIPTION OF THE DRAWINGS

For a fuller understanding of the advantages provided by the invention, reference should be made to the following detailed description together with the accompanying drawings wherein:

FIG. 36 illustrates a rear bottom view of an exemplary present invention VSC blade;

DESCRIPTION OF THE PRESENTLY PREFERRED EXEMPLARY EMBODIMENTS

Figure 1:
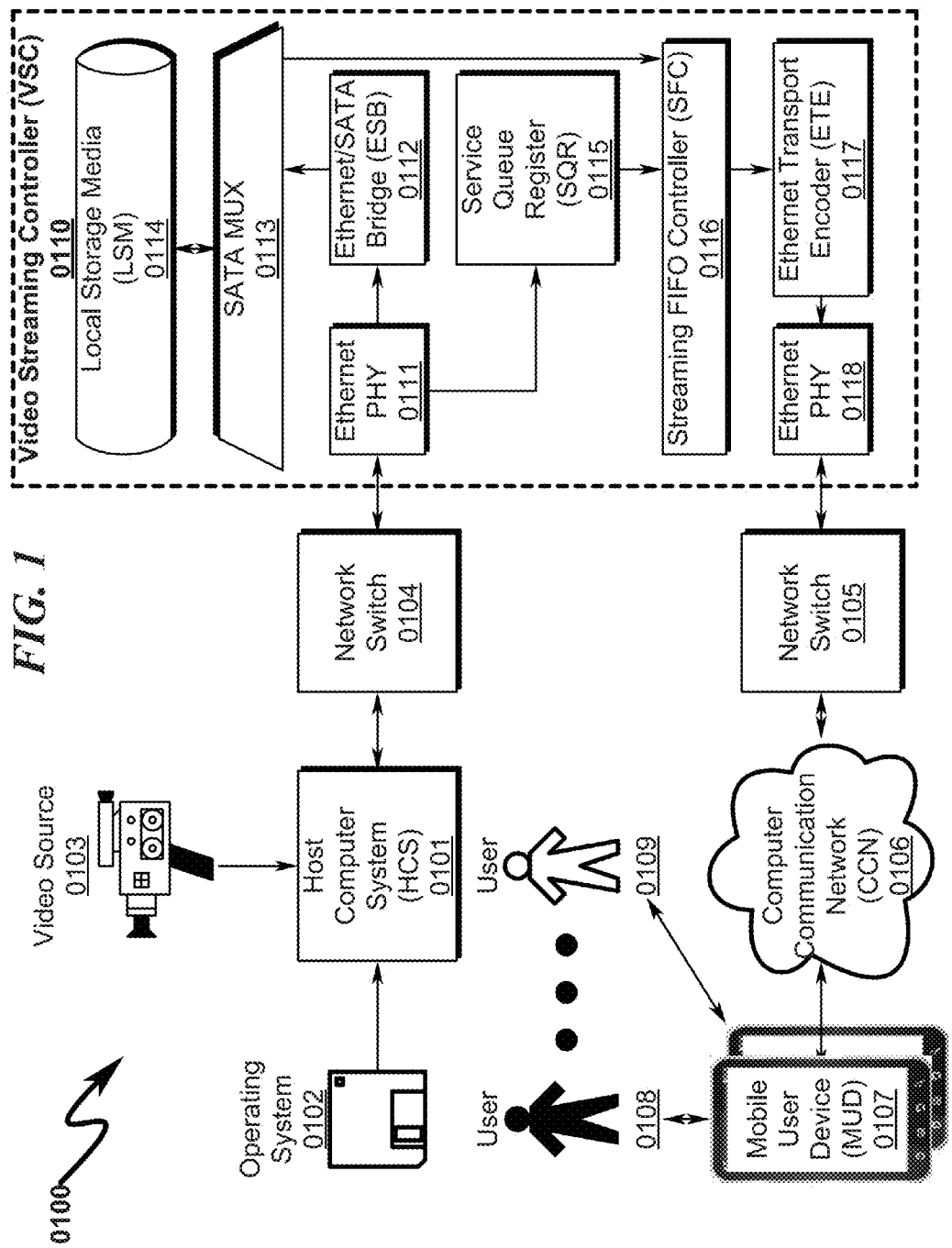
FIG. 1 illustrates a block diagram depicting a presently preferred exemplary embodiment of the present invention system.
Figure 2:
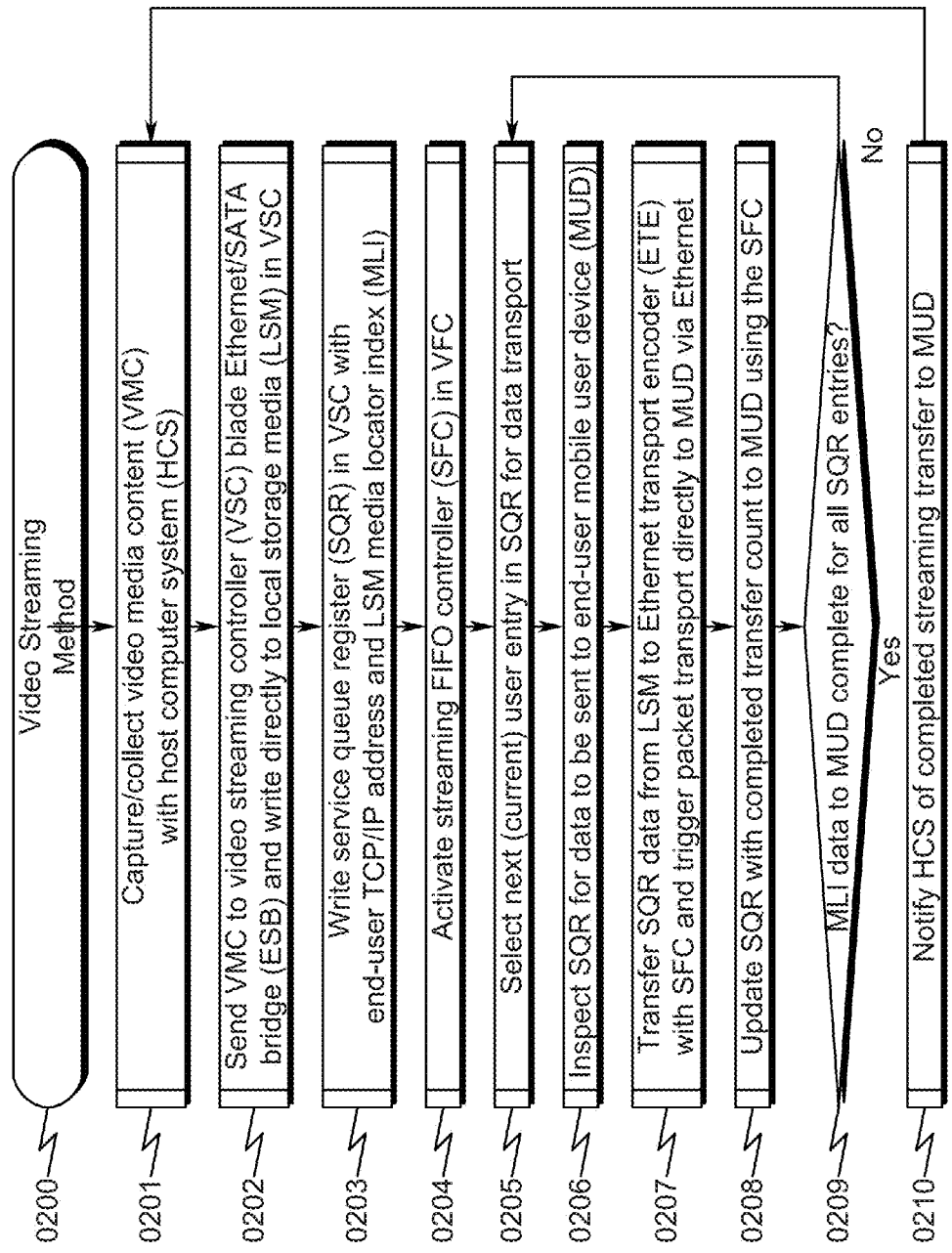
FIG. 2 illustrates a flowchart depicting a presently preferred exemplary embodiment of the present invention method.

While this invention is susceptible of embodiment in many different forms, there is shown in the drawings and will herein be described in detailed preferred embodiments of the invention with the understanding that the present disclosure is to be considered as an exemplification of the principles of the invention and is not intended to limit the broad aspect of the invention to the embodiment illustrated.

The numerous innovative teachings of the present application will be described with particular reference to the presently preferred embodiment, wherein these innovative teachings are advantageously applied to the particular problems of a VIDEO STREAMING SYSTEM AND METHOD. However, it should be understood that this embodiment is only one example of the many advantageous uses of the innovative teachings herein. In general, statements made in the specification of the present application do not necessarily limit any of the various claimed inventions. Moreover, some statements may apply to some inventive features but not to others.

Remote Video Stream not Limitive

The present invention anticipates that a wide variety of remote video streaming formats (VSF) may be used to implement the video streaming component of the present invention. Without limitation, the RVS may include audio and/or video formats including but not limited to: MPEG; MPEG-2; MPEG-4; H.264; THEORA; WEBM; DIRAC; REALVIDEO; VP8; and HEVC.

Host Computer System HCS not Limitive

The present invention anticipates that a wide variety of host computer system and host operating system software (HOS) may be used to implement the present invention. Without limitation, the HOS may include MICROSOFT® WINDOWS®; MAC®; and LINUX® operating system products.

SATA Drive Caching

The present invention in many preferred embodiments makes use of LSM devices incorporating SATA disk drive interfaces. Most modern SATA drives incorporate on-board cache memory to improve data access latencies and support write-ahead and read-behind functionality. However, traditional video streaming systems cannot fully take advantage of this on-board cache memory because protocol overheads associated with NAS access and Ethernet connectivity to/from the NAS system result in delays and latencies that are very large compared to that experienced by the disk drive itself. This requires the HCS servers that interface to NAS storage in traditional video streaming systems to incorporate large amounts of on-board cache memory, as the transfer latencies to NAS storage are unpredictable and subject to wide variations based on the overall network traffic.

The present invention eliminates these communication latencies and allows the SATA drive to operate at full bus speeds to communicate with the SFC and ETE, thus allowing the on-board cache within the LSM SATA drive to operate as intended as an aid to overall system throughput. It should be noted that this on-board LSM SATA cache memory allows the system as described to operate without the need for a memory cache to support video streaming to a large number of users as the high SATA bus speed for practical purposes eliminates latency in VMC reads from the LSM. Additionally, clustering of end-users on a video streaming blade (VSB) that are associated with the same VMC content accelerates the usefulness of the SATA on-board cache, as it is more probable that the end-users will all be accessing common portions of the same VMC dataset as compared to traditional video streaming systems that are not able to cluster end-user content requests within a single VSB.

System Overview (0100)

An overview of the present invention system is generally depicted in FIG. 1 (0100) wherein a typical host computer system (0101) executing machine instructions from a computer readable medium (0102) collects video information from a video source (0103). This data collection may be in the form of real-time video images and/or computer display screen data associated with host application software (HAS) operating on the HCS (0101) or another computing system (not shown). The goal of the present invention is to access this video stream (whether real-time or contained in stored media accessible by the HCS (0101)) and distribute it through a first network switch (0104) to a video streaming controller (VSC) (0110) through a second network switch (0105) and connected computer communication network (CCN) (0106) to one or more mobile user device(s) (0107) for display to one or more end-users (0108, 0109).

A key differentiator in this system architecture is the manner in which the VSC (0110) operates to stream the data to the MUD (0107) for display to the end-user (0108). The VSC (0110) provides for bifurcation of loading/streaming of media content by providing independent portals to the network switches (0104, 0105) so that media content may be independently stored by the HCS (0101) and streamed by the VSC (0110) without network contention along the various switches (0104, 0105). Furthermore, the VSC (0110) does not use conventional TCP/IP protocols to communicate to the HCS (0101) but rather incorporates a customized Ethernet PHY (0111) and hardware Ethernet-to-SATA bridge controller (0112) that permit direct Ethernet access via a SATA MUX (0113) to local storage media (LSM) (SATA hard drive, SATA solid state drive, etc.) (0114) that is tasked with locally storing the video media content from the video source (0103).

The VSC (0110) incorporates custom service queue register (SRQ) (0115) hardware that is directly written by Ethernet commands from the HCS (0101) connected Ethernet PHY (0111). This hardware register contains entries for each MUD (0107)/end-user (0108) serviced by content stored on the LSM (0114) and permits a custom streaming FIFO controller (SFC) (0116) to directly access media content from the LSM (0114) using data stored in the SFC (0116) registers without the overhead of an operating system or other HCS (0101) intervention. The SFC (0116) is designed to sequence through the SRQ (0115) and independently coordinate the transport of media content from the LSM (0114) to a number of MUD (0107) devices servicing the end users (0108).

The SFC (0116) directly couples with a custom hardware Ethernet transport encoder (ETE) (0117) that packetizes the streaming data targeting the MUD (0107)/end-user (0108) pairs and streams this information via a secondary Ethernet PHY (0118) to a secondary network switch (0105). This hardware-based content generation by the SFC (0116) coupled with hardware-based transport encoding (0117) permits the VSC (0110) to avoid the overhead and transport latencies normally associated with systems incorporating a transport system utilizing conventional computing hardware operating under control of conventional operating system software.

Method Overview (0200)

The present invention method operates in conjunction with the above described custom hardware configuration and may be described in general as comprising the following steps:

(1) Capturing and/or collecting video media content (VMC) with host computer system (HCS). This VMC may include live streaming video content as well as pre-recorded video content and may incorporate a variety of compressed VSF such as MPEG, etc. (0201);

(2) Sending the VMC to a custom video streaming controller (VSC) blade Ethernet/SATA bridge (ESB) and writing this data directly to a local storage media (LSM) in the VSC using a SATA MUX (0202);

(3) Writing a hardware service queue register (SQR) in the VSC with an end-user TCP/IP address and LSM media locator index (MLI) that describes the VMC content stored on the LSM by the HCS (0203);

(4) Activating a hardware streaming FIFO controller (SFC) in the VFC that is responsible for transferring data via the second port of the SATA MUX from the LSM to an Ethernet transport encoder (ETE) (0204);

(5) Selecting the next (or current) user entry in SQR for data transport by the SFC (0205);

(6) With the SFC, inspect the SQR registers for data to be sent to an end-user mobile user device (MUD) via the ETE (0206);

(7) With the SFC, directly transferring data pointed to by SQR data from the LSM to the ETE and triggering an assembled Ethernet packet directly to the MUD via a secondary Ethernet PHY interface (0207);

(8) With the SFC, updating the SQR with a data transfer count of completed data transfer to the MUD (0208);

(9) Determining if MLI data to MUD is complete for all SQR entries, and if not, proceeding to step (5) (0209); and

(10) Notifying the HCS of completed streaming transfer to the MUD and proceeding to step (1). This notification may simply include indicating an active video replay offset in the SQR that is at or beyond the length of the VMC file stored in the LSM (0210).

This general method summary may be augmented by the various elements described herein to produce a wide variety of invention embodiments consistent with this overall design description.

The interaction between the SFC, SQR, LSM, and ETE is important in this context because the VMC stored in the LSM is not stored using a traditional operating system on-disk file structure (ODS), but is rather directly written by the HCS using direct logical block addressing (LBA) format. This permits hardware identification of the VMC by a media locator index (MLI) that is identical to a logical block address (LBA) on the LSM. This mapping permits access to the LSM by the SFC to occur in hardware with a SATA hardware protocol utilized to access the LSM via the SATA MUX. Streaming of data from the ETE occurs under control of the SFC by merging IP address information from the SQR and VMC data from the LSM in real-time so that there is negligible delay in generating the Ethernet packet to be transported to the remote MUD.

It is this hardware acceleration by the SFC that permits multiple VMC requests from multiple users to be serviced by the LMC without any HCS intervention and with only the HCS software intervention involving setup of the SQR hardware registers and initial transfer of the VMC to the LSM. Note that this localization of the VMC in a small form factor blade media server is highly efficient as VMC that is transported to a number of simultaneous end-user MUDs may be sourced locally from the blade server without incurring any delays associated with IP protocols or network traffic to/from the media sourcing the VMC data. The use of direct LBA addressing to the LSM drastically improves the data throughput even without the use of software caching or other operating system techniques to improve system throughput. Note that in this configuration the on-board hardware cache present in most SATA disk drives allows the LSM to service a large number of end-users requesting the same VMC but at different temporal delivery points without the need for a complex software hierarchy of software caches and associated CPU hardware.

Data Flow Comparison (0300)-(0400)

Figure 3:
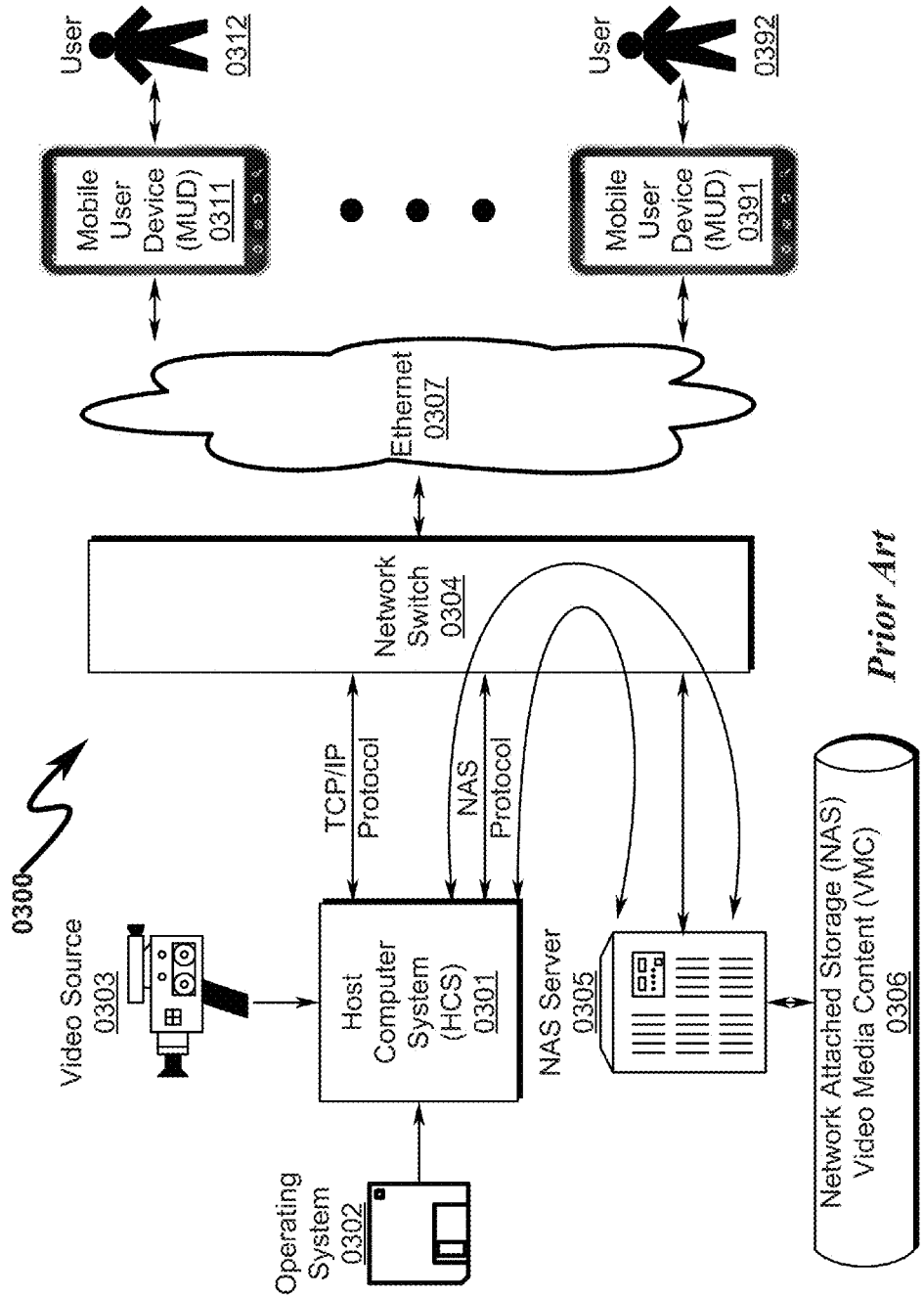
FIG. 3 illustrates a system block diagram of a prior art video streaming system.
Figure 4:
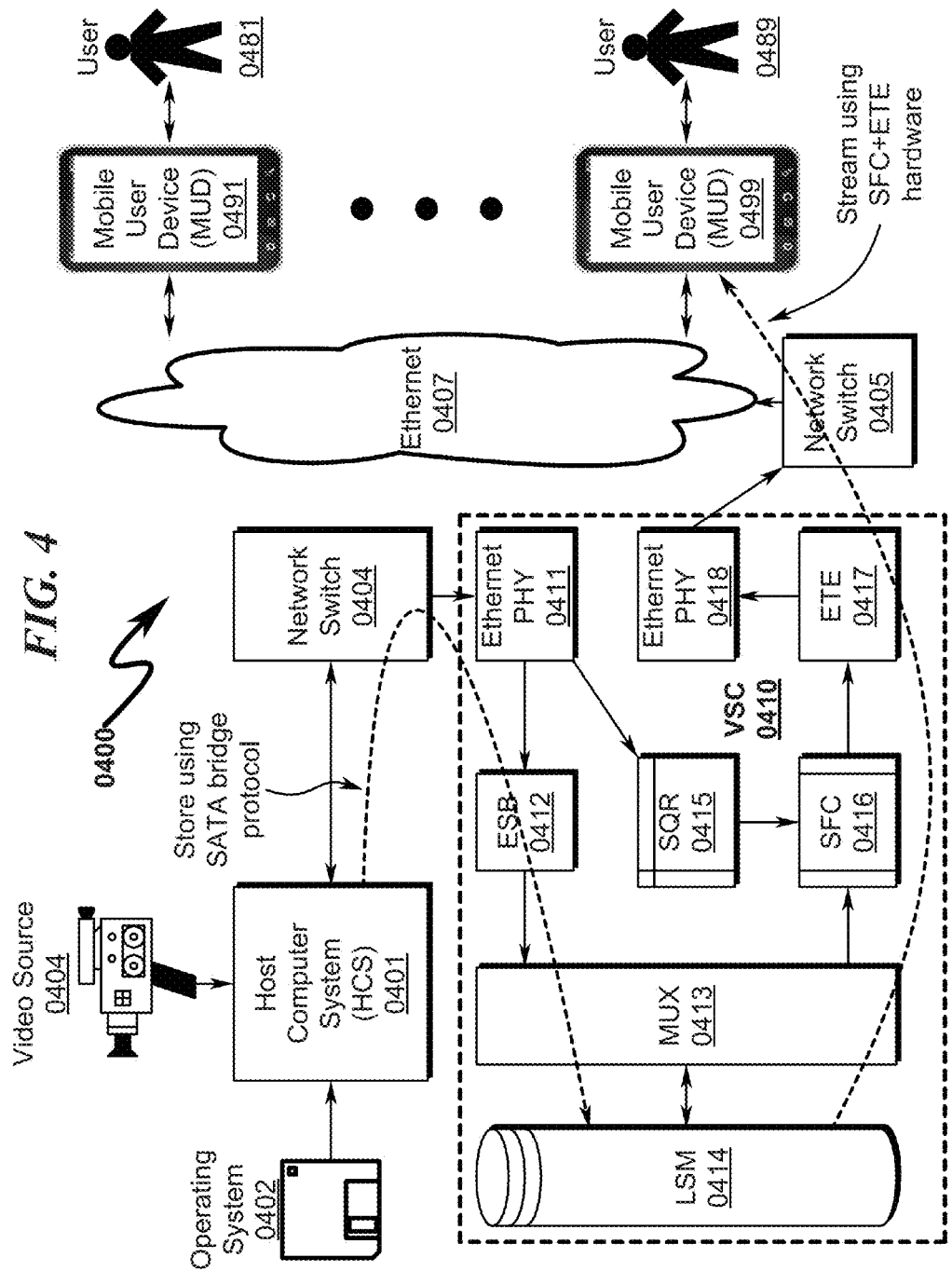
FIG. 4 illustrates a system block diagram comparing the present invention system to that of the prior art art video streaming system.

A comparison of data flows between prior art video streaming systems and that of the present invention can be seen by inspecting FIG. 3 (0300) that depicts the prior art and FIG. 4 (0400) which depicts the present invention.

Referencing FIG. 3 (0300), the host computer system (HCS) (0301) under operating system (0302) control retrieves video media content (VMC) (0303) and must communicate this via a network switch (0304) to a NAS server (0305) for archival on a network attached storage (NAS) unit (0306). This data transfer requires communication using TCP/IP or other high overhead file system protocols that are supported by the operating system (0302) and results in significant write time delays to the NAS storage (0306). However, the most significant bottleneck in this architecture is the retrieval of this information from the NAS storage (0306) as it must again use TCP/IP or other high overhead file system protocols that are supported by the operating system (0302) to retrieve the VMC from the NAS (0306) and then packetize (under TCP/IP) and retransmit the VMC data through the network switch (0304) to the Ethernet (0307) and on to a number of MUD displays (0311, 0391) for presentation to their associated end-users (0312, 0392).

In contrast to FIG. 3 (0300) and referencing FIG. 4 (0400), the present invention initiates data transfers from the HCS (0401) under control of the operating system (0402) that are sourced from the VMC source (0403) to a separate network switch (0404) to the VSC (0410) and not the MUD (0491, 0499) end-users (0481, 0489). This VMC data is stored via a separate Ethernet PHY (0411) using an efficient Ethernet SATA bridge (ESB) (0412) protocol. A MUX (0413) permits direct connection to the SATA drive (LSM) (0414). SATA drives typically operate at bus speeds of 3 Gbps-12 Gbps (or 300 MB/s-1200 MB/s) and are thus much more responsive than any network switch. The primary Ethernet PHY (0411) is also configured to permit the SQR (0415) to be directly written with information regarding VMC to be streamed to the remote MUD (0491, 0499) end-users (0481, 0489). An independent hardware SFC module (0416) continuously inspects the SQR (0415) for VMC to be streamed to the remote MUD (0491, 0499) end-users (0481, 0489) and with custom hardware retrieves the VMC from the LSM (0414) at bus speeds through the MUX (0413) and transfers this in a correct protocol format to the ETE (0417) that assembles the required TCP/IP packet and transmits it via the secondary Ethernet PHY (0418) to a second network switch (0405) and through the Ethernet (0407) to the remote MUD (0491, 0499) end-users (0481, 0489).

The present invention as presented in FIG. 4 (0400) eliminates the NAS storage protocol overhead in FIG. 3 (0300) and also provides for hardware implemented TCP/IP protocol packet generation by the SFC (0416) and ETE (0417) thus eliminating this as an element of HCS (0401) software overhead. Furthermore, the communication link between the LSM (0414) and the ETE (0417) may occur at full SATA bus speeds (>300 MB/s) with no bus contention from other sources, thus improving overall throughput between the VMC source data (0414) and the second network switch (0405). The use of a second network switch in this instance also permits improved throughput as VMC content writes to the LSM (0414) may occur independently of VMC streaming to the remote MUD (0491, 0499) end-users (0481, 0489).

Ethernet Protocol Packet Format (0500)

Figure 5:
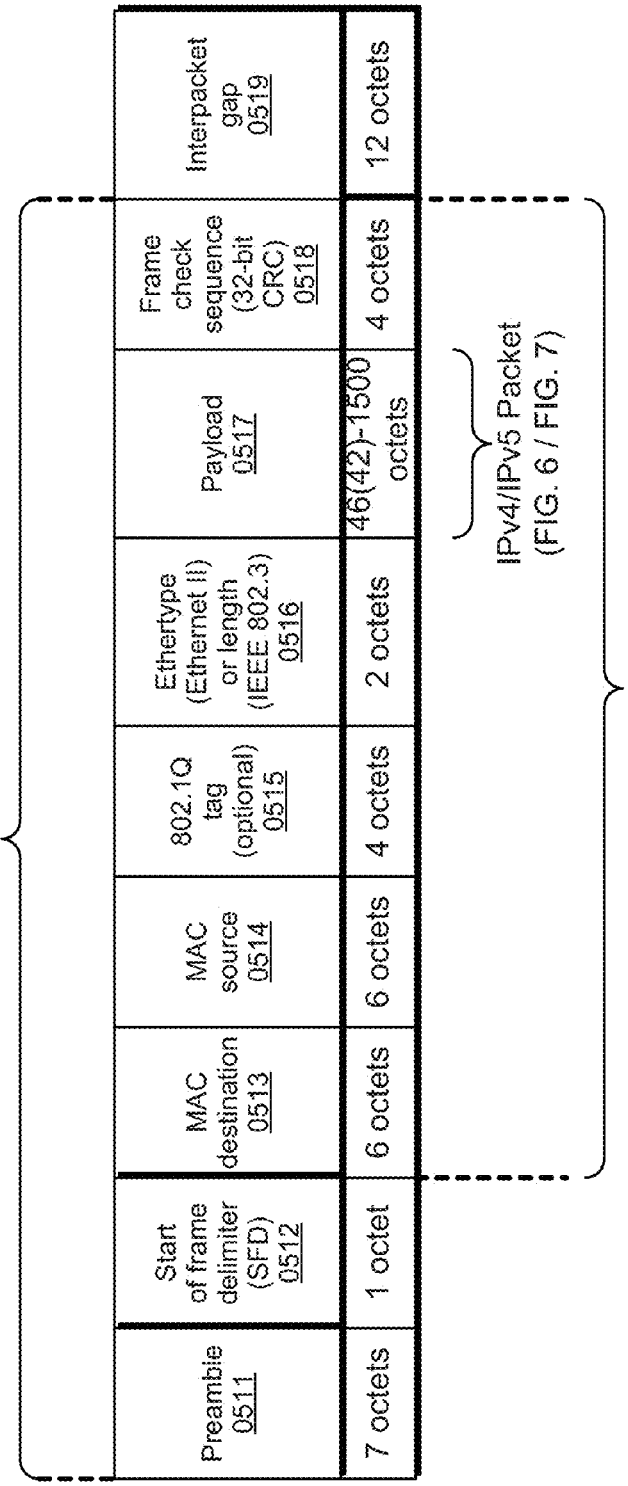
FIG. 5 illustrates an exemplary Ethernet packet frame supporting an Internet Protocol payload.

An exemplary Ethernet protocol packet structure is depicted in FIG. 5 (0500) and described in detail below. This information serves as the basis for construction of the Ethernet/SATA bridge (ESB) hardware and service queue register (SQR) hardware that is described later in this document. The presentation of this prior art information will provide a contrast to the systems and methodologies employed by the present invention to improve the overall performance of video streaming to a plurality of end-user mobile user devices.

Preamble and Start Frame Delimiter (0501)-(0502)

A data packet on the wire and the frame as its payload consist of binary data. Data on Ethernet is transmitted with most-significant octet (byte) first. However, within each octet the least-significant bit is transmitted first, except for the frame check sequence (FCS).

The table depicted in FIG. 5 (0500) shows the complete Ethernet frame, as transmitted, for the payload size up to the maximum transmission unit (MTU) of 1500 octets. Some implementations of Gigabit Ethernet (and higher speed Ethernets) support larger frames, known as jumbo frames.

The internal structure of an Ethernet frame is specified in IEEE 802.3-2012. An Ethernet frame starts following a 7-octet preamble (0511) and 1-octet start frame delimiter (SFD) (0512), both of which are part of the Ethernet packet enveloping the frame. Prior to Fast Ethernet, the on-the-wire bit pattern for this portion of the frame is 10101010 10101010 10101010 10101010 10101010 10101010 10101010 10101011. Since octets are transmitted least-significant bit first, the corresponding hexadecimal representation is 0x55 0x55 0x55 0x55 0x55 0x55 0x55 0xD5.

The SFD (0512) is an 8-bit (1-byte) value marking the end of the preamble (0511), which is the first field of an Ethernet packet, and indicating the beginning of the Ethernet frame. The SFD (0512) is immediately followed by the destination MAC address (0513), which is the first field in an Ethernet frame. SFD (0512) has the value of 171 (10101011 in binary notation), which is transmitted with least-significant bit first as 213 (0xD5).

The preamble (0511) of an Ethernet packet consists of a 56-bit (7-byte) pattern of alternating 1 and 0 bits, which allows devices on the network to easily detect a new incoming frame. The SFD (0512) is designed to break this pattern and signal the start of the actual frame.

Physical layer transceiver circuitry (PHY for short) is required to connect the Ethernet MAC to the physical medium. The connection between a PHY and MAC is independent of the physical medium and uses a bus from the media independent interface family (MII, GMII, RGMII, SGMII, XGMII).

Fast Ethernet transceiver chips utilize the MII bus, which is a 4-bit (one nibble) wide bus, therefore the preamble is represented as 14 instances of 0x5, and the start frame delimiter is 0x5 0xD (as nibbles). Gigabit Ethernet transceiver chips use the GMII bus, which is an 8-bit wide interface, thus the sequence would be 0x55 0x55 0x55 0x55 0x55 0x55 0x55 0xD5 (as bytes).

Header (0503)-(0516)

The header features destination MAC (0513) and source MAC (0514) addresses (each six octets in length), the optional IEEE 802.1Q tag (0515), and the EtherType field (0516).

The IEEE 802.1Q tag (0515), if present, is a four-octet field that indicates Virtual LAN (VLAN) membership and IEEE 802.1p priority.

The EtherType field (0516) is two octets long and it can be used for two different purposes. Values of 1500 and below mean that it is used to indicate the size of the payload in octets, while values of 1536 and above indicate that it is used as an EtherType, to indicate which protocol is encapsulated in the payload of the frame. When used as EtherType, the length of the frame is determined by the location of the interpacket gap and valid frame check sequence (FCS).

Payload (0517)

The minimum payload (0517) is 42 octets when an 802.1Q tag (0515) is present and 46 octets when absent. The maximum payload is 1500 octets. Non-standard jumbo frames allow for larger maximum payload size.

Figure 10:
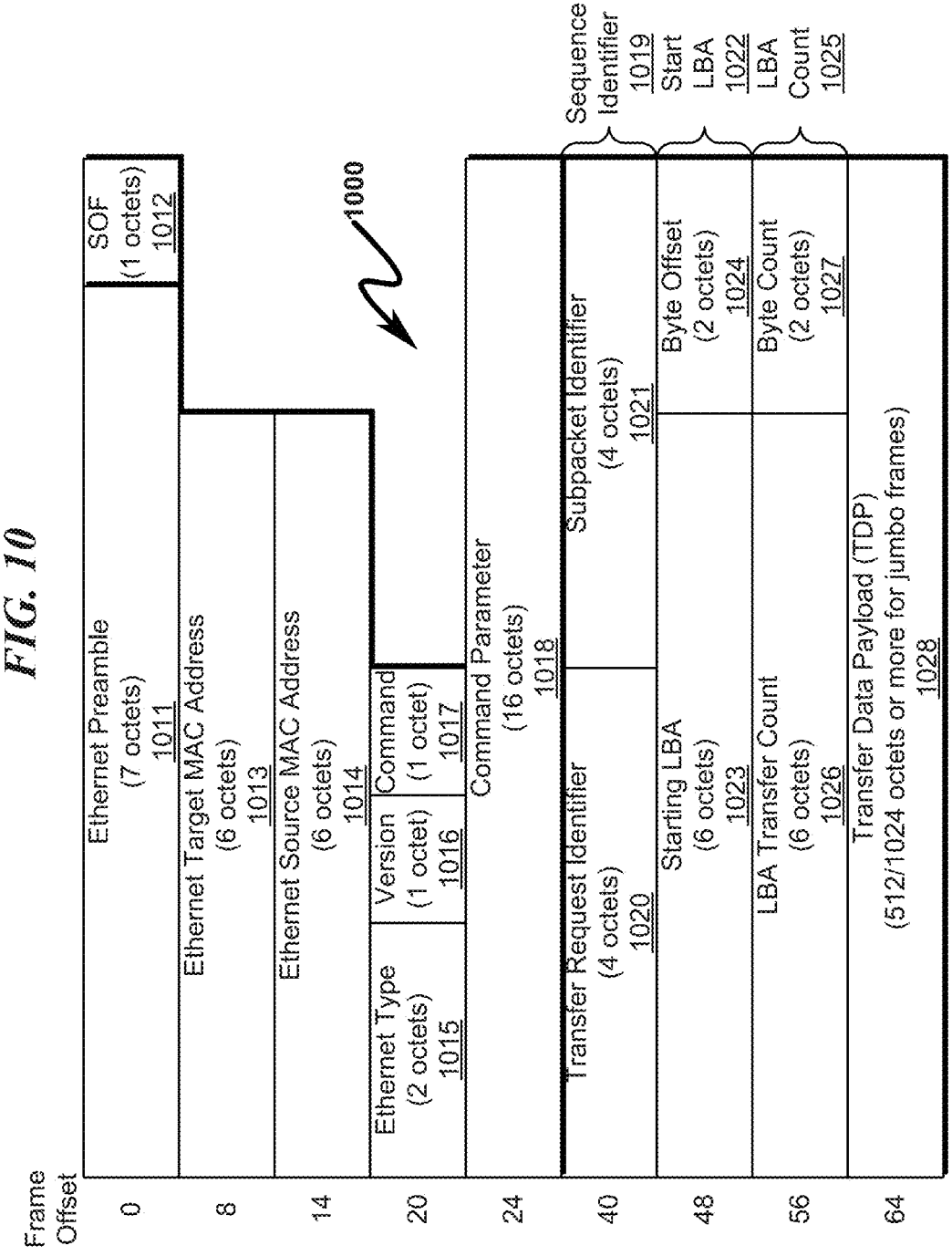
FIG. 10 illustrates an exemplary Ethernet/SATA bridge (ESB) frame packet format.
Figure 11:
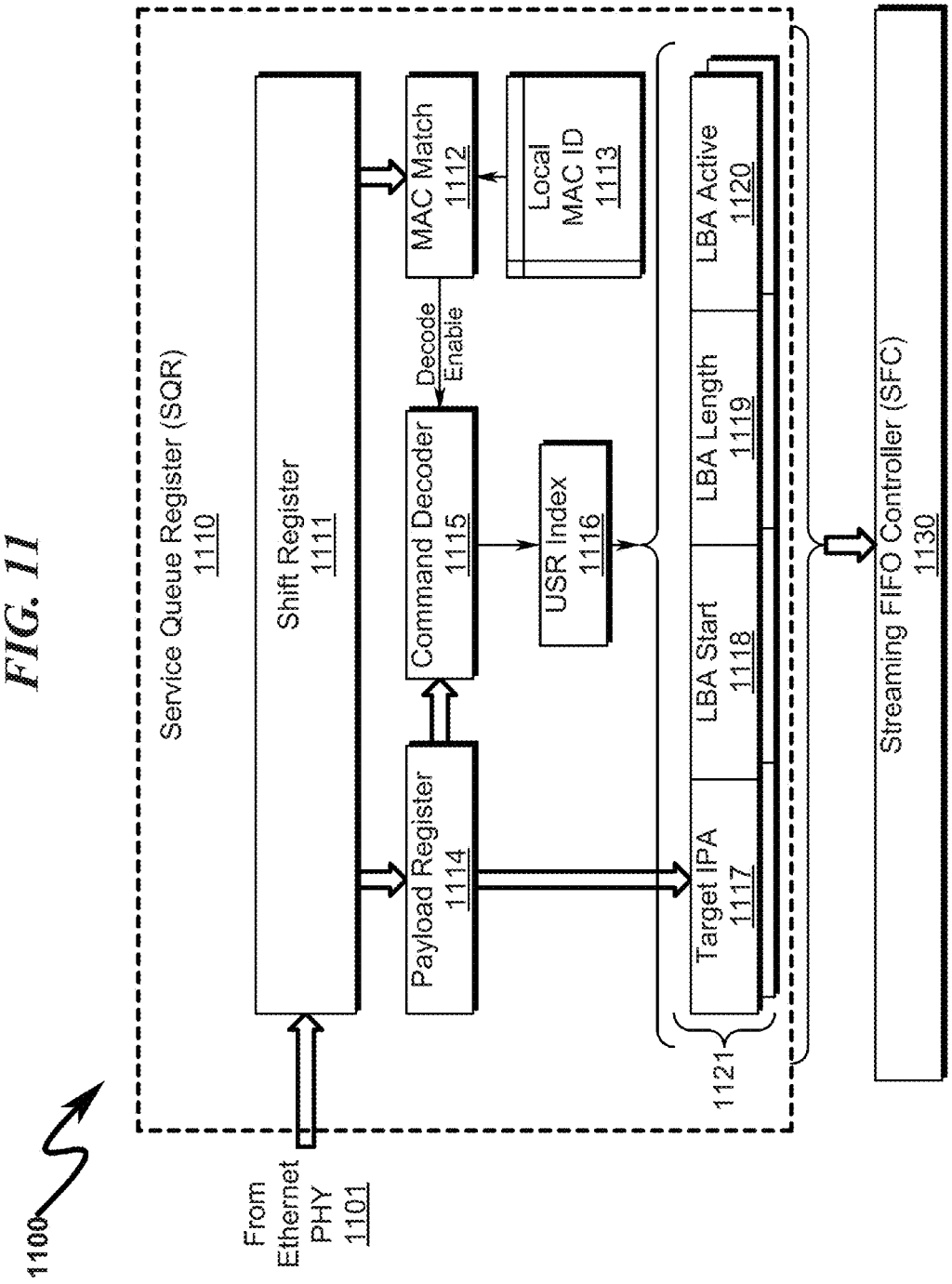
FIG. 11 illustrates a system block diagram depicting detail of the service queue register (SQR) hardware.

Exemplary IP protocol payloads are depicted in FIG. 10 (1000) (IPv4) and FIG. 11 (1100) (IPv6).

Frame Check Sequence (0518)

The frame check sequence (FCS) (0518) is a 4-octet cyclic redundancy check which allows detection of corrupted data within the entire frame. Running the FCS algorithm over the received frame data including the FCS will always result in the magic number or CRC32 residue 0xC704DD7B when data has been transmitted correctly. This allows for receiving a frame and validating the FCS without knowing where the FCS field actually starts.

End of Frame

The end of a frame (0519) is usually indicated by the end of data stream at the physical layer or by loss of the carrier signal. An example is 10BASE-T, where the receiving station detects the end of a transmitted frame by loss of the carrier. Some physical layers use an explicit end of data or end of stream symbol or sequence to avoid ambiguity. An example is Gigabit Ethernet with its 8b/10b encoding scheme that uses special symbols which are transmitted before and after a frame is transmitted.

Interpacket Gap (0519)

The Interpacket gap (0519) constitutes idle time between packets. After a packet has been sent, transmitters are required to transmit a minimum of 96 bits (12 octets) of idle line state before transmitting the next packet.

IP Protocol V4 Packet Format (0600)

Figure 6:
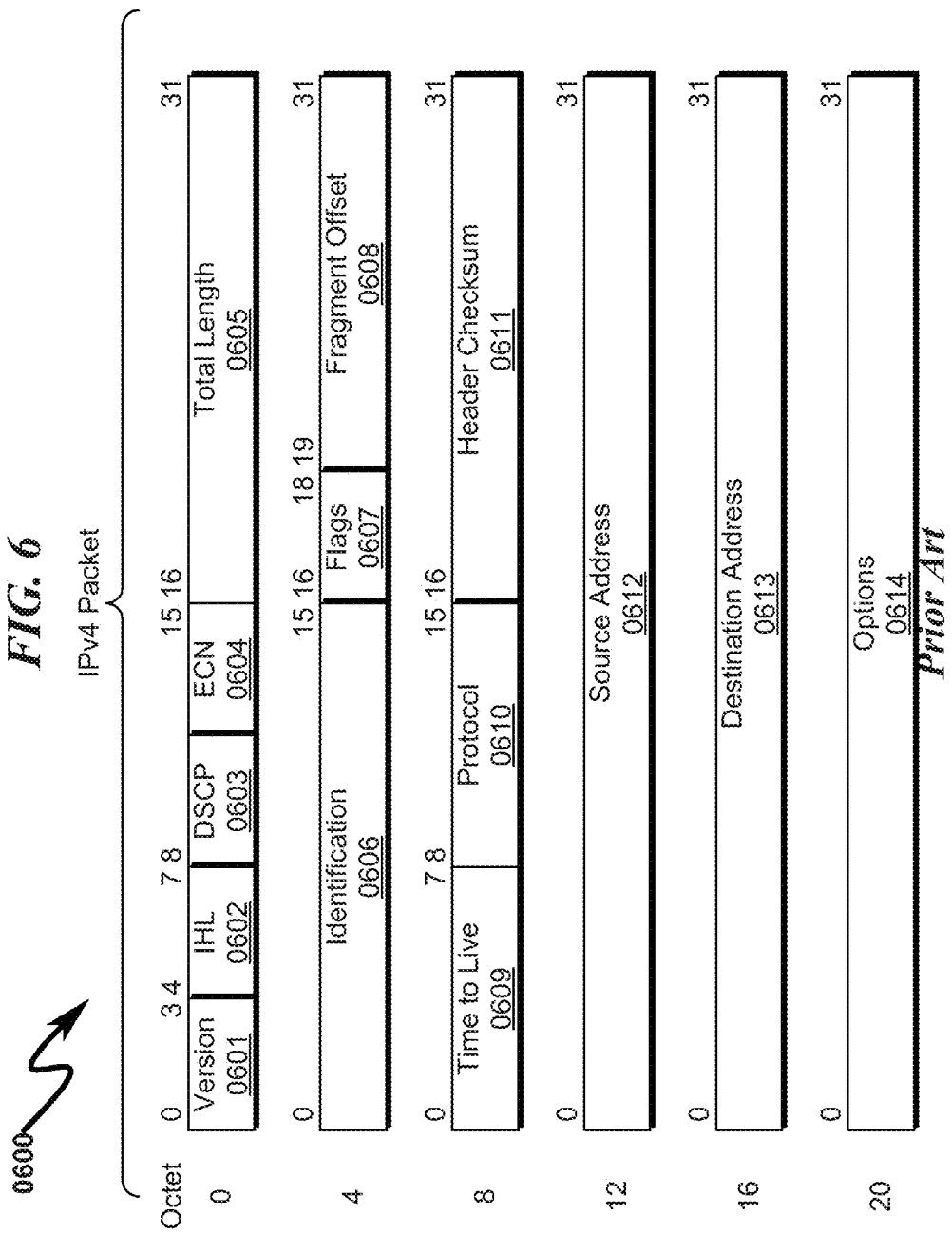
FIG. 6 illustrates an exemplary Internet Protocol v4 packet header format.

An exemplary IP V4 protocol packet structure is depicted in FIG. 6 (0600). The Internet Protocol being a layer-3 protocol (OSI) takes data Segments from layer-4 (Transport) and divides it into packets. IP packet encapsulates data unit received from above layer and add to its own header information. The encapsulated data is referred to as IP Payload. IP header contains all the necessary information to deliver the packet at the other end. The IP header includes relevant information including Version Number (which in this context is 4). Field details for the IP header are as follows:

- Version (0601): Version number of Internet Protocol used (e.g. IPv4).
- IHL (0602): Internet Header Length; Length of entire IP header.
- DSCP (0603): Differentiated Services Code Point; this is Type of Service.
- ECN (0604): Explicit Congestion Notification; It carries information about the congestion seen in the route.
- Total Length (0605): Length of entire IP Packet (including IP header and IP Payload).
- Identification (0606): If the IP packet is fragmented during the transmission, all the fragments contain the same identification number to identify the original IP packet to which they belong.
- Flags (0607): As required by the network resources, if the IP Packet is too large to handle, these 'flags' indicate if they can be fragmented or not. In this 3-bit flag, the MSB is always set to '0'.
- Fragment Offset (0608): This offset tells the exact position of the fragment in the original IP Packet.
- Time to Live (0609): To avoid looping in the network, every packet is sent with some TTL value set, which tells the network how many routers (hops) this packet can cross. At each hop, its value is decremented by one and when the value reaches zero, the packet is discarded.

Protocol (0610): Tells the Network layer at the destination host, to which Protocol this packet belongs to, i.e. the next level Protocol. For example protocol number of ICMP is 1, TCP is 6, and UDP is 17.

Header Checksum (0611): This field is used to keep checksum value of the entire header which is then used to check if the packet is received error-free.

Source Address (0612): 32-bit address of the Sender (or source) of the packet.

Destination Address (0613): 32-bit address of the Receiver (or destination) of the packet.

Options (0614): This is an optional field, which is used if the value of IHL is greater than 5. These options may contain values for options such as Security, Record Route, Time Stamp, etc.

IP Protocol V6 Packet Format (0700)

Figure 7:
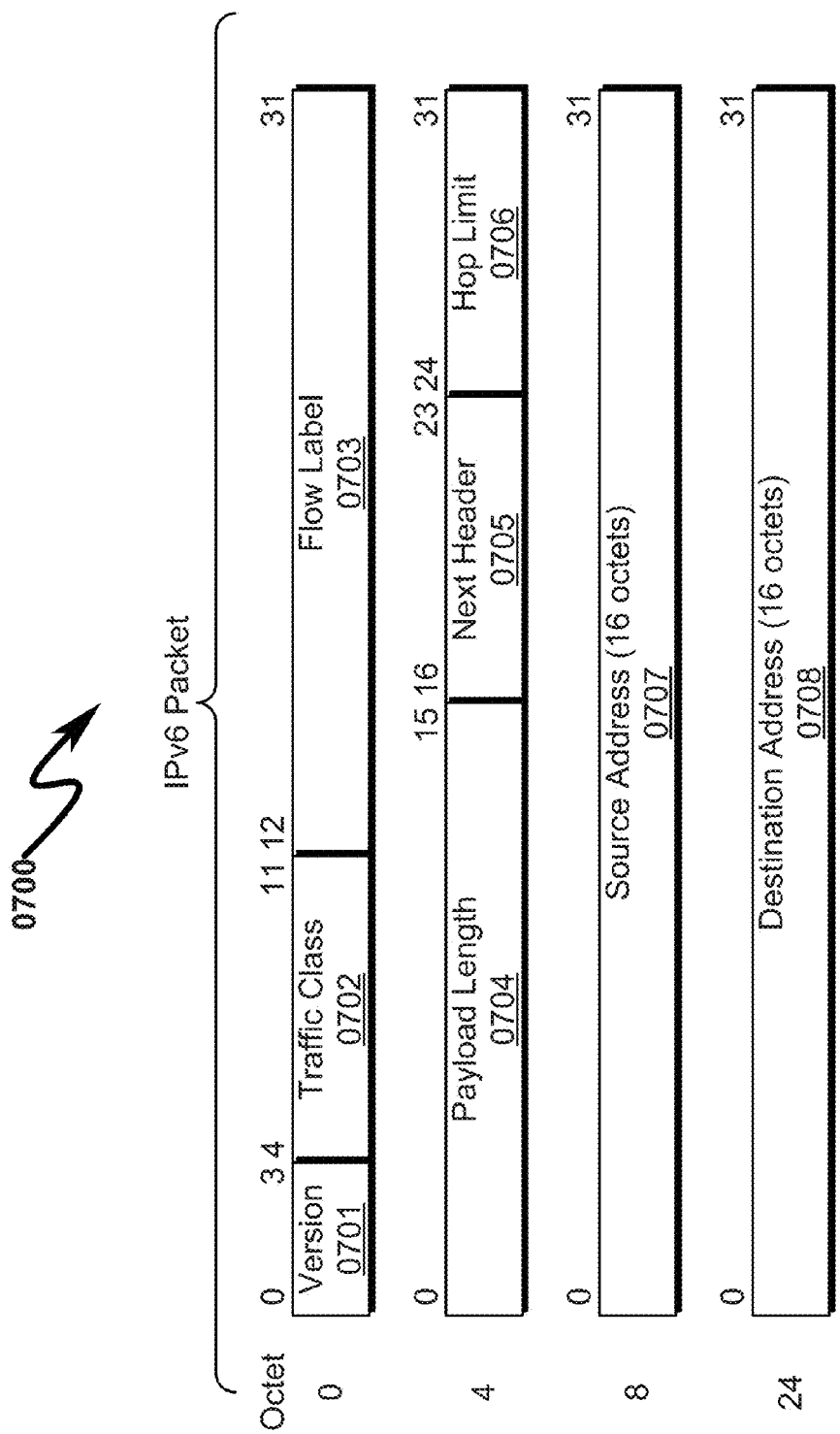
FIG. 7 illustrates an exemplary Internet Protocol v6 packet header format.

An exemplary IP V6 protocol packet structure is depicted in FIG. 7 (0700). An IPv6 packet is the smallest message entity exchanged via the Internet Protocol across an Internet Protocol version 6 (IPv6) network.

Packets consist of control information for addressing and routing, and a payload consisting of user data. The control information in IPv6 packets is subdivided into a mandatory fixed header and optional extension headers. The payload of an IPv6 packet is typically a datagram or segment of the higher-level Transport Layer protocol, but may be data for an Internet Layer (e.g., ICMPv6) or Link Layer (e.g., OSPF) instead.

IPv6 packets are typically transmitted over a Link Layer protocol, such as Ethernet which encapsulates each packet in a frame, but this may also be a higher layer tunneling protocol, such as IPv4 when using 6to4 or Teredo transition technologies.

Routers do not fragment IPv6 packets, as they do for IPv4. Hosts are "strongly recommended" to implement Path MTU Discovery to take advantage of MTUs greater than the smallest MTU of 1280 octets. A node may use the IPv6 Fragment header to fragment the packet at the source and have it reassembled at the destination(s).

The fixed header of an IPv6 packet consists of its first 40 octets (320 bits) and has the format as depicted in FIG. 7 (0700) with the following fields:

Version (4 bits) (0701): The constant 6 (bit sequence 0110).

Traffic Class (8 bits) (0702): The bits of this field hold two values. The 6 most-significant bits are used for differentiated services, which are used to classify packets. The remaining two bits are used for ECN priority values and subdivide into ranges: traffic where the source provides congestion control and non-congestion control traffic.

Flow Label (20 bits) (0703): Originally created for giving real-time applications special service. [1] The flow label when set to a non-zero value now serves as a hint to routers and switches with multiple outbound paths that these packets should stay on the same path so that they will not be reordered. It has further been suggested that the flow label be used to help detect spoofed packets.

Payload Length (16 bits) (0704): The size of the payload in octets, including any extension headers. The length is set to zero when a Hop-by-Hop extension header carries a Jumbo Payload option.

Next Header (8 bits) (0705): Specifies the type of the next header. This field usually specifies the transport layer protocol used by a packet's payload. When extension headers are present in the packet this field indicates which type of extension header follows. The values are shared with those used for the IPv4 protocol field, as both fields have the same function.

Hop Limit (8 bits) (0706): Replaces the time to live field of IPv4. This value is decremented by one at each intermediate node visited by the packet. When the counter reaches 0 the packet is discarded.

Source Address (128 bits) (0707): The IPv6 address of the sending node.

Destination Address (128 bits) (0708): The IPv6 address of the destination node(s).

In order to increase performance, and since current link layer technology and transport or application layer protocols are assumed to provide sufficient error detection the header has no checksum to protect it.

TCP/IP Protocol Overhead/Latency (0800)

Figure 8:
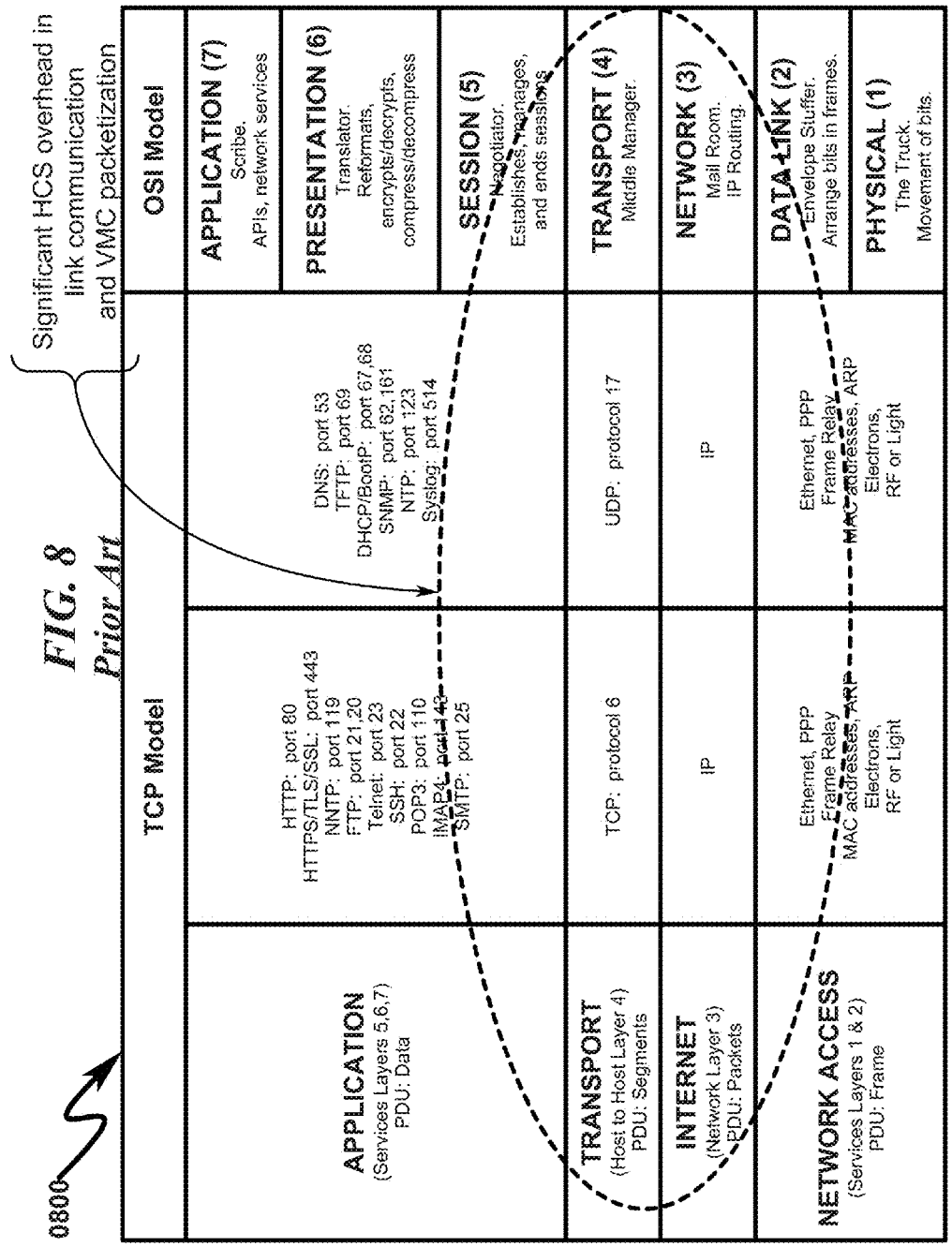
FIG. 8 illustrates a comparison of TCP/IP and OSI protocol layers indicating areas of inefficiency in prior art video streaming methodologies.

The necessity for video streaming systems to communicate via TCP/IP to remote mobile user devices (MUD) for the display of video media content (VMC) typically involves implementation of a TCP/IP stack in software on the host computer system (HCS). This requires considerable resources to manage the communication link but also to packetize the VMC for transport to the remote MUD. The typical protocol stack used in this configuration is depicted in FIG. 8 (0800). Here it can be seen that the 7-layer OSI model is mapped to a 4-layer TCP/IP transport stack. However, most of the actual work in transporting data occurs at layers 1 and 2, with upper level layers responsible for link negotiation.

The present invention incorporates special purpose hardware at layers 1 and 2 that permit direct streaming of VMC data to the remote MUD without the intervention of the HCS to manage the communication link or provide for packetization of VMC data to the MUD. Furthermore, the present invention permits bulk data transfers to occur from local storage media (LSM) that bypasses any operating system software and filesystem overhead associated with the HCS. This use of LSM also eliminates a communication bottleneck between the HCS and the VMC storage on the LSM by permitting direct streaming of data from the LSM via a SATA interface to hardware configured to stream this data directly to an Ethernet PHY and on to the remote MUD. Since SATA disk drive interfaces are rated at 300 MB/s-1200 MB/s, the data transport from the LSM to the Ethernet PHY can occur at speeds supporting gigabit Ethernet throughput requirements.

Ethernet/SATA Bridge (ESB) (0900)

Figure 9:
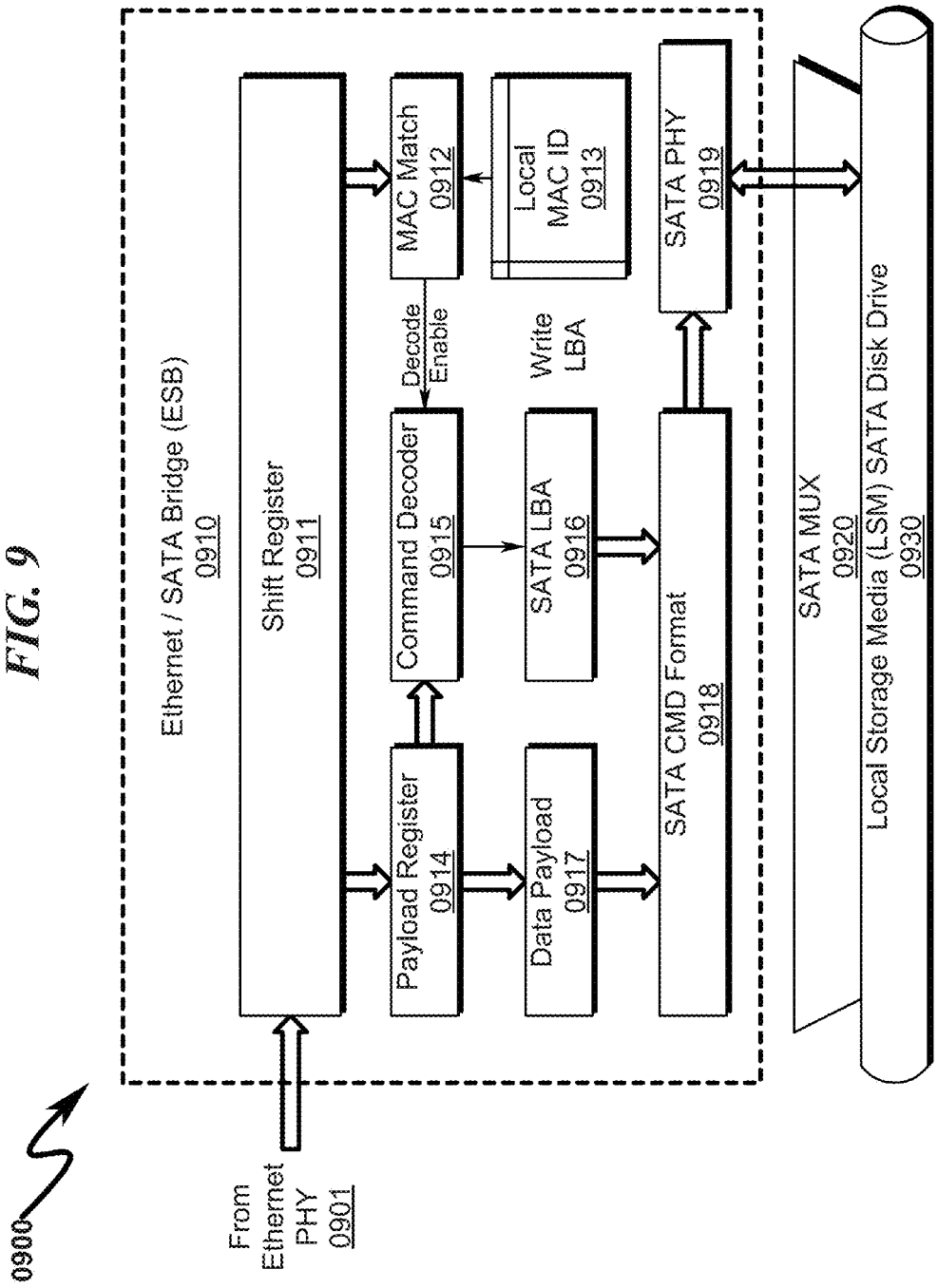
FIG. 9 illustrates a system block diagram depicting detail of the Ethernet/SATA bridge (ESB) hardware.

Additional detail on the present invention Ethernet/SATA bridge (ESB) is provided in FIG. 9 (0900). Here data from the Ethernet PHY (0901) is entered into the ESB (0910) via a shift register (0911). Once a packet is received a MAC match (0912) comparator compares the received MAC address in the shift register with the local MAC address ID (0913) and if a match is detected the payload register (0914) is inspected by a command decoder (0915) to retrieve SATA LBA information (0916) indicating a starting SATA LBA and LBA transfer count. The LBA data payload register (0917) is then loaded with appropriate data for writing the SATA disk drive and combined with an appropriate SATA disk drive command in a SATA command formatter register (0918). This combined SATA formatted command/data is then transmitted via a SATA PHY (0919) through the SATA MUX (0920) to the Local Storage Media (LSM) SATA Disk Drive (0930).

While the example provided is tailored towards writes of the LSM (0930) by the HCS, it is also possible to configure this hardware to retrieve logical blocks from the LSM (0930) by simply indicating a READ LBA command with appropriate starting LBA and LBA count registers. The data is then read from the LSM (0930) and transmitted via an ESB packet back to the Ethernet PHY (0901) for delivery to the HCS. In most cases the HCS is configured to only require WRITES to the LSM (0930), so the READ operation is not necessarily required for all system implementations.

ESB Packet Protocol (1000)

An exemplary ESB packet protocol is depicted in FIG. 10 (1000). The ESB packet protocol incorporates a standard layer 1 Ethernet frame with Ethernet preamble (1011), start-of-frame (SOF) delimiter (1012), Ethernet target MAC address (1013), Ethernet source MAC address (1014), and Ethernet Type (1015). This packet header is followed by a VERSION BYTE (1016) describing the ETB protocol version and a COMMAND BYTE (1017) describing the SATA command to be executed by the attached SATA disk drive. The VERSION BYTE (1016) may incorporate a number of FLAGS indicating how the COMMAND BYTE (1017) is to be interpreted. The COMMAND BYTE (1017) may be associated with a command specific COMMAND PARAMETER field (1018). Since the ETB protocol described herein is designed to be symmetric between the HCS and attached SATA drive, the VERSION BYTE (1016) and COMMAND BYTE (1017) may be interpreted in responses as indicating response flags and/or error conditions in conjunction with data provided in the PARAMETER field (1018).

The SEQUENCE IDENTIFIER (1019) is a sequential identifier tagged to the particular command or response and permits an individual command to have an associated response to that command identified with specificity. For example, a READ command issued using the ESB protocol may have a particular SEQUENCE IDENTIFIER associated with it and the returned data from the SATA disk will have this sequence identifier tagged with the data. The SEQUENCE IDENTIFIER (1019) may be broken into an upper longword (1020) and a lower longword (1021). The upper longword (1020) may constitute the TRANSFER REQUEST IDENTIFIER (1020) and the lower longword (1021) may constitute a SUBPACKET IDENTIFIER (1021) associated with the transfer. For example, a WRITE command may include an upper longword (1020) of 0x12345678 indicating a particular TRANSFER REQUEST IDENTIFIER (1020) followed by sequential SUBPACKET IDENTIFIERS (1021) of 0x00000001, 0x00000002, 0x00000003, etc. that identify each block to be written in the command sequence. This allows a single WRITE command or other data transfer to be broken up into a number of Ethernet frames with each frame containing one or more logical disk blocks in the TRANSFER DATA PAYLOAD (1028). Tagging of the subpackets allows for non-sequential data transfers. Thus, the frame transfer sequences need not be sent in sequential order.

The START LBA (1022) is the base address of the LBA associated with the transfer request. The START LBA (1022) is broken into a STARTING LBA ADDRESS (1023) and LBA OFFSET (1024). The STARTING LBA ADDRESS (1023) represents the block offset for the SATA transfer request and the BYTE OFFSET (1024) represents the byte offset into that particular sector. Note that the BYTE OFFSET (1024) supports sector sizes of up to 65536 bytes while the STARTING LBA (1023) supports ATA-standard 48-bit LBA address fields. The LBA COUNT (1025) field comprises a LBA TRANSFER COUNT (1026) field and an associated BYTE OFFSET (1027) field. As with the START LBA (1022) field, the LBA TRANSFER COUNT (1026) field and associated BYTE OFFSET (1027) field support sector sizes of up to 65536 bytes and ATA-standard 48-bit LBA address fields.

The TRANSFER DATA PAYLOAD (TDP) (1028) field varies in length and may comprise a number of 512-byte blocks representing sectors (or partial sectors) transferred to or from the attached SATA disk drive. Depending on whether the HCS supports jumbo frames (frames having a payload greater than the maximum transmission unit (MTU) of 1500 bytes), the TDP may comprise 1-16 512-byte SATA disk drive sectors.

The ETB protocol depicted in FIG. 10 (1000) may in some circumstances support truncated packets in which fields following the COMMAND BYTE (1017) are truncated from the packet transmission. Thus, shortened packets incorporating some SATA commands may include just the command (e.g., RESET) or a command plus COMMAND PARAMETER (1018) with longer command packet permutations also possible.

Service Queue Register (SQR) (1100)

Additional detail of the service queue register (SQR) (1110) is depicted in FIG. 11 (1100). Here it can be seen that data from the HCS Ethernet PHY (1101) is loaded into a hardware shift register (1111) for inspection by MAC address match logic (1112) that matches local MAC ID ROM (1113). A MAC match provides a decode signal that enables a payload register (1114) to be interpreted by a command decoder (1115). The command decoder (1115) extracts a user service request (USR) index from the payload register that allows indexing into a local register bank comprising end-user target IP address (1117), VMC LBA start value (1118), VMC LBA length value (1119), and VMC LBA active value (1120) registers. The IP address (1117), VMC LBA start value (1118), VMC LBA length value (1119), and VMC LBA active value (1120) registers may be replicated for every active end-user to be supported by the video streaming system.

Each set of IP address (1117), VMC LBA start value (1118), VMC LBA length value (1119), and VMC LBA active value (1120) registers within the SQR register bank (1121) constitutes the current display state of the end-user with respect to media content that is contained on the LSM. As the HCS stores data on the LSM, the starting point for a given selection of VMC is associated with a starting LBA and LBA length on the LSM. This data is initially stored in the VMC LBA start value (1118) and VMC LBA length value (1119) and associated with the IP address (1117) of the end-user who is the target for the video stream. As data is streamed from the LSM to the end-user an active LBA pointer (1120) is updated from zero to the LBA length (1119) value to indicate the progression of VMC data streamed to the end-user. The end-user may reset the LBA active (1120) pointer via requests to the HCS at a high level or via low level communication with the ETE.

The SQR register bank (1121) is dual ported and may be accessed directly by the SFC (1130) via a USR index (1116) address pointer that permits the SFC (1130) to sequence through the VMC data transfer (VDT) entries (1117, 1118, 1119, 1120) and use this information to directly access logical blocks on the LSM and rapidly transfer this information to the ETE for direct encoding into Ethernet frames that include the end-user target IP address and the VMC streaming payload data.

SQR Register Bank Detail (1200)

Figure 12:
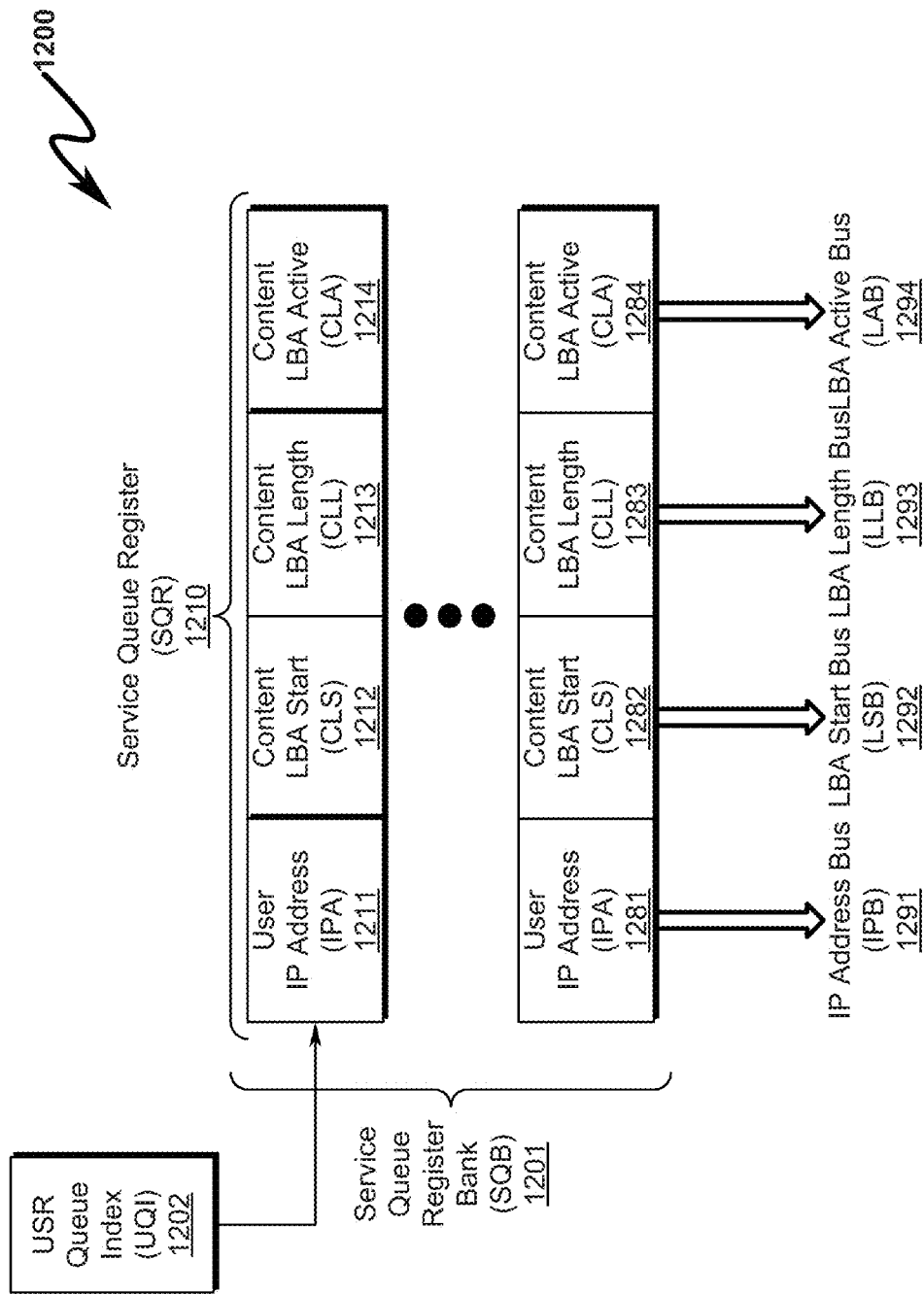
FIG. 12 illustrates an exemplary service queue register bank (SQB) hardware configuration.

Additional detail of the SQR register bank is depicted in FIG. 12 (1200). This hardware register bank (SQB) (1201) is indexed using a USR queue index (UQI) (1202) that may be driven by either the Ethernet PHY command decoder or the SFC. As configured, each SQR (1210) comprises individual register sets including the end-user IP address (IPA) (1211, 1281), content LBA start (CLS) (1212, 1282), content LBA length (CLL) (1213, 1283), and content LBA active (CLA) (1214, 1284) registers. As selected, data contained in these registers is placed on individual data busses (1291, 1292, 1293, 1294) for transmission to the SFC and eventually the ETE.

The configuration of the SQR (1210) and SQB (1201) permit rapid context switches between the transmission of VMC data to various end-user MUD displays because as the individual end-user is selected for processing, the display context for that user immediately becomes available to the SFC and ETE permitting immediate creation of the eventual Ethernet packet for transmission to the end-user. Furthermore, the active LBA for the current video context can be immediately transmitted to the LSM for retrieval of the VMC data associated with the current VMC display point for the individual end-user.

SQR Packet Protocol (1300)

Figure 13:
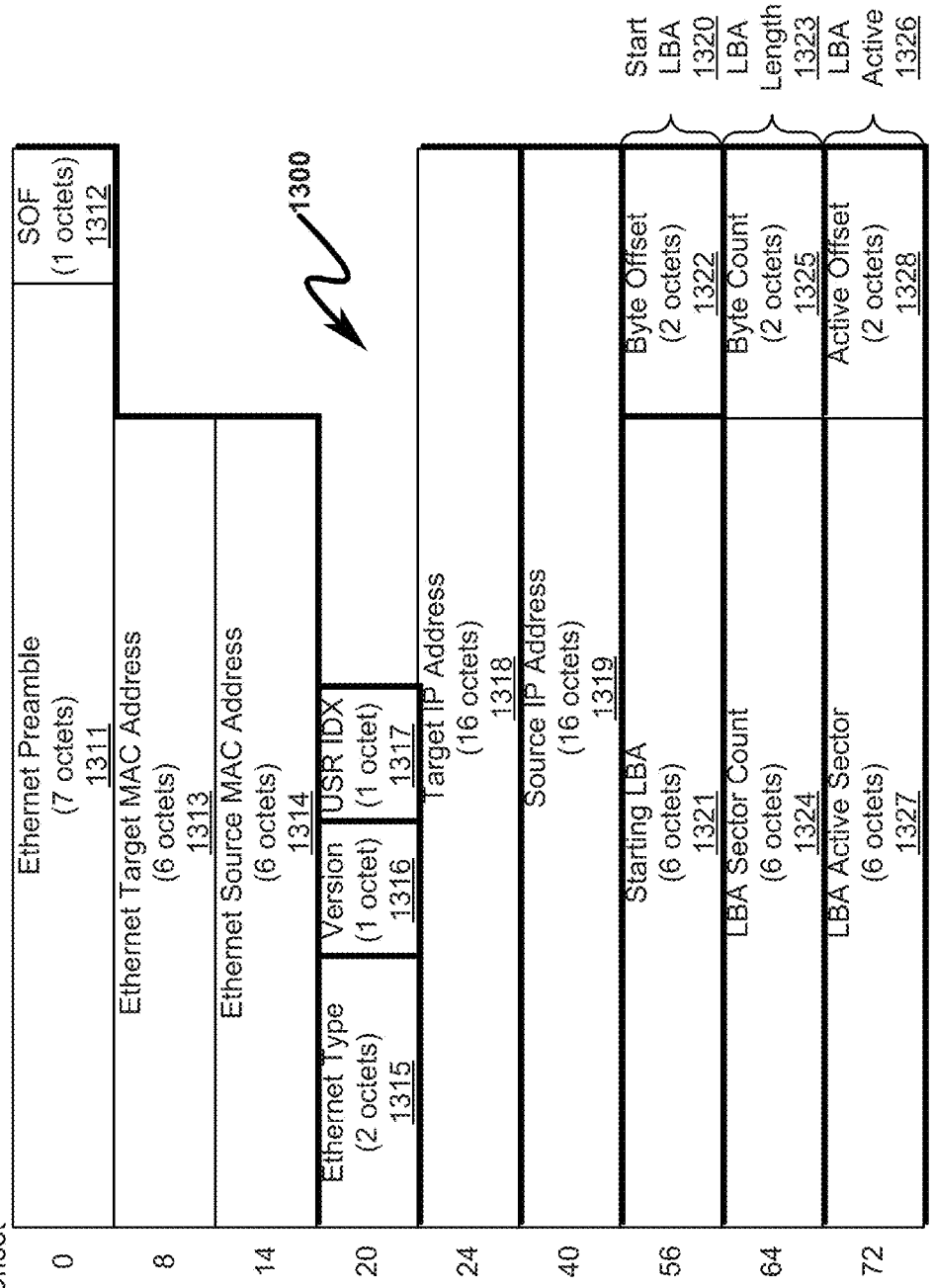
FIG. 13 illustrates an exemplary service queue register (SQR) frame packet format.

An exemplary SQR packet protocol is depicted in FIG. 13 (1300). The SQR packet protocol incorporates a standard layer 1 Ethernet frame with Ethernet preamble (1311), start-of-frame (SOF) delimiter (1312), Ethernet target MAC address (1313), Ethernet source MAC address (1314), and Ethernet Type (1315). This packet header is followed by a VERSION BYTE (1316) describing the SQR protocol version and a USER SERVICE REQUEST (USR) index byte (1317) describing an index used to identify the end-user MUD. The VERSION BYTE (1316) may incorporate a number of FLAGS indicating how the USR IDX (1317) is to be interpreted. The USR IDX (1317) may be affiliated with an ETB VERSION/FLAGS byte or ETB COMMAND parameter so that the hardware logic of the ETB and SQR may be combined in some preferred embodiments. In these configurations the Ethernet PHY and command interpreter hardware may be shared among these two system components.

The remainder of the SQR command packet comprises end-user target IP address (1318), an optional identifying source IP address (1319) (typically provided by the HCS to identify the streaming source), a start LBA (1320) field comprising the starting LBA address (1321) for the VMC with associated sector byte offset (1322), a LBA length (1323) field comprising the number of LBA sectors to transfer (1324) along with an optional byte count (1325), and an LBA active field comprising the currently streaming LBA sector offset (1326) along with an optional byte count offset (1327). As the SQR may be loaded with both the LBA pointer/length of the VMC as well as an active sector offset (1328), it is possible to begin video streaming at an arbitrary point within the VMC as stored on the LSM.

SFC Detail (1400)

Figure 14:
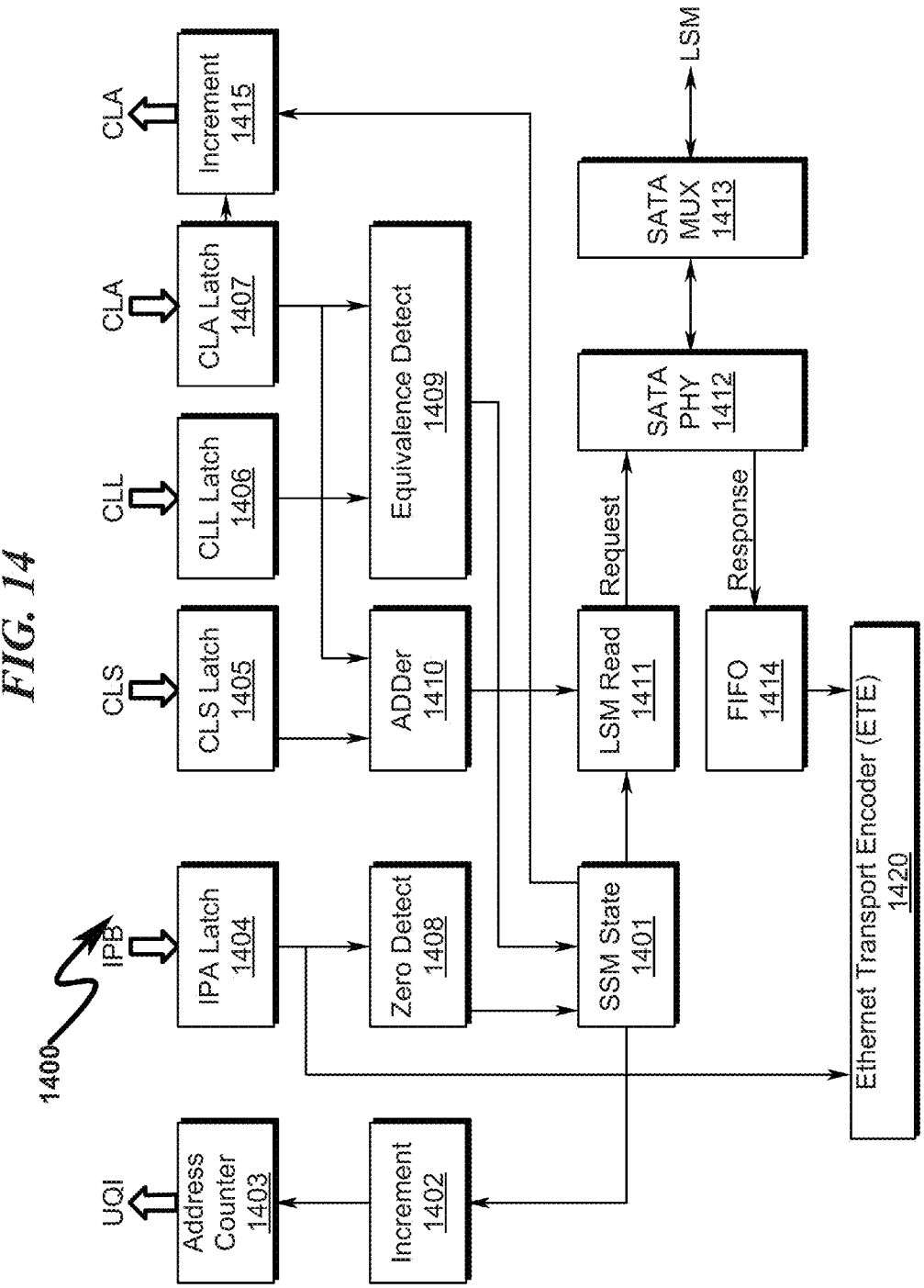
FIG. 14 illustrates an exemplary streaming FIFO controller (SFC) hardware configuration.

Additional detail on the streaming FIFO controller (SFC) is presented in FIG. 14 (1400). Here a hardware streaming state machine (SSM) (1401) controls the general operation of the SFC by first reading data from the SQR by incrementing the value (1402) of an address counter (1403) that operates to index the SQR via the UQI. SQR data is then latched into IPA (1404), CLS (1405), CLL (1406), and CLA (1407) latches for use locally within the SFC.

An IPA zero detector (1408) detects zero (idle or unused) SQR entries and forces an increment (1402) of the address counter (1403) by the SSM (1401). Note that a zero IP address is used in this implementation to indicate a NULL or inactive entry in the SQR. Alternative implementations might use different values for NULL, such as an all-ones pattern.

An equivalence match (1409) of the CLL (1406) and CLA (1407) latches indicates that the VMC has been completely streamed to the end-user and results in an increment (1402) of the address counter (1403) by the SSM (1401). Note that this ACTIVE pointer may be reset by the HCS at some other time in the SQR and thus the next inspection of this SQR entry may result in some activity to the end-user.

Under normal streaming conditions, the CLS latch (1405) is summed to the contents of the CLA latch (1407) by an ADDER (1410) to determine a LBA address for streaming to the end-user. This summed data (1410) is hardware formatted into an LSM read request (1411) (typically formatted as a SATA disk drive read request) and presented to a SATA PHY (1412) for transmission to the LSM via the SATA MUX (1413). A response from the LSM is fed into a FIFO memory (1414) (or equivalently a shift register) and sent to the ETE (1420) for transmission to the end-user MUD in an Ethernet frame. After transmission to the ETE (1420), the SSM (1401) increments (1415) the CLA latch (1406) contents and updates the CLA register within the SQR.

Depending on the application context, the SSM (1401) may be configured to transmit a single 512-byte sector to the end-user or in some circumstances transfer multiples of 512-byte sectors. Disk configurations in which the standard sector size is a multiple of 512 bytes may be handled by incorporating additional bits in the CLS (1404), CLL (1405), and CLA (1407) latches to indicate more granularity in the transmission of data to the end-user and a subsequent modification of the FIFO memory (1414) to transmit fractional sector data to the ETE (1420) during each transfer from the LSM.

In some circumstances data may be received from the LSM at a higher data rate than can be accommodated by the ETE (1420). In these circumstances the ETE may be configured with an internal FIFO that is capable of receiving the data at full SATA bus speeds and then transmit this information via the SEP at a data rate compatible with the SEP.

ETE Detail (1500)-(1600)

Figure 15:
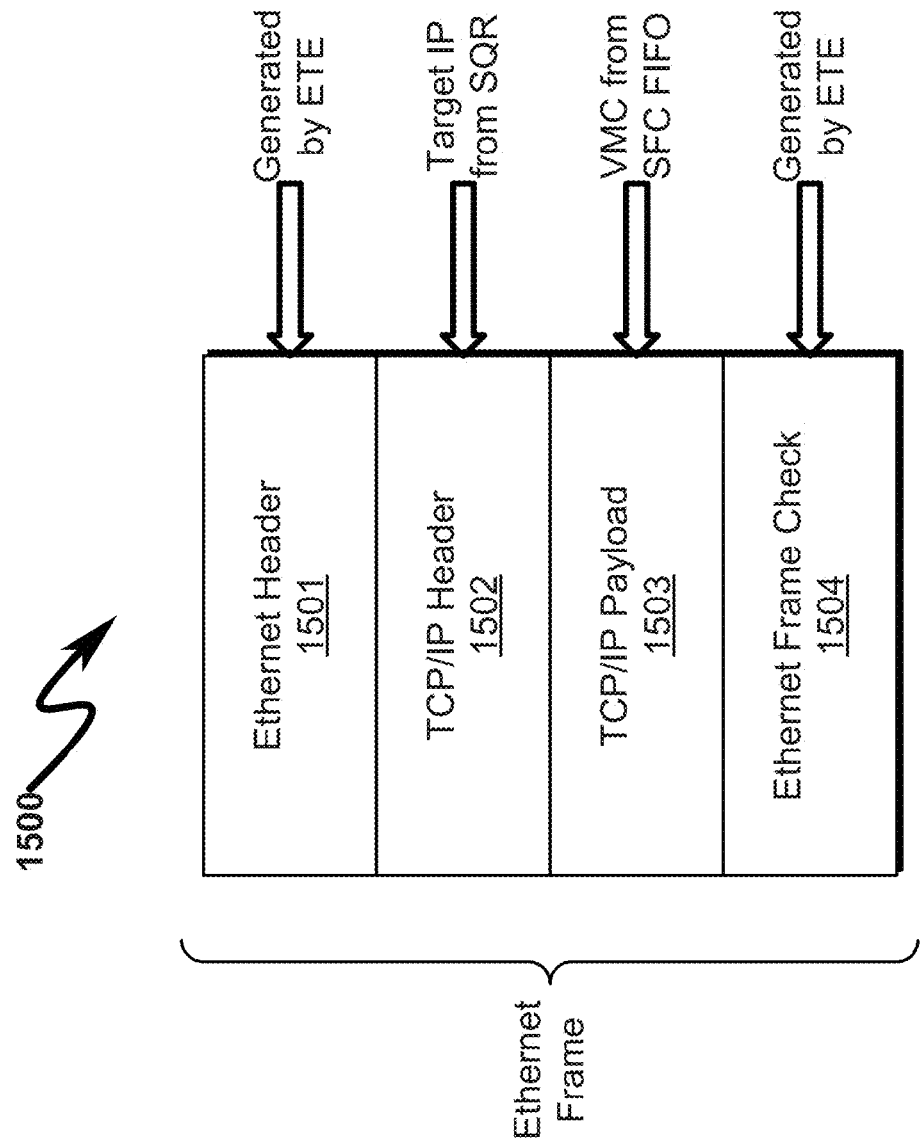
FIG. 15 illustrates an exemplary Ethernet transport encoder (ETE) packet assembly configuration.
Figure 16:
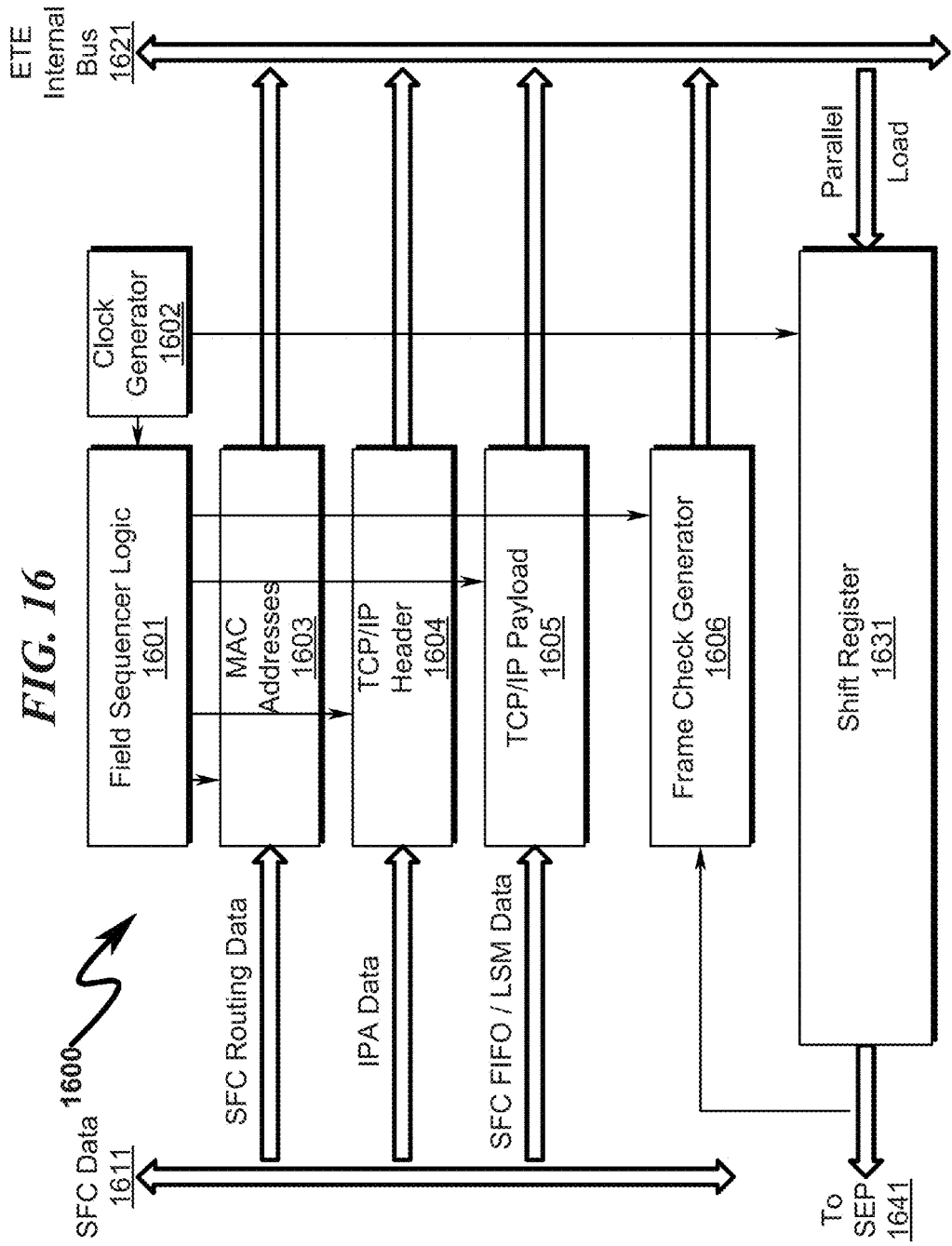
FIG. 16 illustrates an exemplary Ethernet transport encoder (ETE) hardware configuration.

Additional detail on the function of the ETE is provided in FIG. 15 (1500)-FIG. 16 (1600). Referencing FIG. 15 (1500), the Ethernet frame generated by the ETE is assembled using data known by the ETE (1501) such as the source/destination MAC addresses in conjunction with TCP/IP routing information (1502) provided by the SFC from the SQR. The TCP/IP payload data (1503) is provided by the SFC FIFO in real time. Finally, the Ethernet frame check information (1504) is generated by the ETE at the end of the frame data received from the SFC.

Referencing FIG. 16 (1600), the ETE comprises field sequencer logic (FSL) (1601) that is cycled by a clock generator (1602) to sequentially generate Ethernet frames by sequentially dumping data sourced from the SFC (1611) to an ETE internal bus (1621) and eventually to a shift register (1631) and on to a secondary Ethernet PHY (1641). The FSL (1601) sequences through the generation of an Ethernet frame by first loading MAC addresses (1603) onto the ETE internal bus (1621) for parallel delivery to the shift register (1631)

then information on the TCP/IP header (1604) that is derived from the IPA data provided by the SFC (1611). After this information has been transferred the TCP/IP payload (1605) is delivered as received from the SFC FIFO and/or the LSM directly. After this information has been transferred a frame check generator (1606) is activated to provide the proper Ethernet frame termination sequence from the data inspected from the output of the shift register (1631).

Note that the internal register blocks (1603, 1604, 1605) may incorporate their own FIFO registers to provide for additional buffering from the SFC. Additionally, large data packets may be transferred in smaller packet sizes as determined by logic in the FSL (1601). This may include additional hardware control lines to the TCP/IP header information to include frame buffering sequence numbers for multi-packet aggregation by the end-user MUD. Some preferred invention embodiments may incorporate the use of jumbo frame transmission capability within the ETE. Payload data (1605) may be transferred to the ETE from a FIFO buffer in the SFC or in some circumstances directly transferred from the LSM via the SATA MUX under control of the SFC.

Exemplary SATA MUX Configuration (1700)-(1800)

Figure 17:
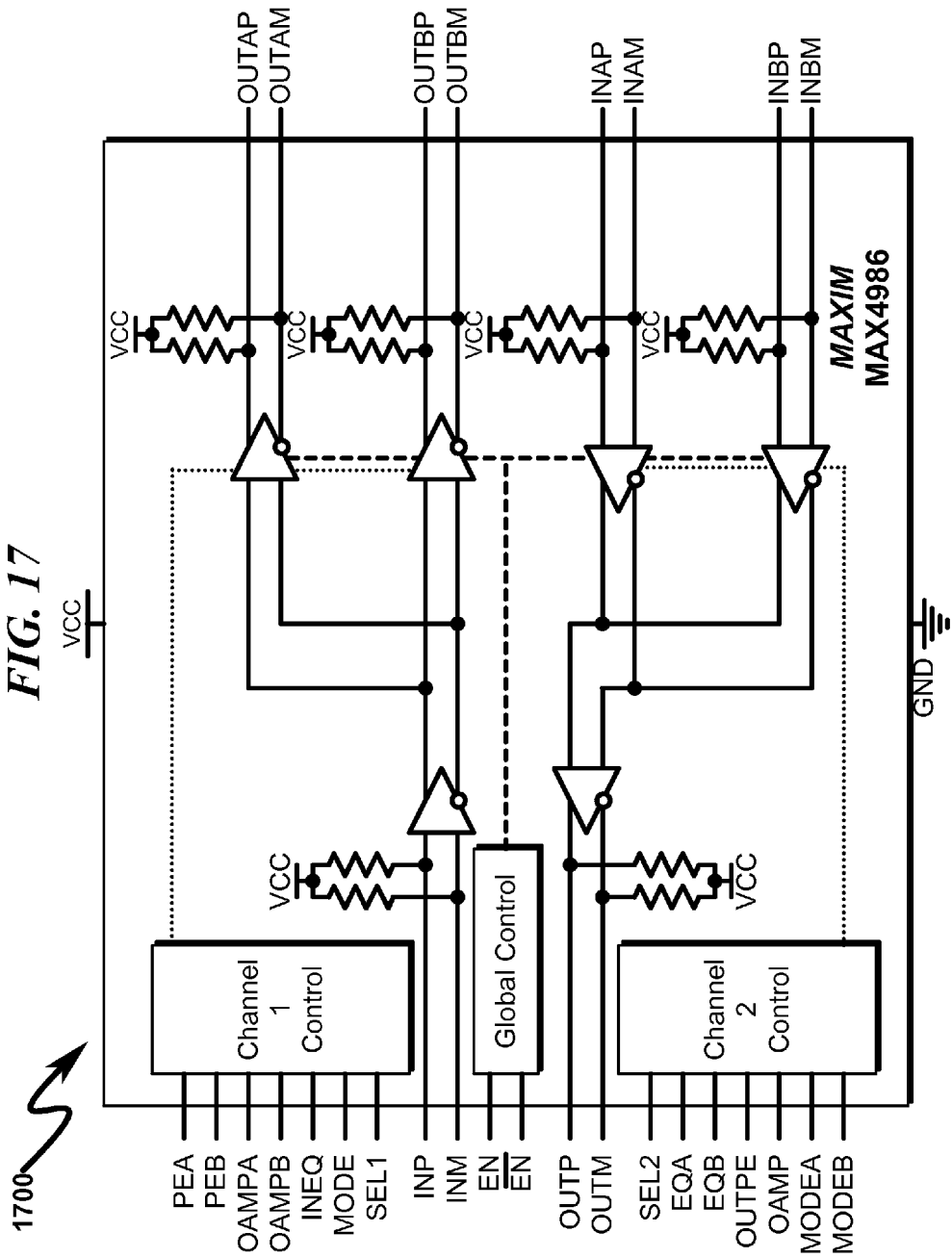
FIG. 17 illustrates a MAXIM INTEGRATED PRODUCTS model MAX4986 SAS/SATA Single Lane 2:1/1:2 Multiplexer/Demultiplexer Plus Redriver with Equalization integrated circuit useful in some preferred invention embodiments.
Figure 18:
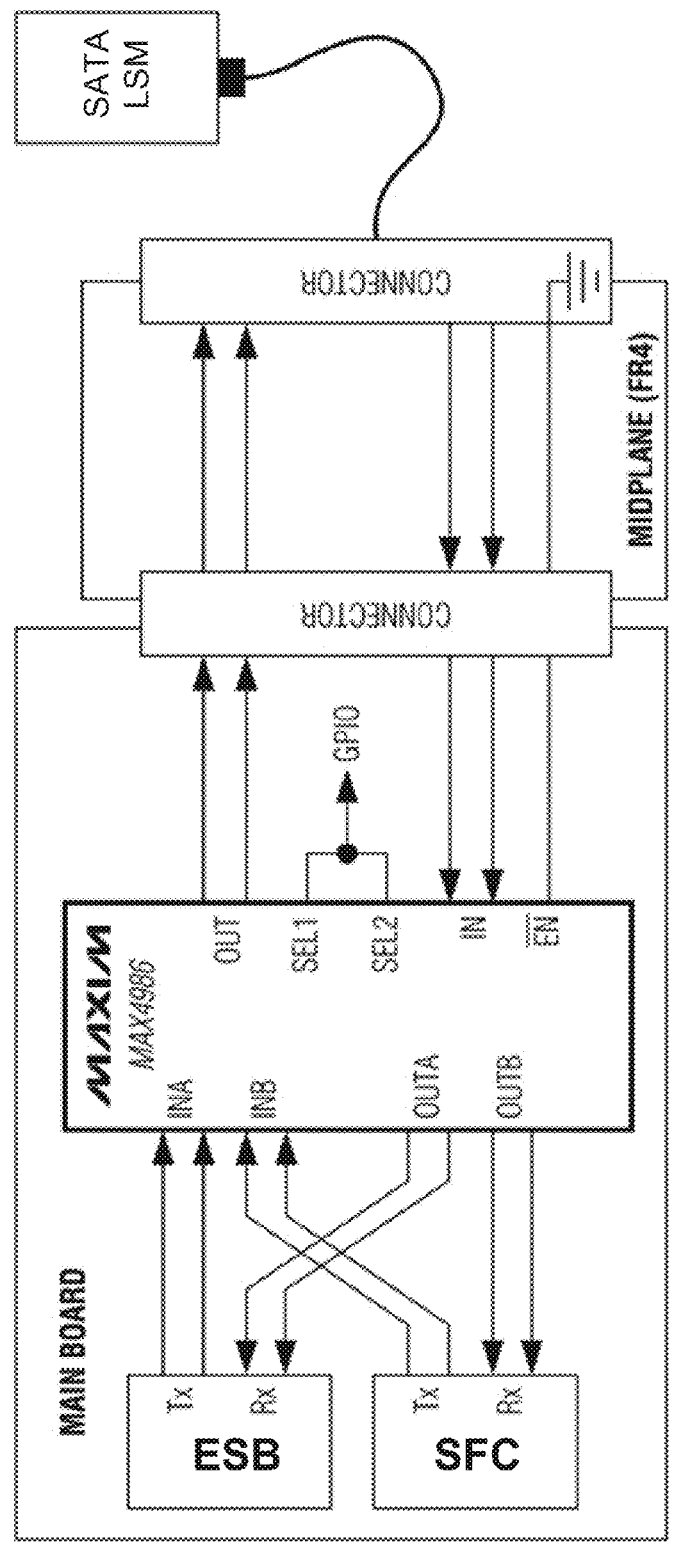
FIG. 18 illustrates dual-host access to the local storage media (LSM) using the SATA MUX depicted in FIG. 17 (1700)

An exemplary SATA MUX hardware implementation is depicted in FIG. 17 (1700)-FIG. 18 (1800) in which a MAXIM INTEGRATED PRODUCTS model MAX4986 SAS/SATA Single Lane 2:1/1:2 Multiplexer/Demultiplexer Plus Redriver with Equalization integrated circuit as depicted in FIG. 17 (1700) is used to support dual-host access to the local storage media (LSM) as depicted in the connection diagram FIG. 18 (1800). The present invention anticipates that this SATA MUX functionality in conjunction with the ESB, SQR, SFC, and ETE may in some preferred invention embodiments be combined in a single FPGA or application specific integrated circuit (ASIC) to reduce cost and improve communication bandwidth between the various ESB, SQR, SFC, and ETE components.

Alternatives to SATA Disk Drive LSM Technology (1900)-(2000)

Note also that while depictions of the LSM in this document are generally that of conventional hard drive technology, the use of solid-state SATA drives is also anticipated. Since the LSM is predominantly a read-only media with rare exceptions when the HCS loads media content on the LSM for distribution, the use of flash-based SATA solid-state disk drives can ensure that the gigabit output from the ETE is never delayed due to access latencies in the LSM. While commercially available SATA disk drives are thought to be optimal in many preferred invention embodiments, some invention embodiments may opt to utilize a dual-ported flash memory array to store the VFC information. In these embodiments the SATA MUX is replaced with a serialized dual ported RAM interface controller.

Figure 19:
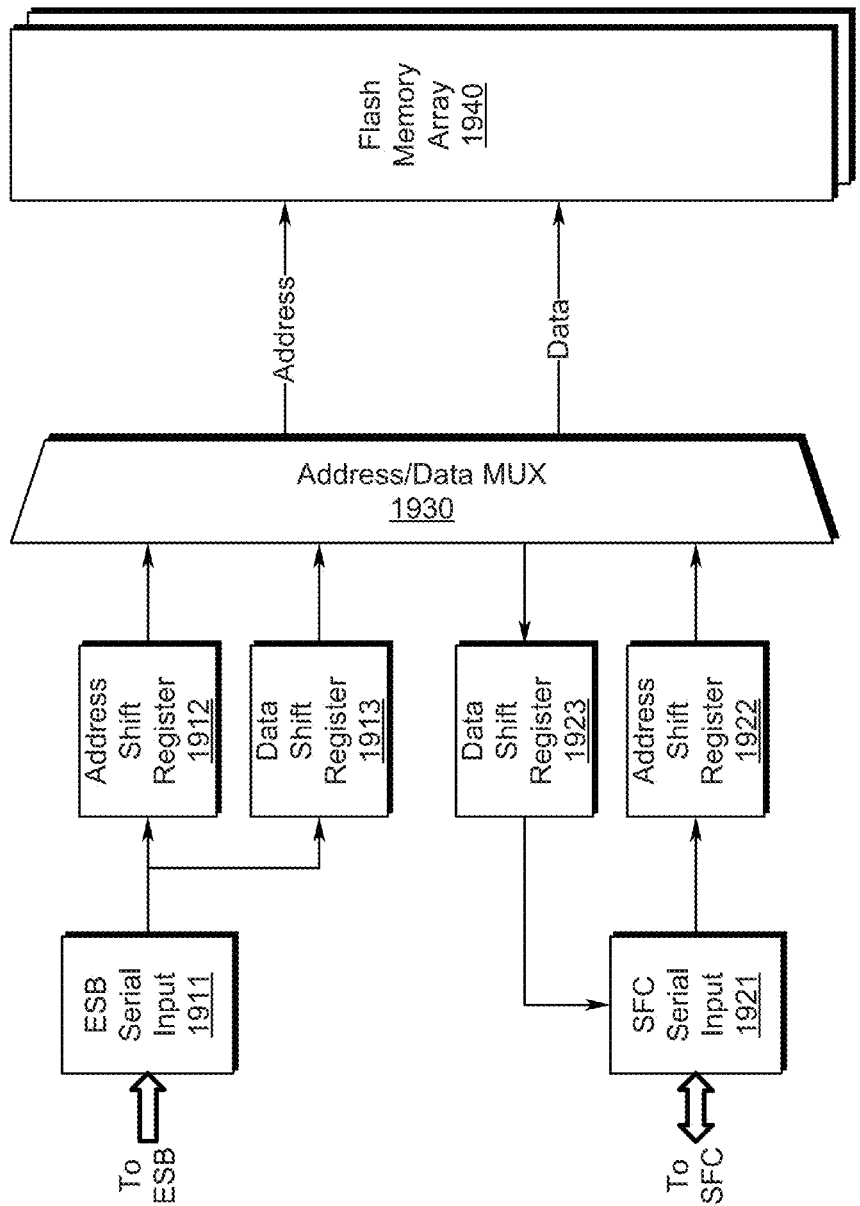
FIG. 19 illustrates dual-host access to the local storage media (LSM) configured as a flash memory array using dual port serial access from the ESB and SFC.
Figure 20:
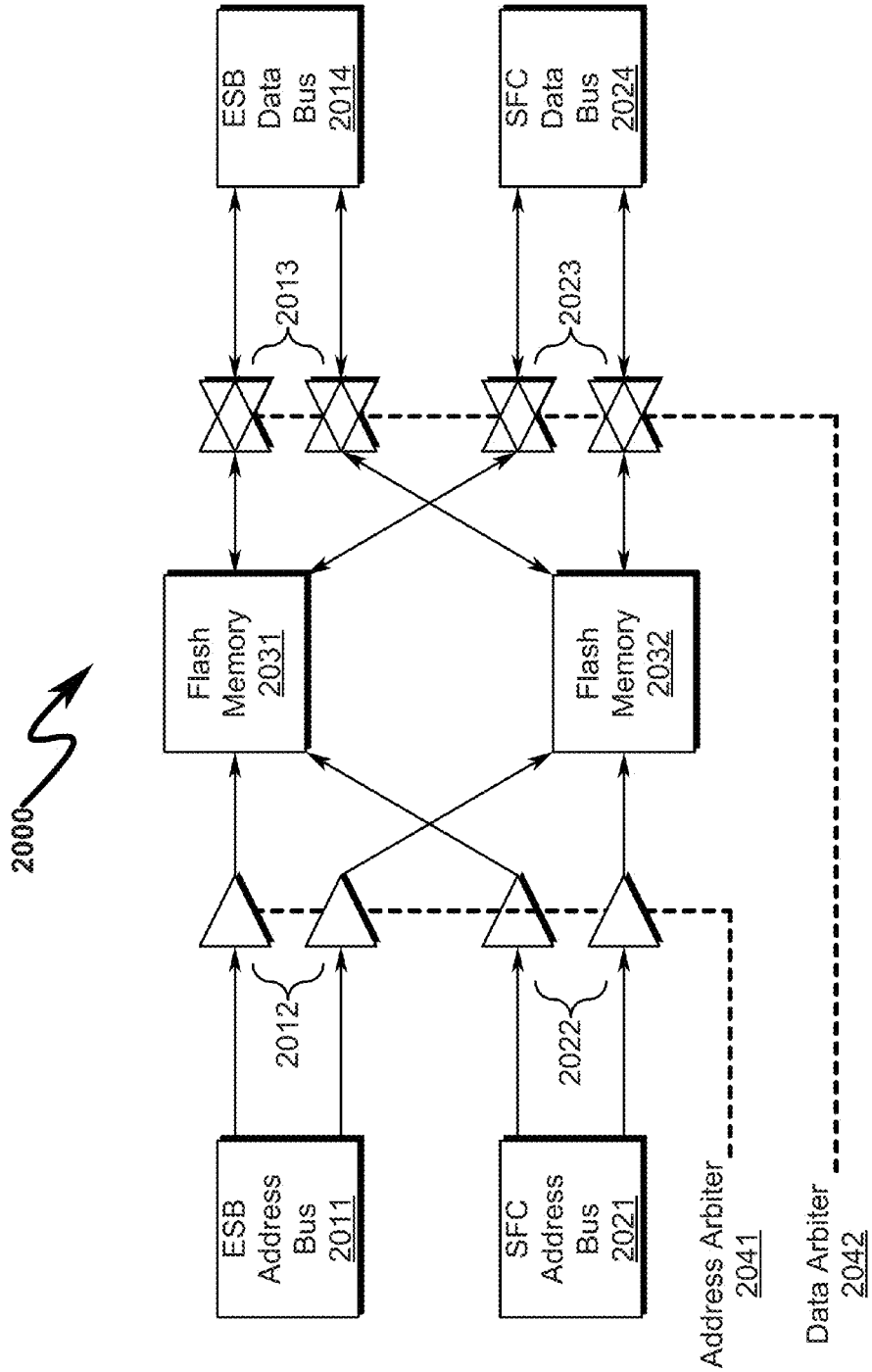
FIG. 20 illustrates an exemplary dual-port serial access to a flash memory array for the ESB and SFC components.

As generally depicted in FIG. 19 (1900), a flash memory LSM storage system can be constructed using ESB serial interfaces (1911) and SFC serial interfaces (1921) and associated address shift registers (1912, 1922) and data shift registers (1913, 1923) that connect to an address/data mux (1930) and individually access one or more flash memory planes (1940). FIG. 20 (2000) provides additional detail on the ESB address bus (2011) and SFC address bus (2021) linkage to tri-state bus buffers (2012, 2022) that individually address flash memory RAMS (2031, 2032). Data access to the flash memory RAMS (2031, 2032) is achieved using bus transceivers (or transmission gates) (2013, 2023) connected to corresponding the ESB data bus (2014) and SFC data bus (2024). Address bus arbiter (2041) and data bus arbiter (2042) control lines are used to determine priority of access for the ETB and SFC ports in the system. Generally speaking, the SFC will not request access to the LSM when the SQR IP address values are all zero, as a zero IP address value in the SQR is not valid and indicates an unused (inactive) SQR location. Thus, the ETB may gain access to a given flash memory RAM by inactivating references to it in the SQR.

SATA/ETE Bus Transfer Matching

By using a FPGA or ASIC to integrate the functions of the ESB, SQR, SFC, and ETE, some preferred invention embodiments may be configured to support gigabit Ethernet at full gigabit Ethernet bus speeds. Recall that the use of SATA disk drives in conjunction with their 3/6/12 Gbps bus speeds permits coupling of the SATA LSM with a gigabit Ethernet ETE as described herein with only the minimal addition of a FIFO shift register to perform data translation and minimal real-time buffering. As the LSM data source can be configured to have a bandwidth higher than the output ETE, this intermediate FIFO buffer (typically contained within the SFC) will typically never be exhausted by transfers to the ETE.

VSC System Integration (2100)-(2400)

Figure 21:
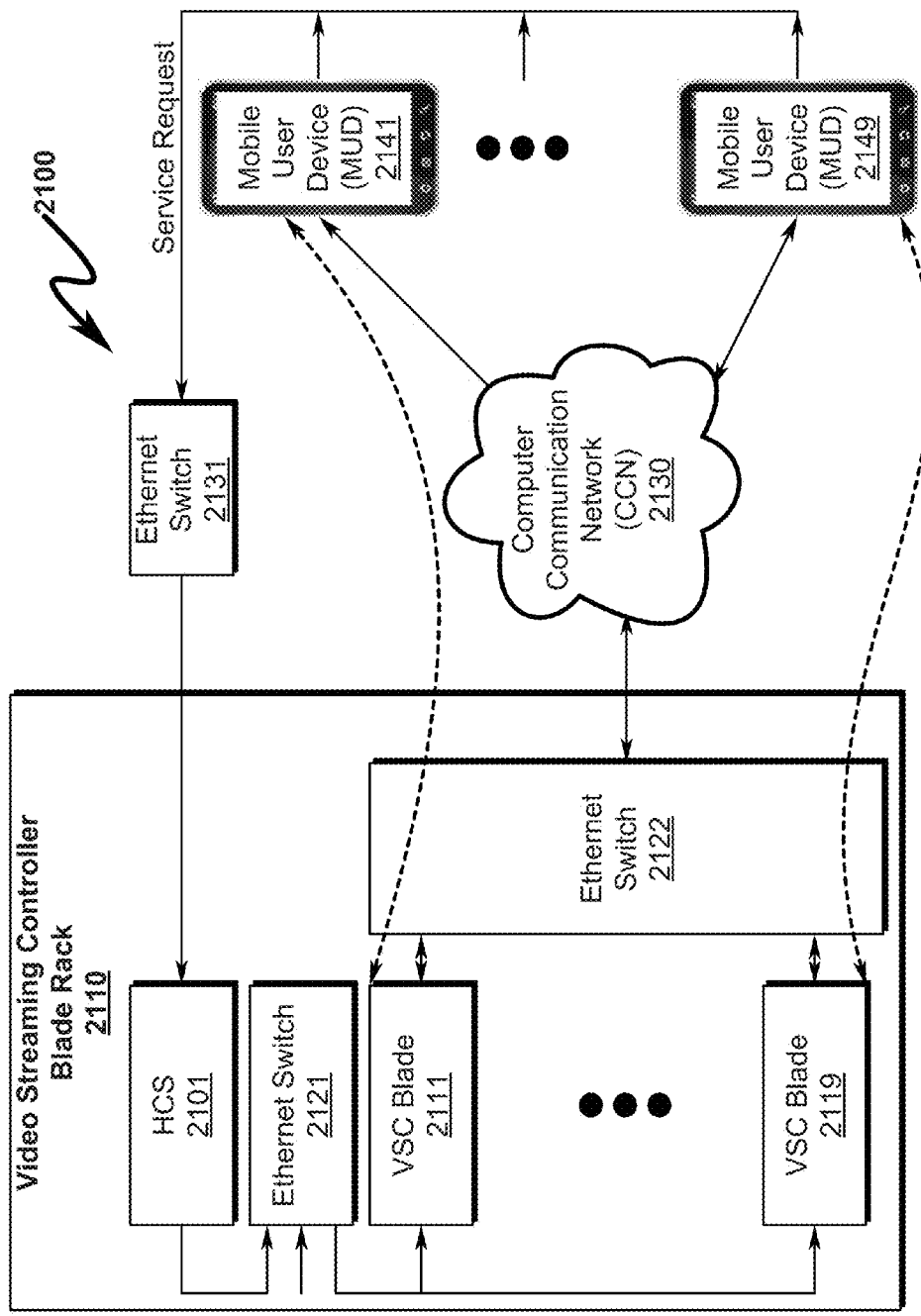
FIG. 21 illustrates an exemplary implementation of the present invention supporting multiple end-users and scaled within a video streaming controller (VSC) blade rack.

The present invention is designed to be modular and be easily integrated to support scaled distribution of VMC among large numbers of end-user MUD displays. As generally depicted in FIG. 21 (2100), the system may be integrated within a video streaming controller (VSC) blade rack (2110) comprising a host computer system (HCS) (2101), Ethernet switches (2121, 2122), and a plurality of VSC blades (2111, 2119). Communication via a CCN (2130) to remote MUD displays (2141, 2149) permits streaming of the VMC data to the remote end-users in response to service requests received via an incoming Ethernet switch (2131) to the HCS (2101). Within this context the scaling of the system to support large numbers of end-users while still maintaining high data throughputs is paramount.

Figure 22:
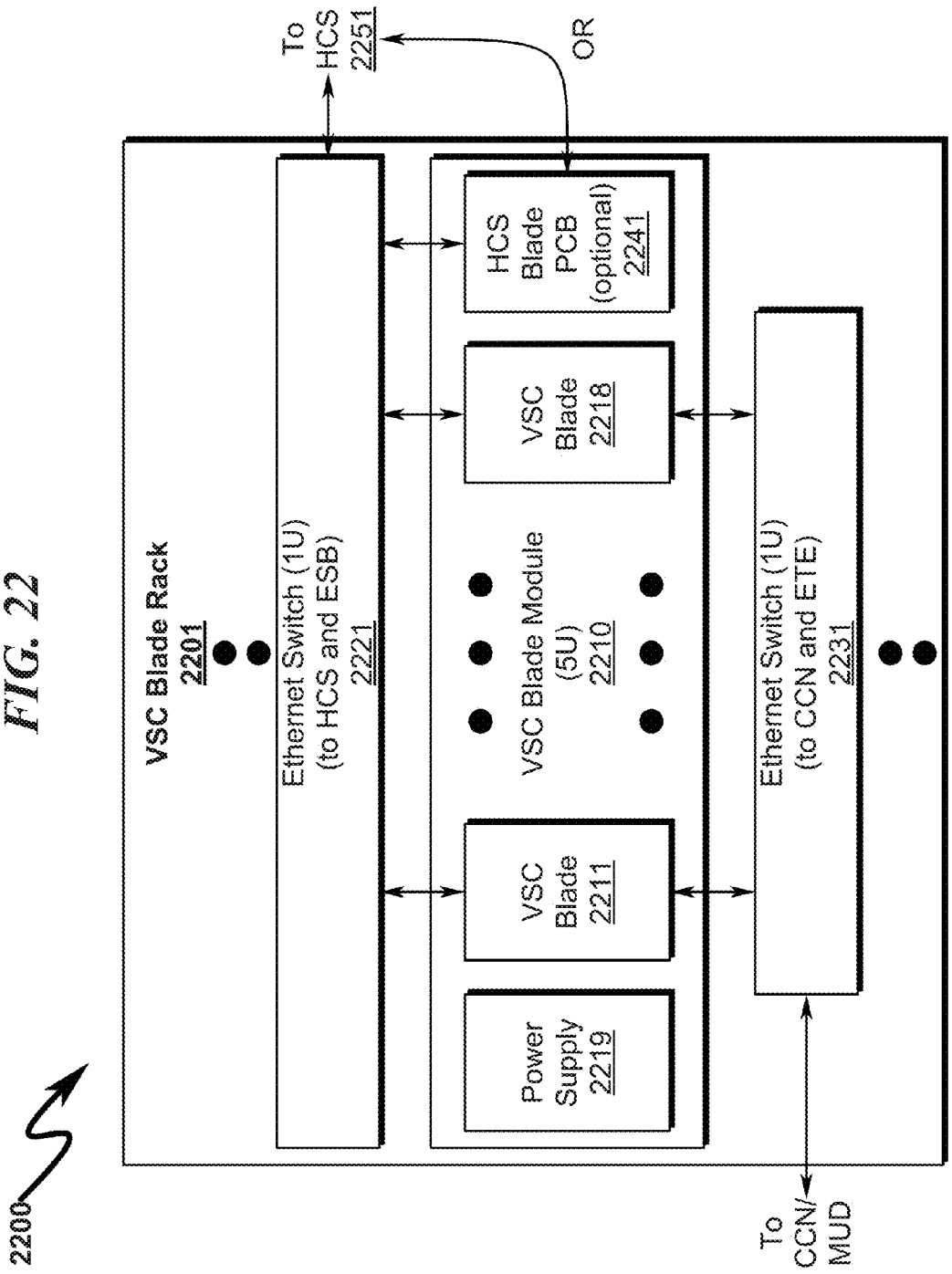
FIG. 22 illustrates an exemplary VSC blade rack configuration useful in some preferred invention embodiments.

As generally depicted in FIG. 22 (2200), a VSC blade rack (2201) will generally be configured as a standard 19-inch rack having multiple sets of VSC blade modules (2210) coupled to HCS/ESB Ethernet switches (2221) and CCN/ETE Ethernet switches (2231). Typically the Ethernet switches (2221, 2231) will be configured as 1U rack units and the VSC blade modules (2210) as 5U rack units. Each VSC blade module (2210) will incorporate 1-8 VSC blades (2211, 2218) and a power supply (2219). In some circumstances the VSC blade module (2210) may incorporate a HCS blade PCB (2241) instead of connection to a remote HCS (2251) via the HCS/ESB Ethernet switch (2221).

Figure 23:
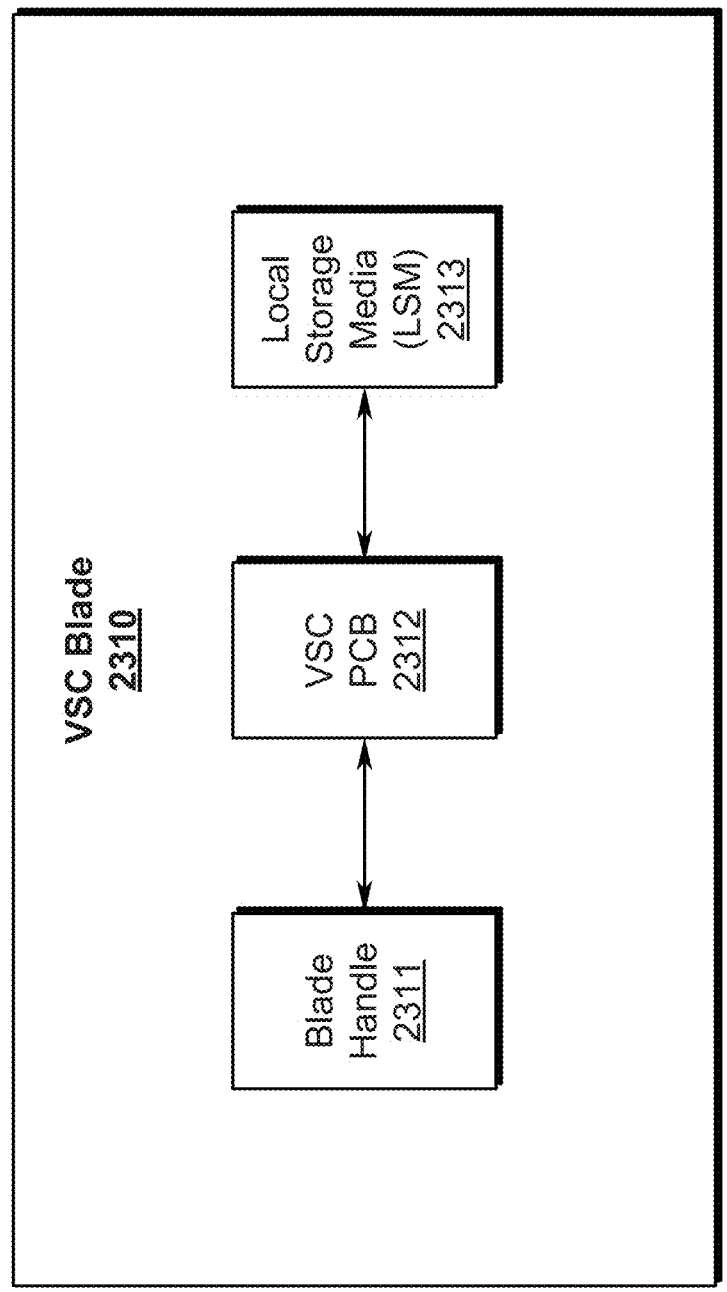
FIG. 23 illustrates an exemplary VSC blade configuration useful in some preferred invention embodiments.

As generally depicted in FIG. 23 (2300), each VSC blade (2310) comprises a VSC blade handle (2311) coupled to a VSC PCB (2312) on which a local storage media (LSM) (2313) is mounted. This configuration is plugged into a backplane supporting power distribution to the VSC PCB (2312).

Figure 24:
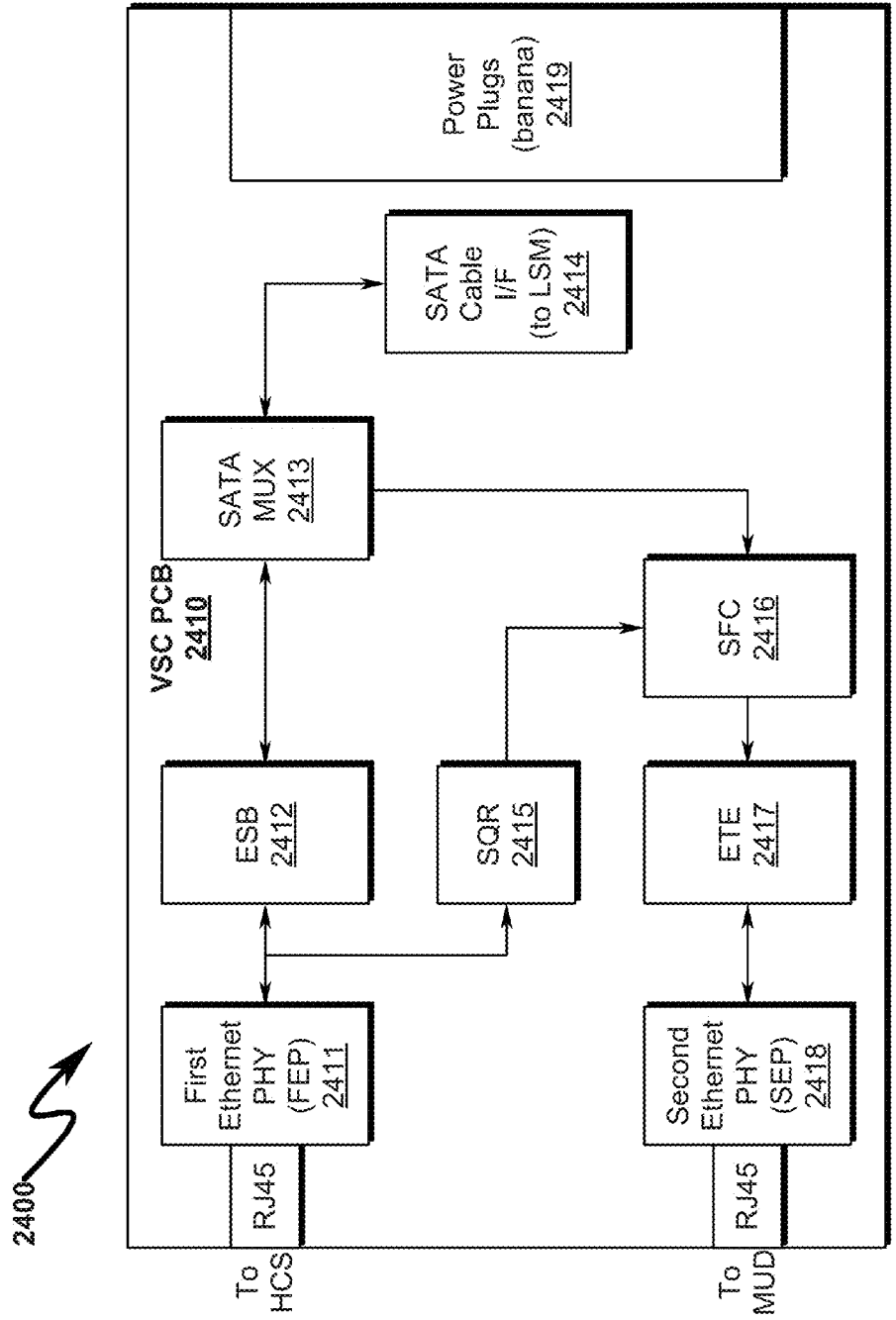
FIG. 24 illustrates an exemplary VSC blade PCB configuration useful in some preferred invention embodiments.

As generally depicted in FIG. 24 (2400), each VSC blade PCB (2410) comprises a first Ethernet PHY (2411) coupling the HCS and the ESB (2412). The ESB (2412) communicates via the SATA MUX (2413) to a SATA connector (2414) and through a SATA cable to the LSM. The FEP (2411) also communicates to the SQR (2415) to define data to be transmitted to the end-user. The SQR is scanned by the SFC (2416) which streams data from the LSM through the SATA MUX (2413) to the ETE (2417) for packetization and transmission via a second Ethernet PHY (2418) to the remote CCN/MUD. Power plugs in the form of banana jacks (2419) supply power to the PCB from the VSC blade module backplane.

Figure 25:
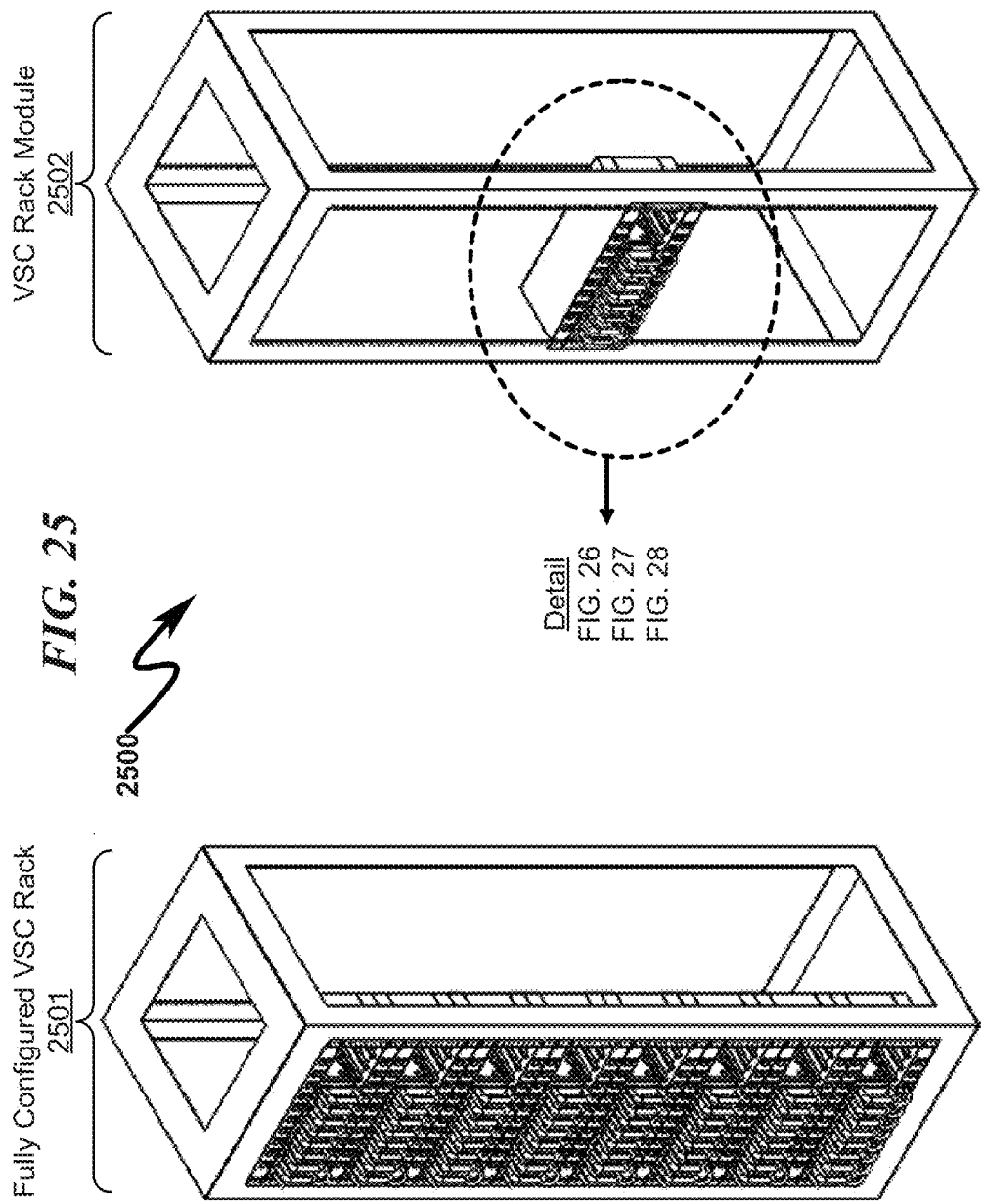
FIG. 25 illustrates a front top perspective view of an exemplary present invention VSC blade rack configuration.
Figure 48:
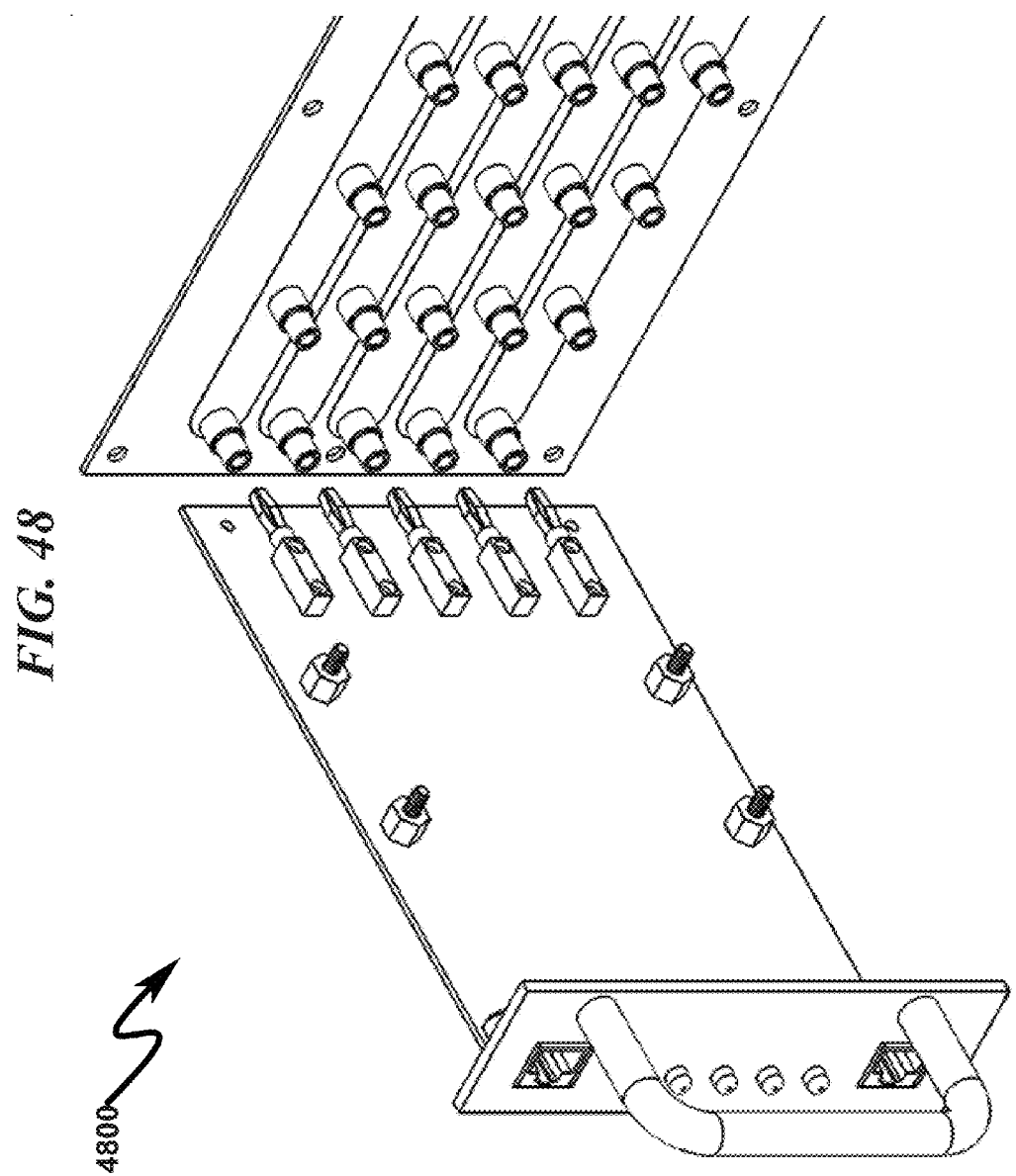
FIG. 48 illustrates a top right front perspective view of a VSC blade module with one VSC blade installed and rack cage and LSM suppressed illustrating power bus pre-insertion detail.

The block diagram depictions provided in FIG. 21 (2100)-FIG. 24 (2400) is depicted in more detail in a typical hardware configuration provided FIG. 25 (2500)-FIG. 48 (4800). As there are a variety of cabling methodologies to connect the LSM to the VSC PCB only the cable connectors are illustrated in this example.

Exemplary VSC Blade Rack (2500)-(4800)

Figure 29:
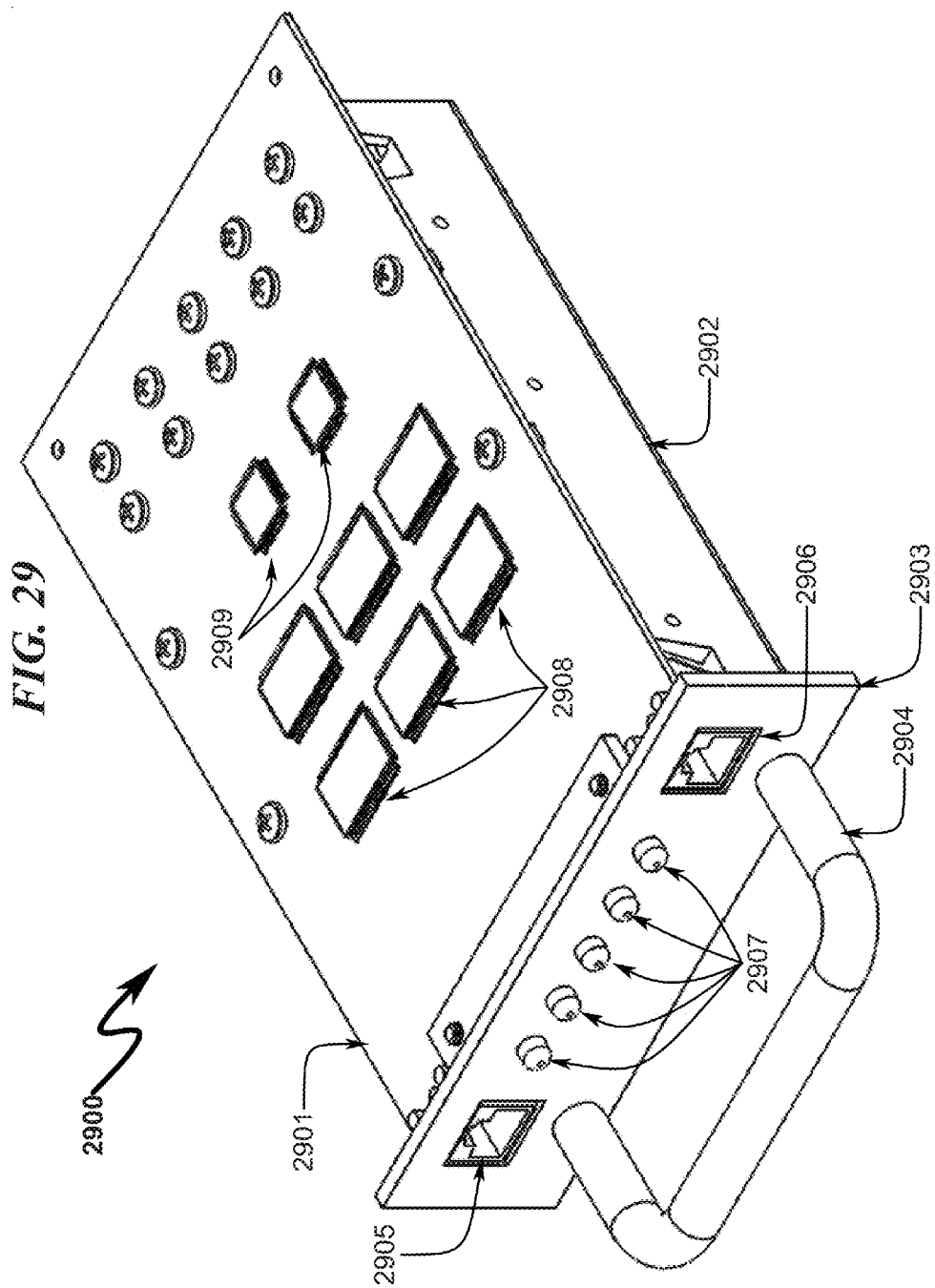
FIG. 29 illustrates a front top right detail perspective view of an exemplary present invention VSC blade.
Figure 30:
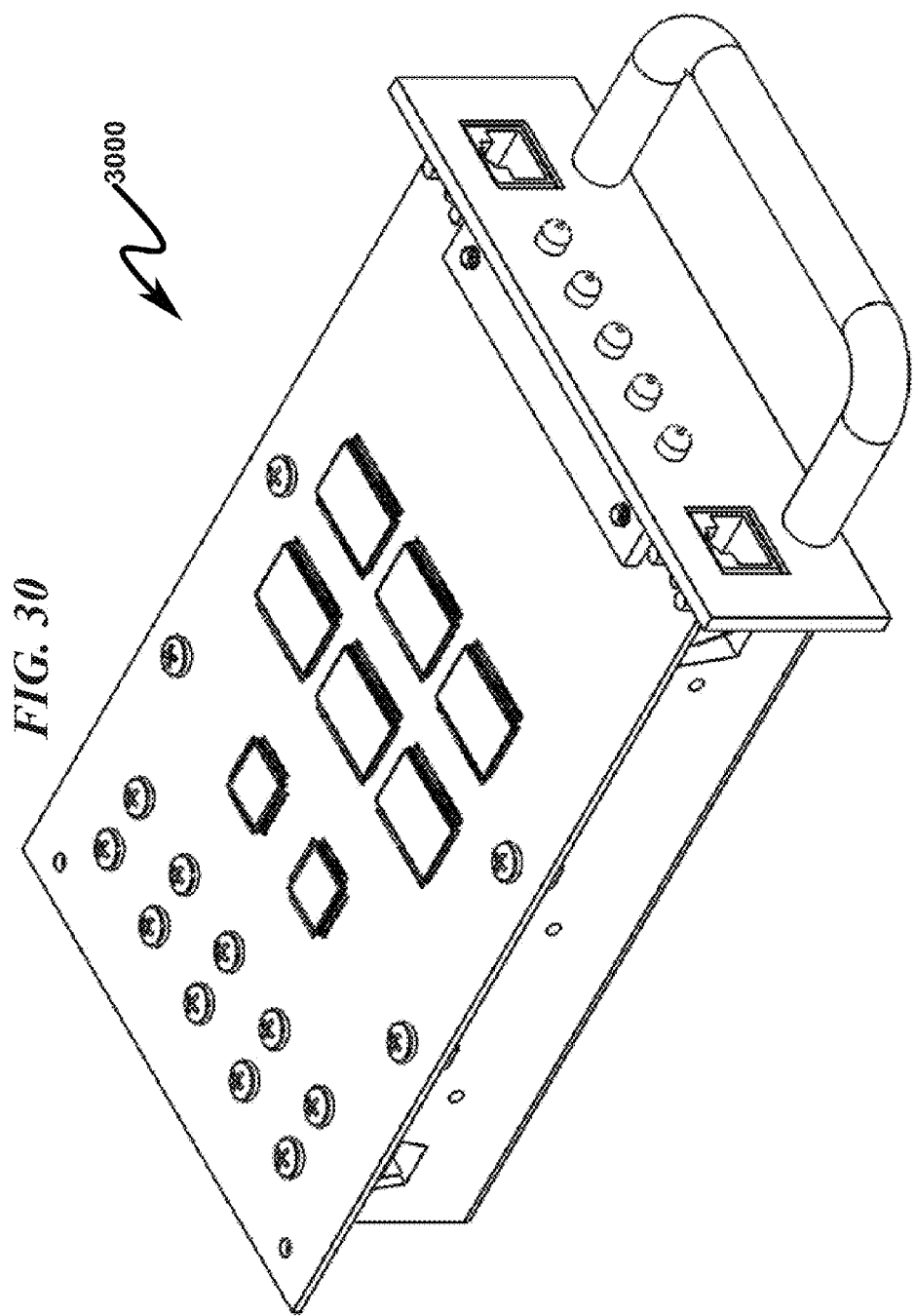
FIG. 30 illustrates a front top left detail perspective view of an exemplary present invention VSC blade.

Integration of the video streaming controller (VSC) comprising the invention system components described herein is depicted in the exemplary rack configuration of FIG. 25 (2500)-FIG. 48 (4800). Particular detail of typical construction for an individual VSC blade is depicted in FIG. 29 (2900)-FIG. 48 (4800). Note that the VSC blades are designed to simply plug into a passive rack backplane supplying power to the individual VSC blades. Individual power supplies (not shown) may be installed in the three empty slots in each rack. Note that in some circumstances a HCS may also be included in this configuration and support the VSC blades within the rack.

Rack Mount Integration (2500)-(2800)

Figure 28:
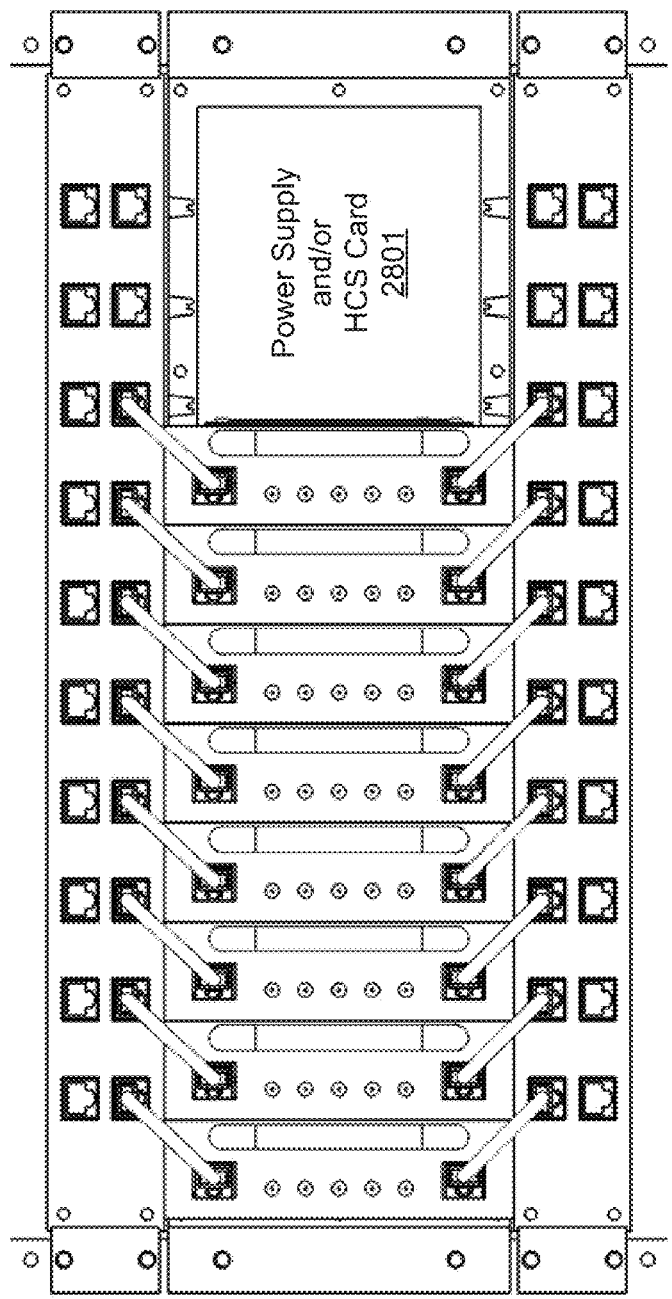
FIG. 28 illustrates a front view of an exemplary present invention VSC blade rack configuration with power supply removed.

The present invention is intended for rack mount integration as depicted in FIG. 25 (2500)-FIG. 28 (2800). Here it can be seen that a standard 19-inch rack may be configured with 8 VSC rack modules and Ethernet switches supporting separate data transfer to the ESB and data transfers from the ETE to the remote end-user MUD. The full VSC rack is depicted as (2501) and a detail of the individual VSC module configuration is depicted as (2502). The VSC rack modules are configured as a standard 5U rack form factor with the ESB/ETE Ethernet switches taking on a 1U rack form factor. In some circumstances there may be some additional sharing of the ETB Ethernet switches among VSC modules as communication on these units is light duty compared to that of the ETE switches.

Figure 26:
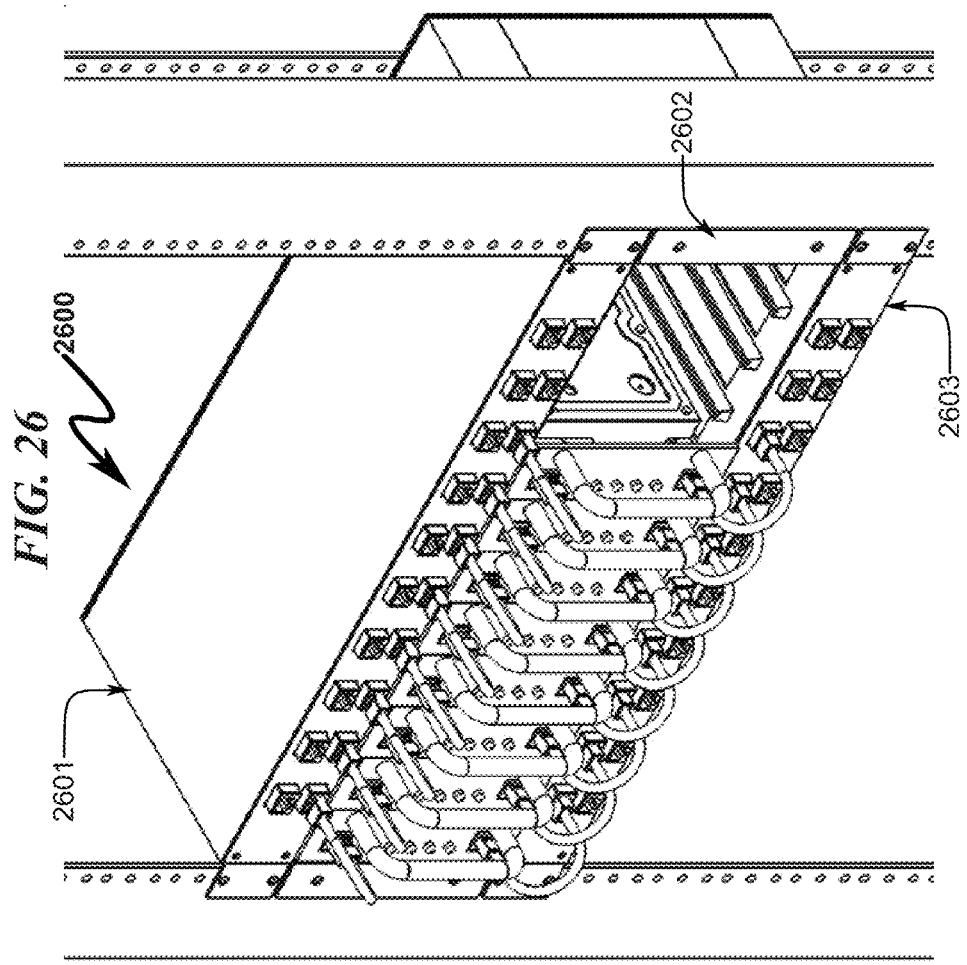
FIG. 26 illustrates a front top detail perspective view of an exemplary present invention VSC blade rack configuration.
Figure 27:
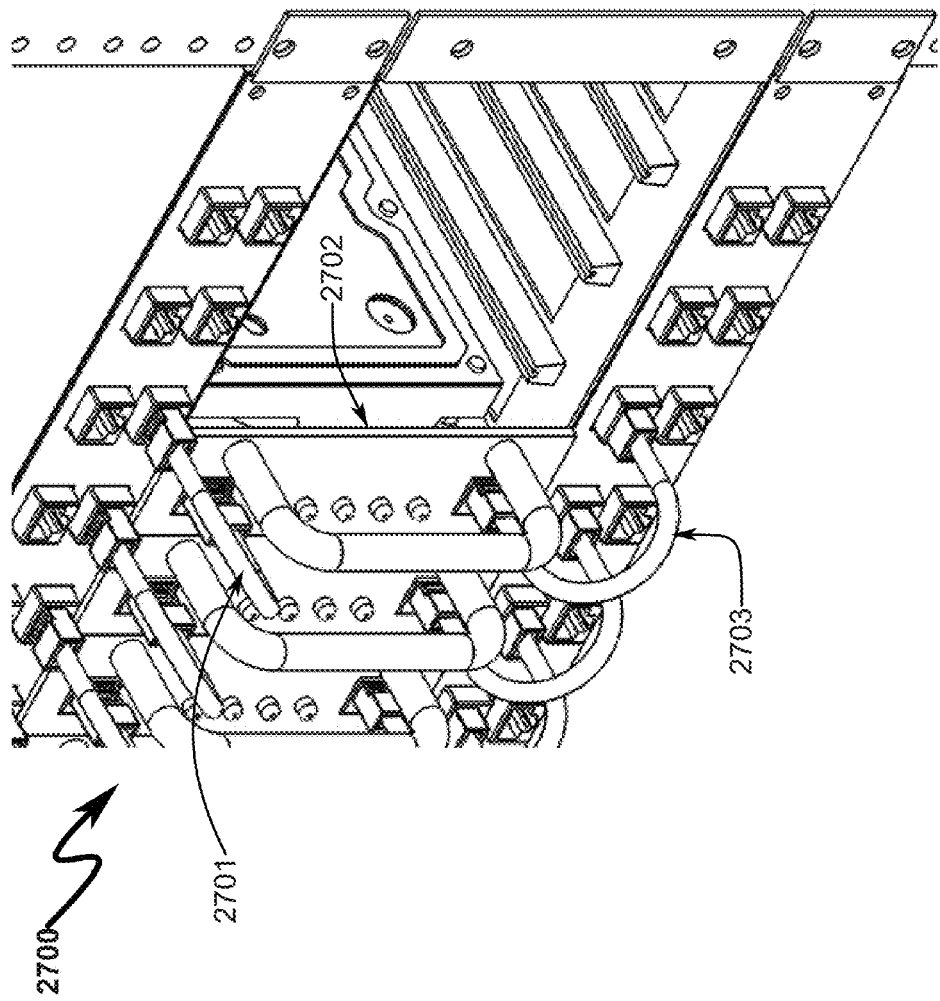
FIG. 27 illustrates a front top detail perspective view of an exemplary present invention VSC blade rack configuration with power supply removed.

Additional detail of the VSC module is depicted in FIG. 26 (2600)-FIG. 28 (2800). Referencing FIG. 26 (2600), the ESB Ethernet switch (2601) is connected to the VSC blades within the VSC module (2602) via standard RJ45 Ethernet patch cables. The VSC blades within the VSC module (2602) are also coupled to the ETE Ethernet switch (2602) via standard RJ45 Ethernet patch cables. Referencing FIG. 27 (2700), additional detail of the ESB patch cables (2701), the VSC blade (2702), and the ETE patch cables (2703) are visible. Referencing the front view of FIG. 28 (2800), provision is made in this design to support a power supply (not shown) that plugs into a reserved area (2801) of the VSC module. Note that this reserved area is approximately 4.5 inches (3×1.5) wide and has sufficient volume to support both a power supply to power the VSC module but also provide for a 1-slot HCS computing module. While the present invention is concentrated on the deployment of VMC apart from a HCS, the hardware as provisioned in this exemplary design does permit the incorporation of a HCS card within the VSC module to further integrate the system and improve efficiency and overall performance. By integrating the HCS within the VSC module a further distribution of incoming VMC requests from the end-users can be processed in a distributed fashion.

VSC Blade Detail (2900)-(4000)

Figure 40:
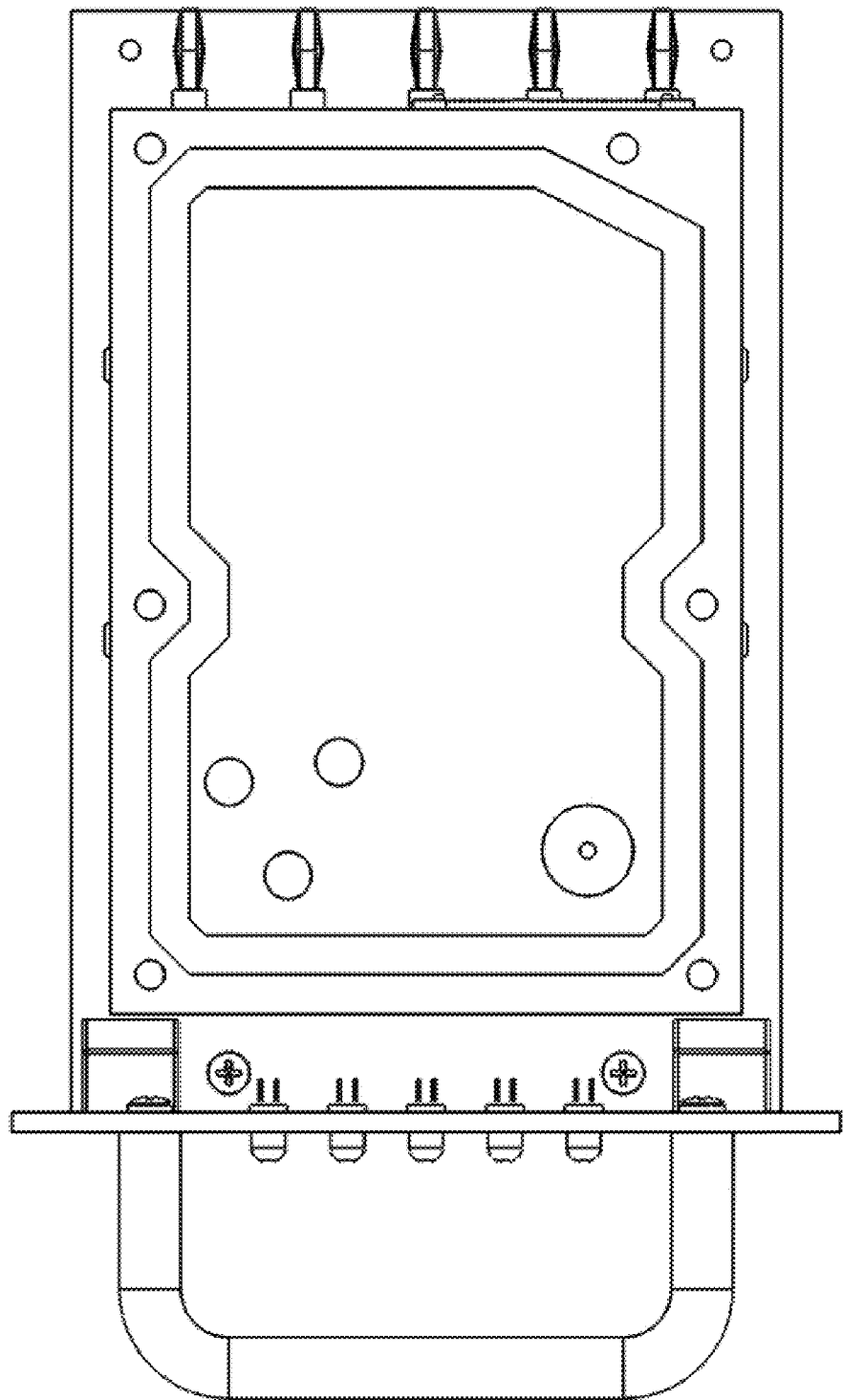
FIG. 40 illustrates a bottom view of an exemplary present invention VSC blade.

The VSC rack module described above is populated with individual VSC blades that are depicted in detail in FIG. 29 (2900)-FIG. 40 (4000). Referencing FIG. 29 (2900), the VSC blade comprises a printed circuit board (PCB) (2901) attached to a local storage media (LSM) (2902) (SATA drive or other storage platform). The PCB (2901) is attached to a faceplate (2903) that permits insertion/removal of the VSC blade into the VSC rack module with a handle (2904). RJ45 Ethernet jacks (2905, 2906) provide for ESB/ETE connections to network switches as previously described above.

Indicator lights (2907) provide status indicators for the operation of the VSC blade. Note that in some configurations there may be switches or other user input controls integrated with the faceplate to allow user control/configuration of the VSC blade.

Integrated circuits (2908, 2909) perform the hardware functions associated with HCS Ethernet PHY, ESB, SATA MUX, SQR, SFC, ETE, and CCN interface PHY. As stated previously, some of these hardware functions may be integrated into common FPGA logic or on a common application specific integrated circuit (ASIC).

Figure 31:
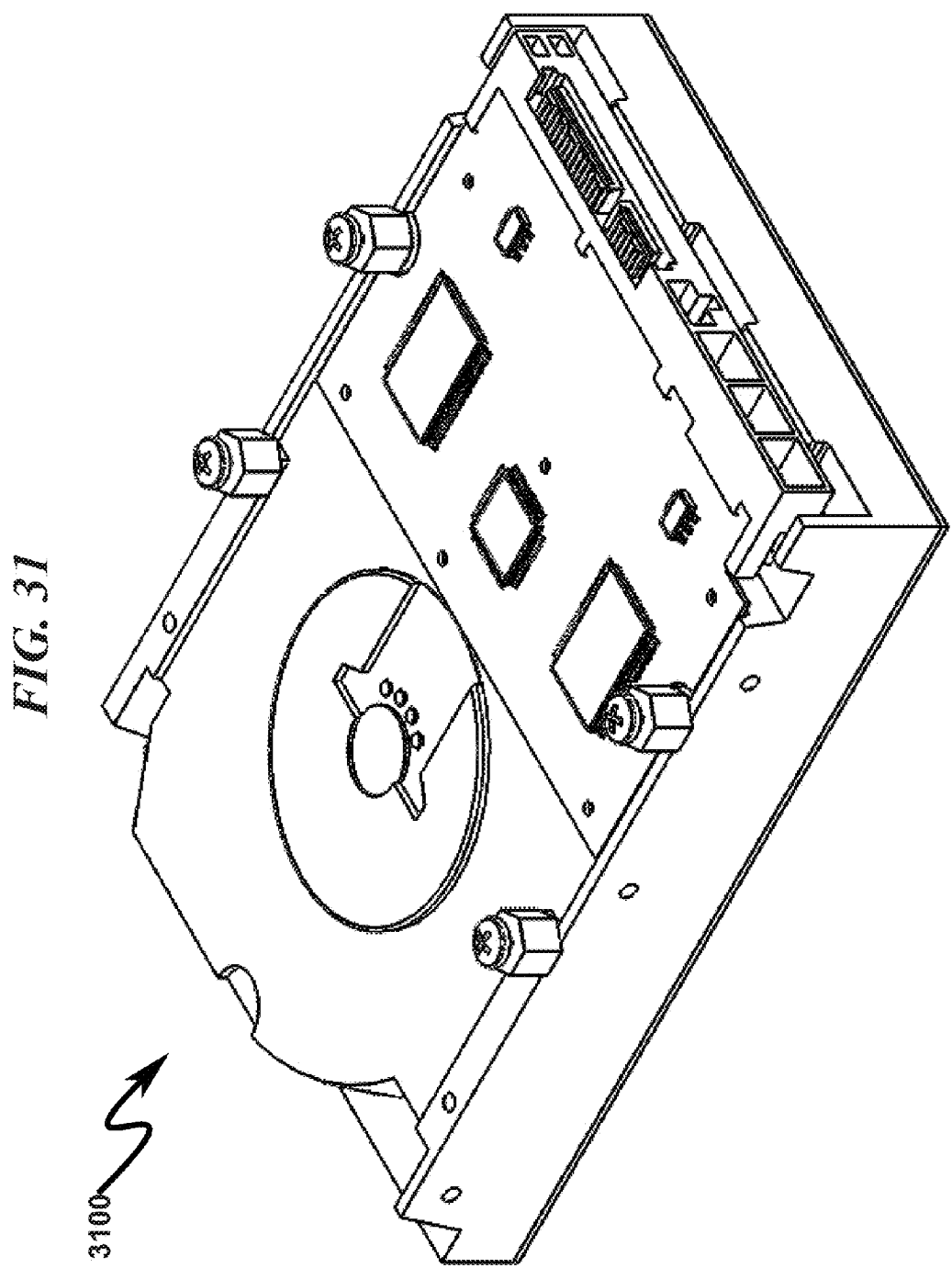
FIG. 31 illustrates a front top left detail perspective view of an exemplary present invention VSC blade isolating the bottom LSM SATA disk drive.
Figure 32:
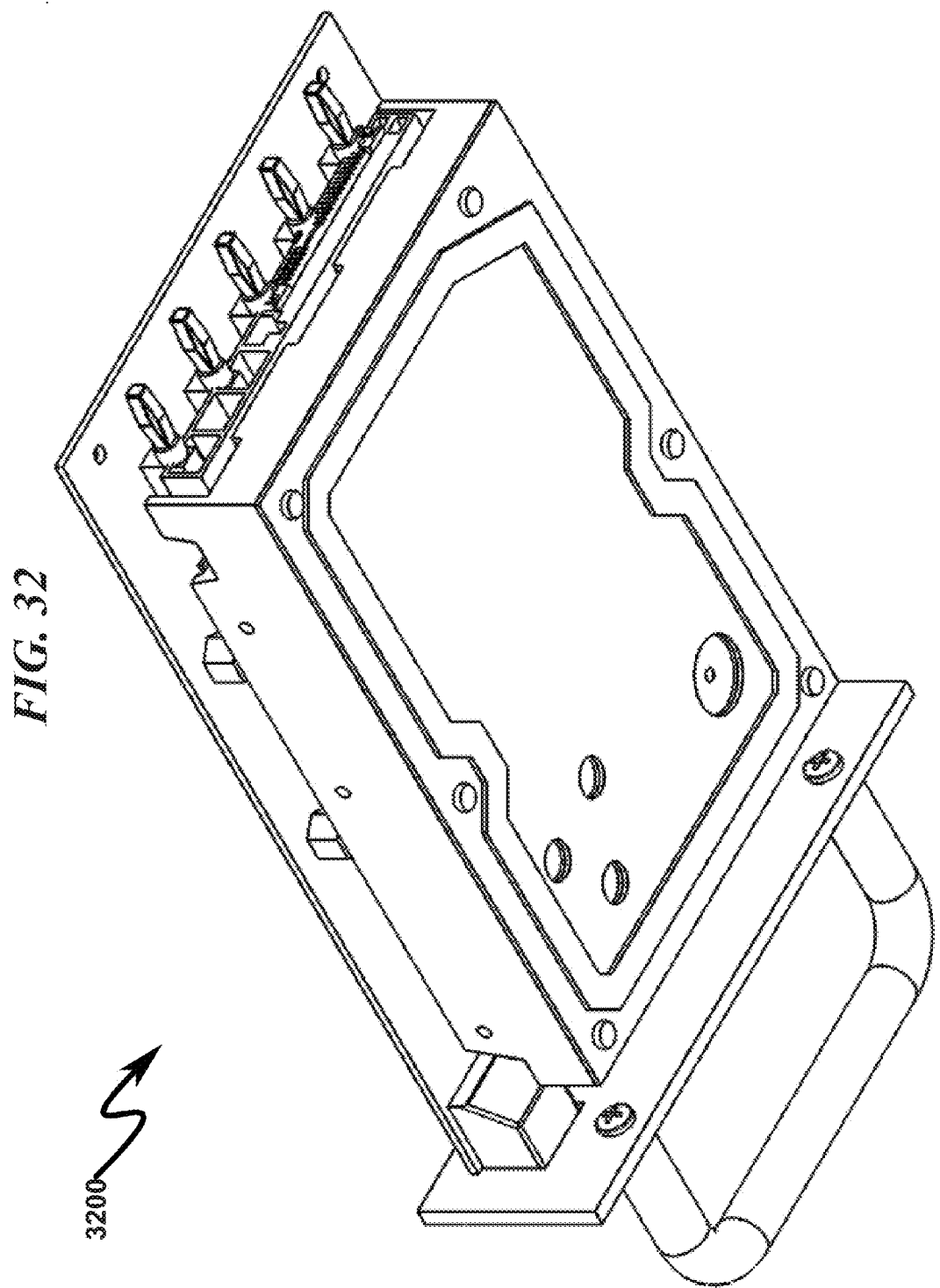
FIG. 32 illustrates a rear bottom right detail perspective view of an exemplary present invention VSC blade.
Figure 33:
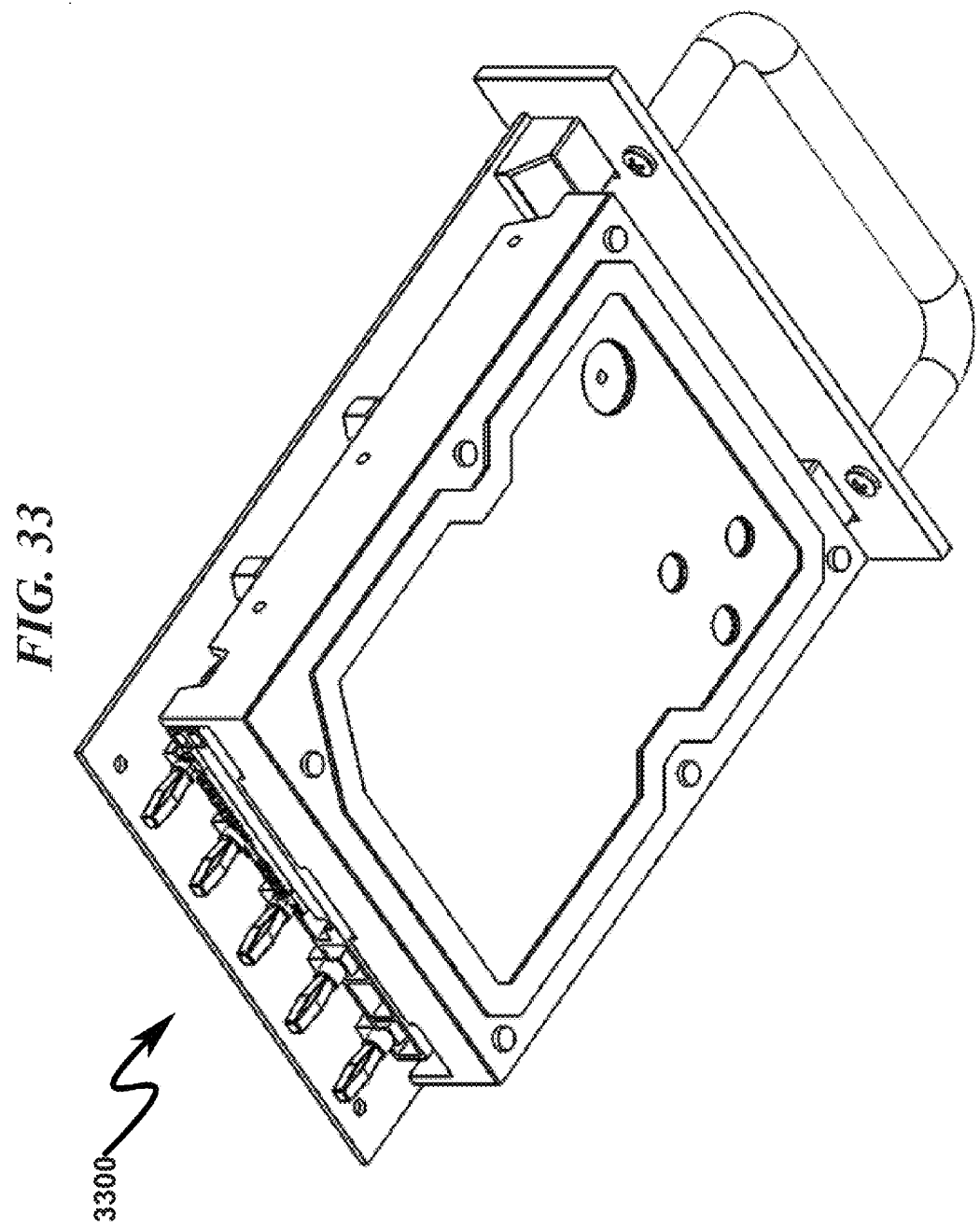
FIG. 33 illustrates a rear bottom left detail perspective view of an exemplary present invention VSC blade.

Referencing FIG. 31 (3100), the VSC blade is shown with only the SATA disk drive in isolation. As stated previously, the present invention may make use of conventional SATA hard drives or in some embodiments utilize SATA solid-state disk drive emulators or custom flash memory modules that do not incorporate a SATA interface but rather use a custom serial addressing interface to access the flash memory storage.

Figure 34:
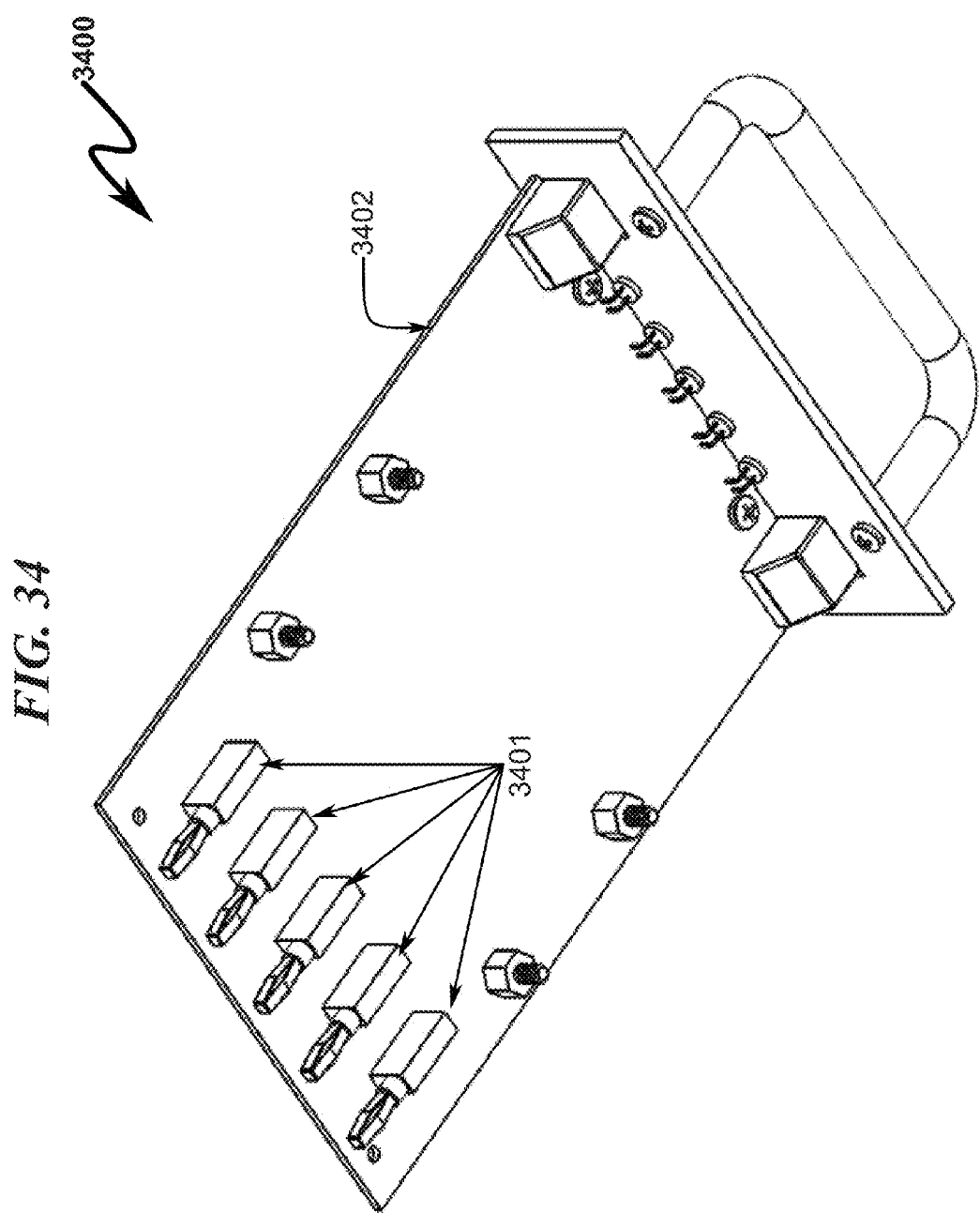
FIG. 34 illustrates a rear bottom left detail perspective view of an exemplary present invention VSC blade with LSM SATA disk drive removed.
Figure 35:
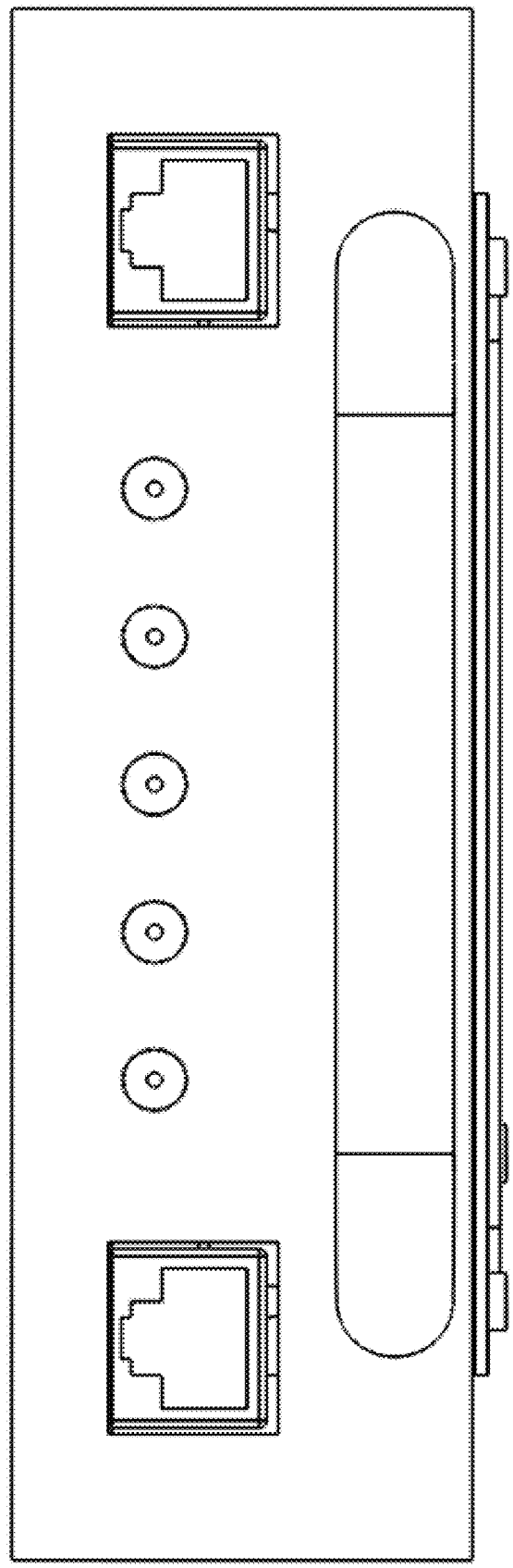
FIG. 35 illustrates a front bottom view of an exemplary present invention VSC blade.
Figure 37:
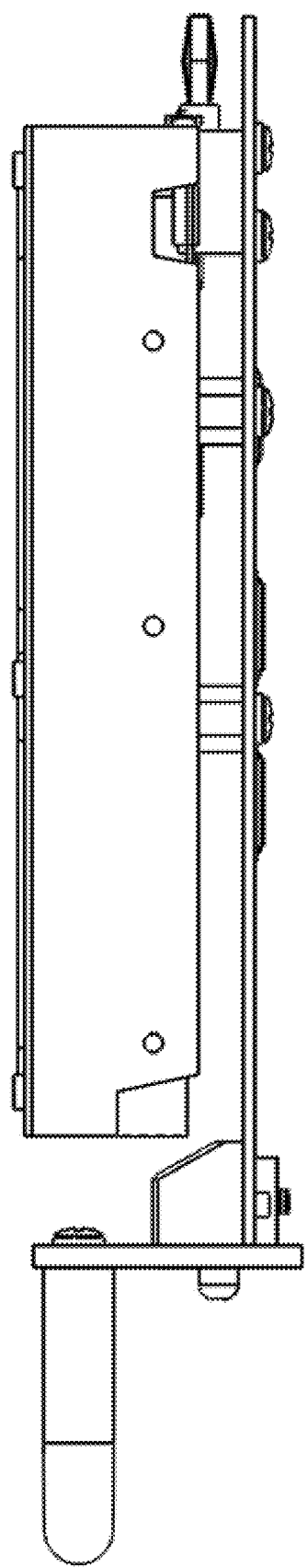
FIG. 37 illustrates a right side view of an exemplary present invention VSC blade.
Figure 38:
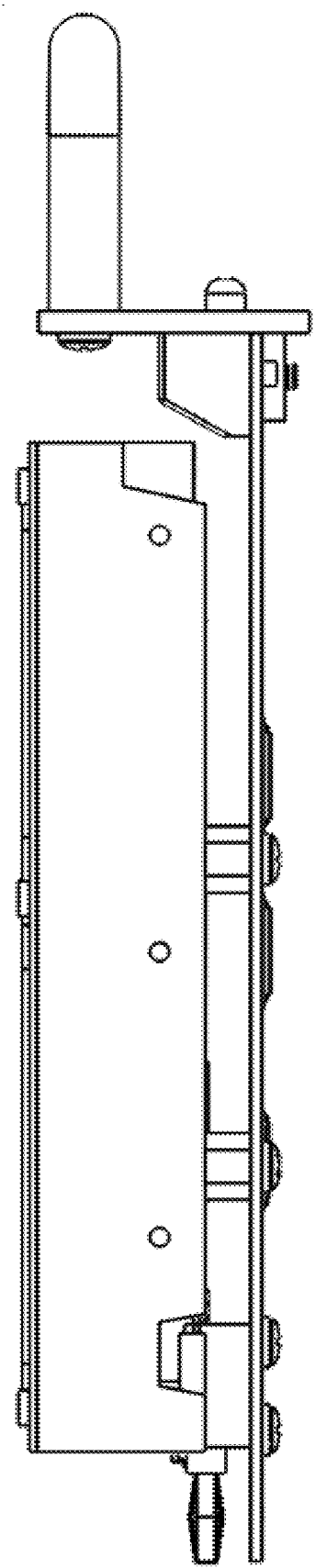
FIG. 38 illustrates a left side view of an exemplary present invention VSC blade.
Figure 39:
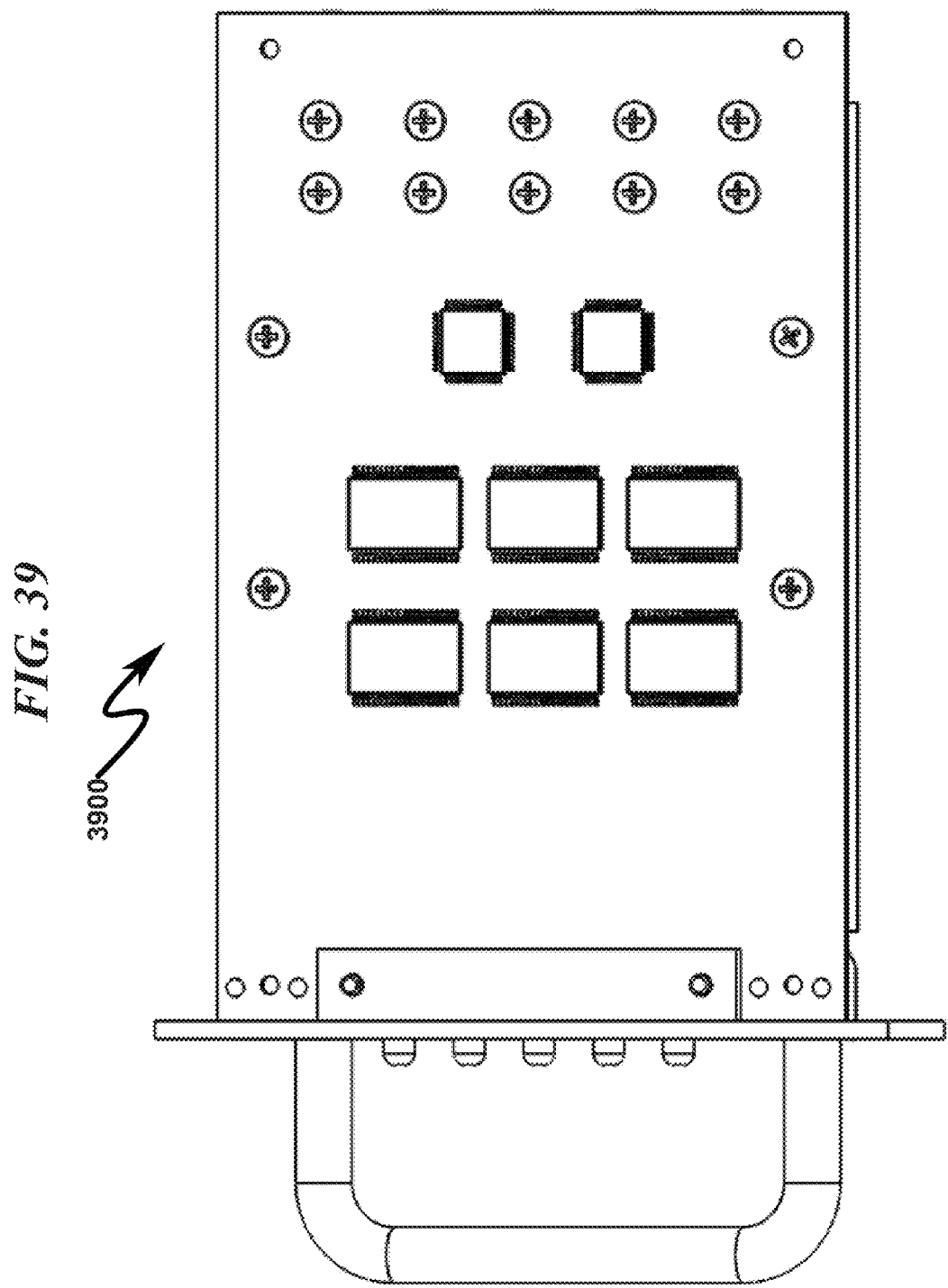
FIG. 39 illustrates a top view of an exemplary present invention VSC blade.

A common issue in integrating blades within a rack mount system involves power distribution and mechanical linkage to the backplane. FIG. 34 (3400) illustrates how these issues are addressed in the present invention. In this exemplary embodiment, right angle banana style plugs (3401) are bolted to the PCB (3402) and provide a positive mechanical interface with the VSC power distribution backplane. Generally speaking, the power requirements for the VSC blade will be +5 VDC and +12 VDC using this interface. Note that the banana plugs (3401) may be offset in some configurations to provide initial mating of GND connections (before the power connections) to provide for enhanced ESD protection of the module during insertion/removal. Additionally, GND traces on the perimeter of the PCB may be used to provide a positive GND contact with the rack prior to connection of electrical power to the PCB and attached LSM SATA disk drive.

VSC Blade Module Detail (4100)-(4800)

Figure 41:
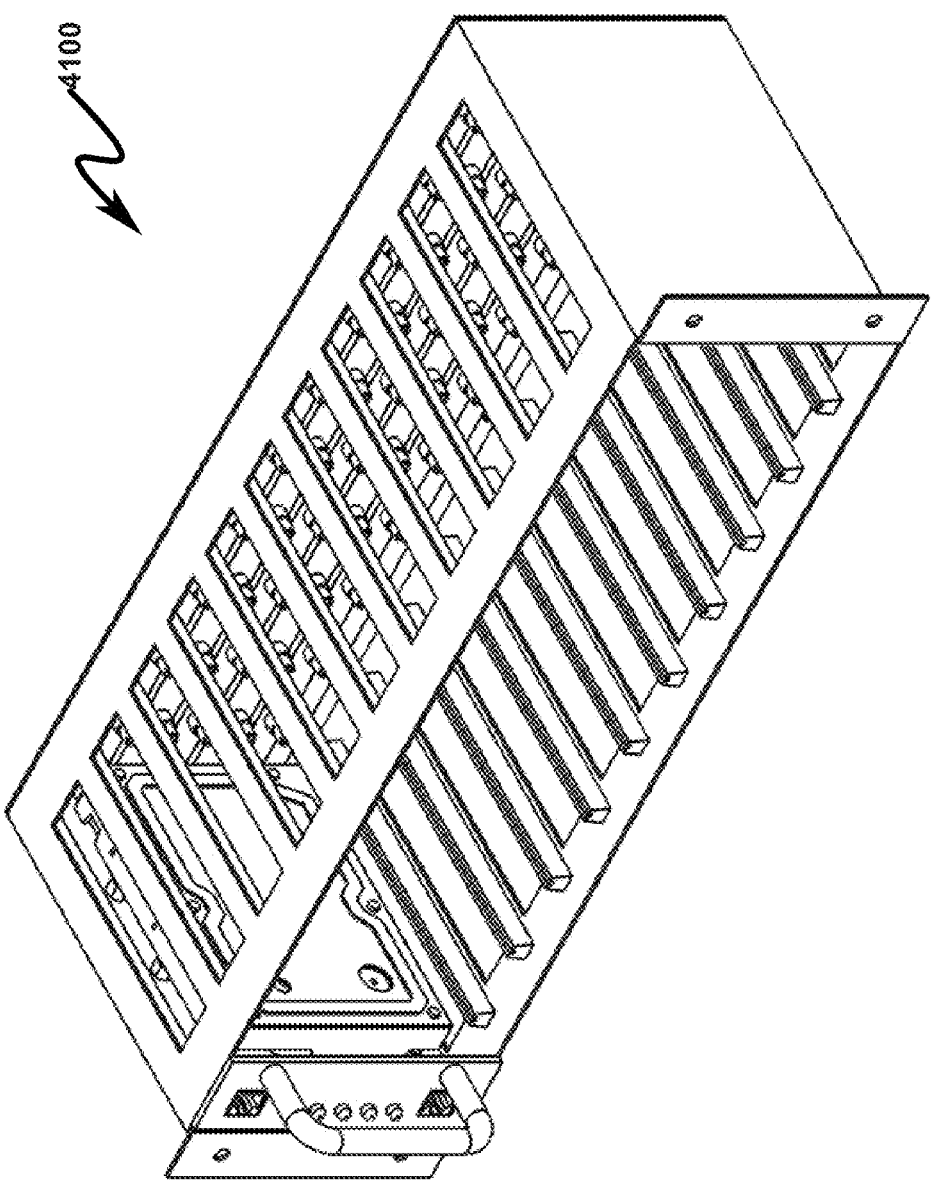
FIG. 41 illustrates a top right front perspective view of a VSC blade module with one VSC blade installed.
Figure 42:
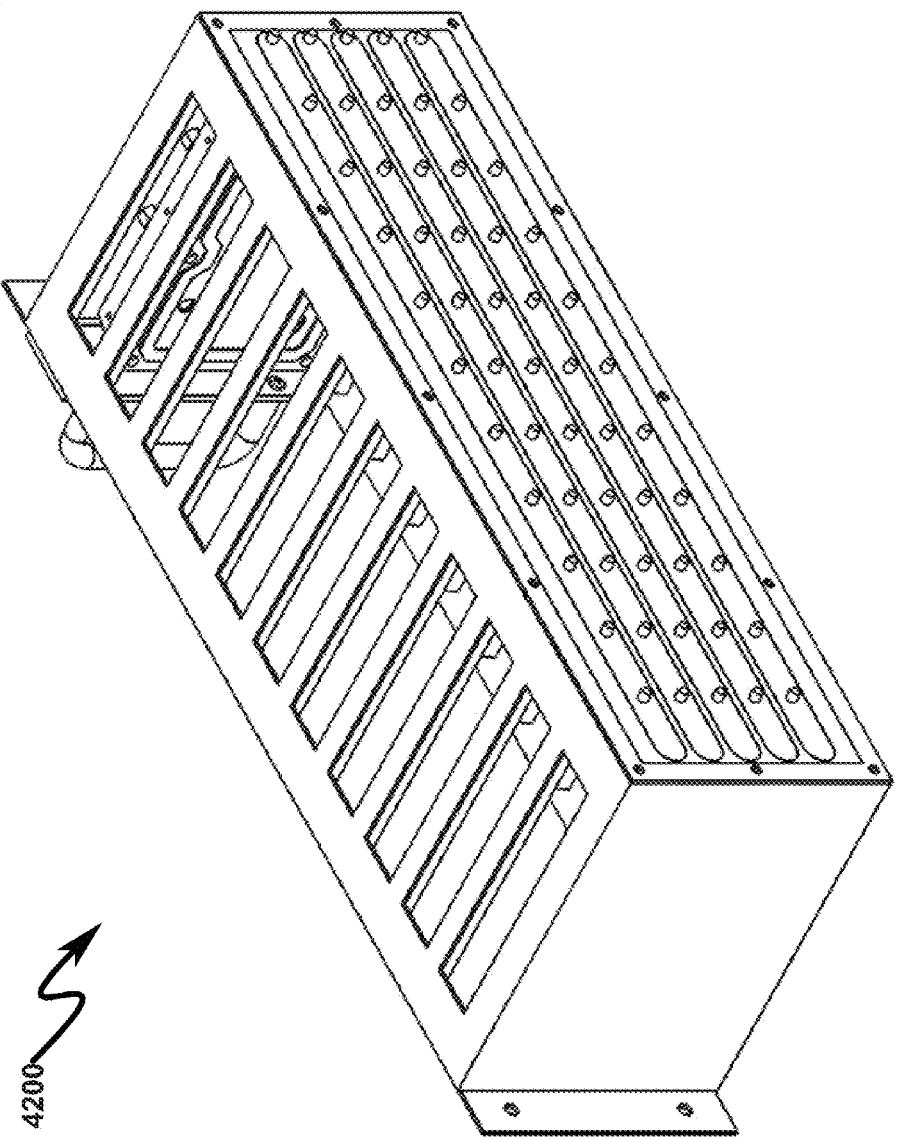
FIG. 42 illustrates a top right rear perspective view of a VSC blade module with one VSC blade installed.
Figure 43:
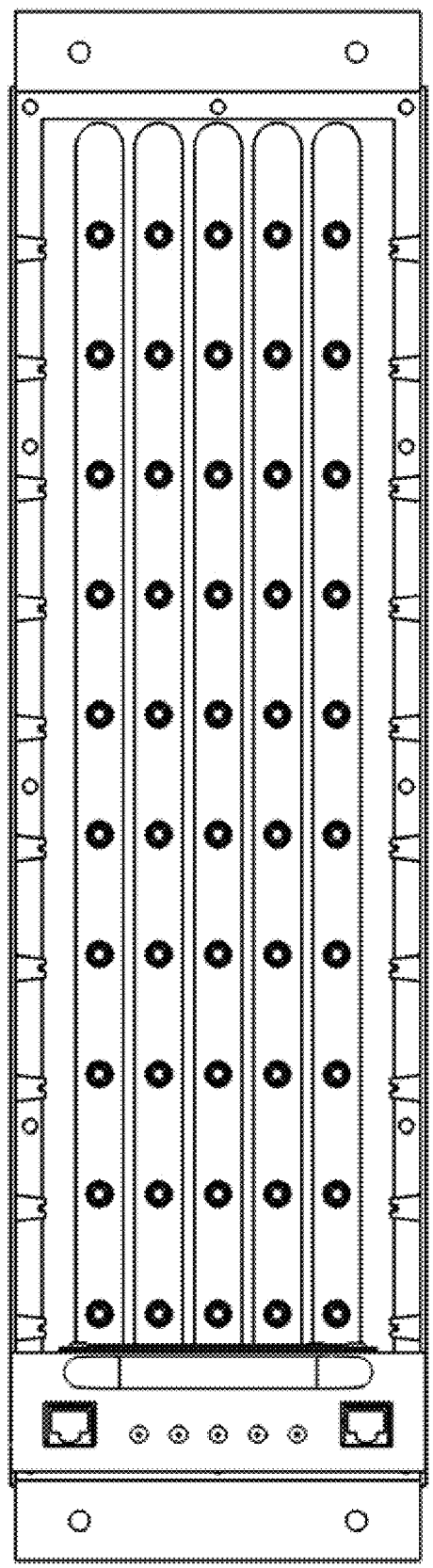
FIG. 43 illustrates a front view of a VSC blade module with one VSC blade installed.
Figure 44:
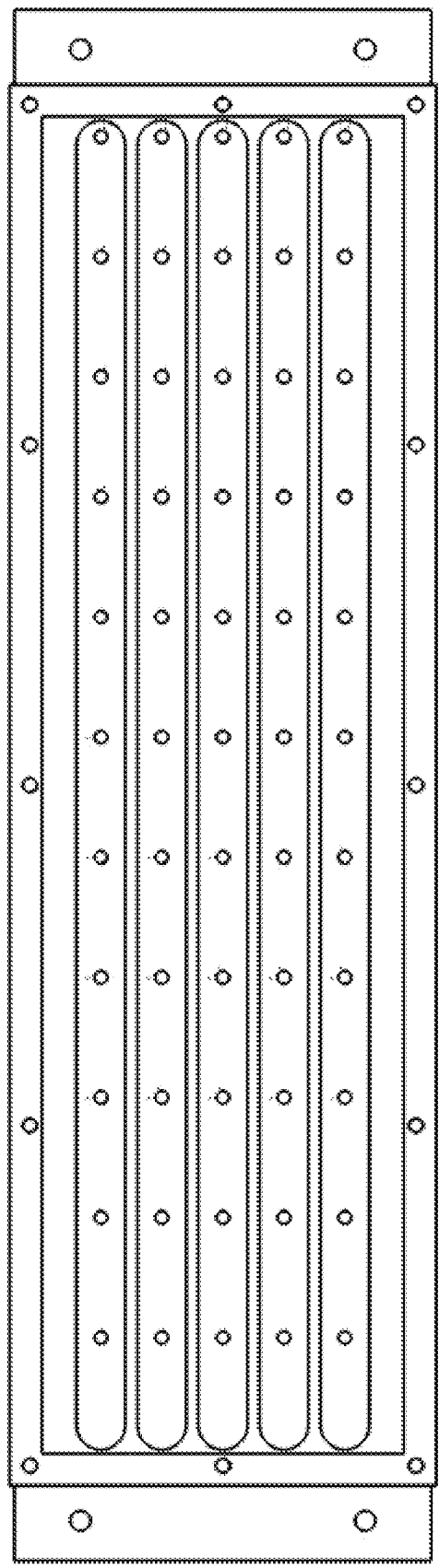
FIG. 44 illustrates a rear view of a VSC blade module with one VSC blade installed.
Figure 45:
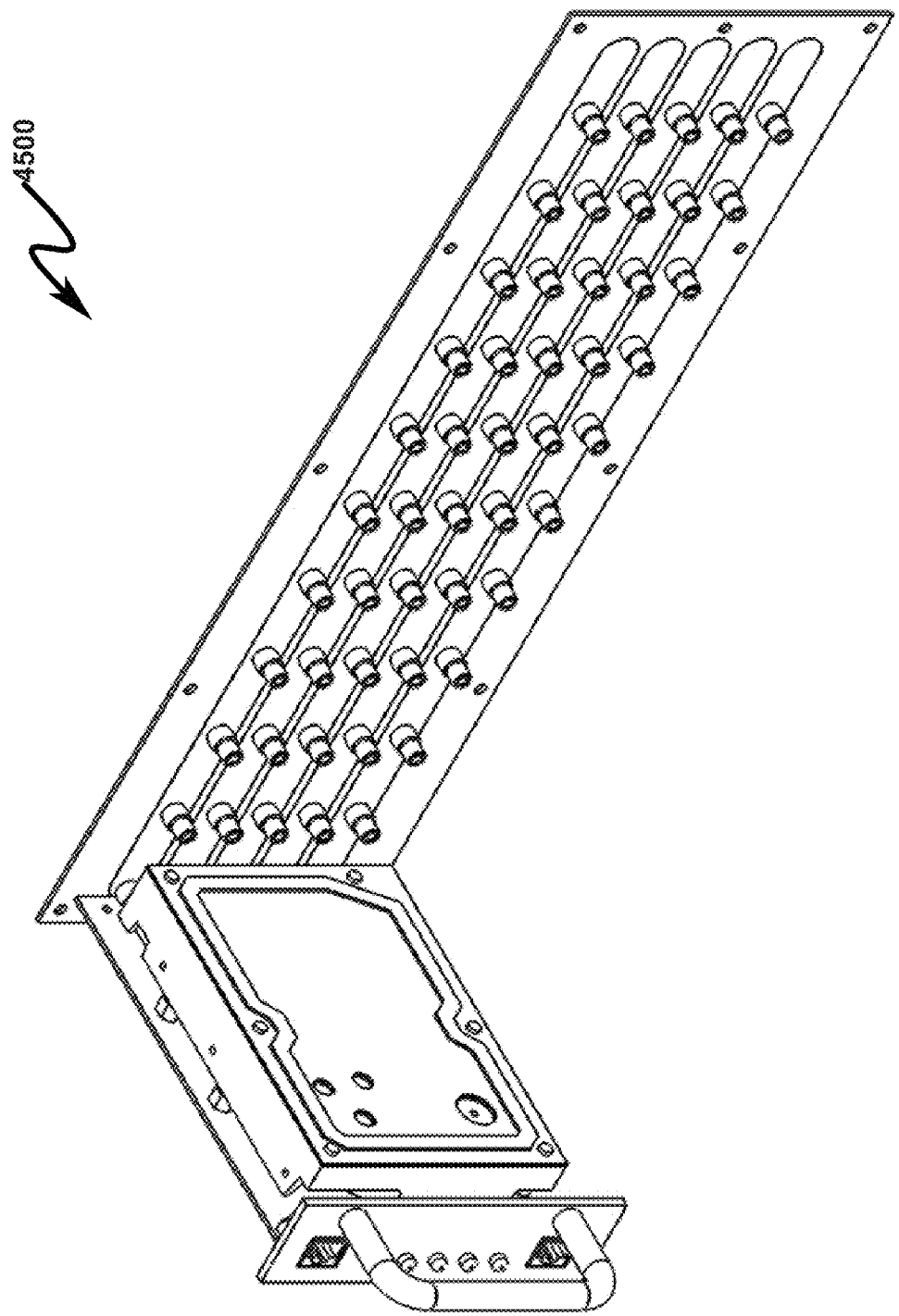
FIG. 45 illustrates a top right front perspective view of a VSC blade module with one VSC blade installed and rack cage suppressed.
Figure 46:
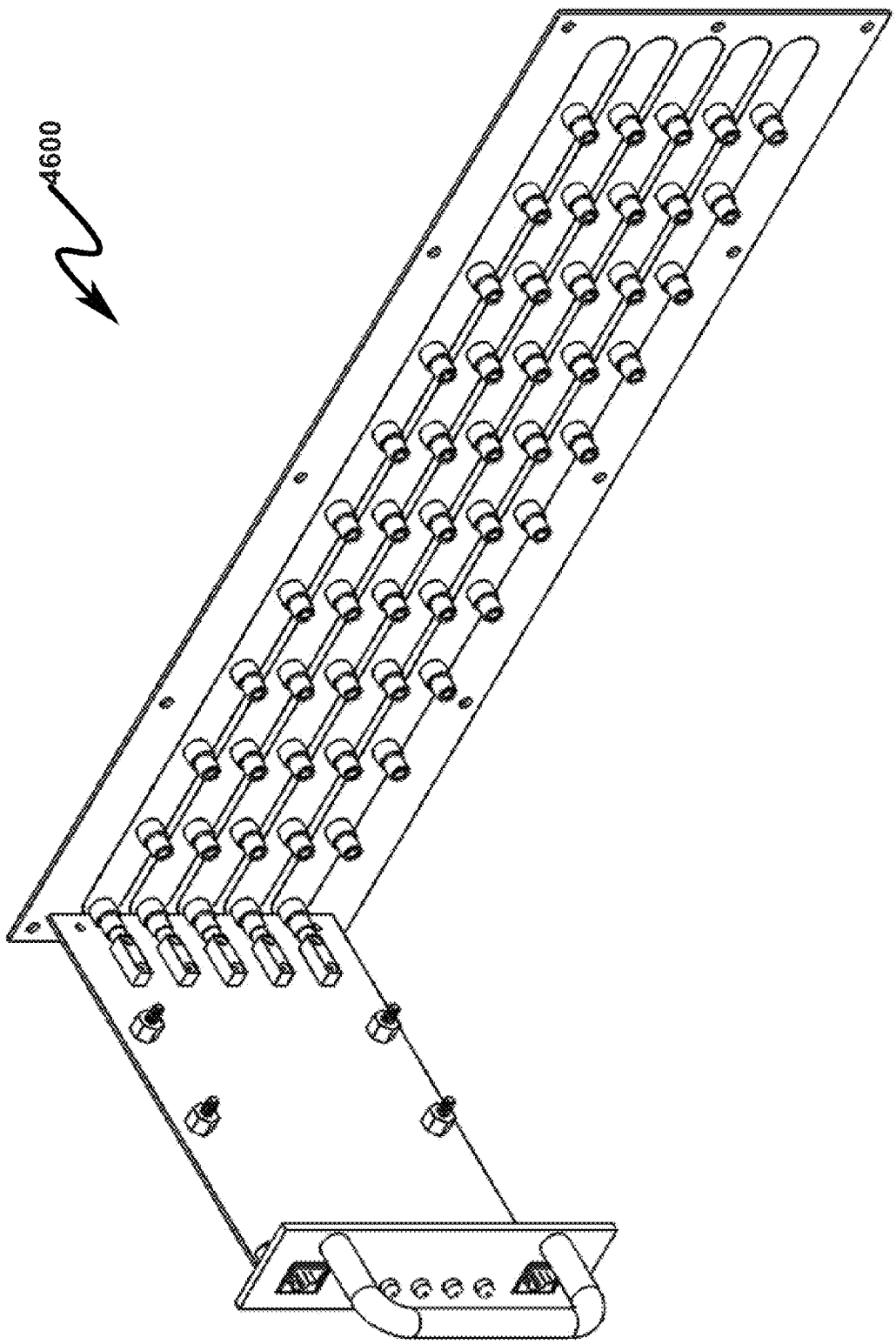
FIG. 46 illustrates a top right front perspective view of a VSC blade module with one VSC blade installed and rack cage and LSM suppressed.
Figure 47:
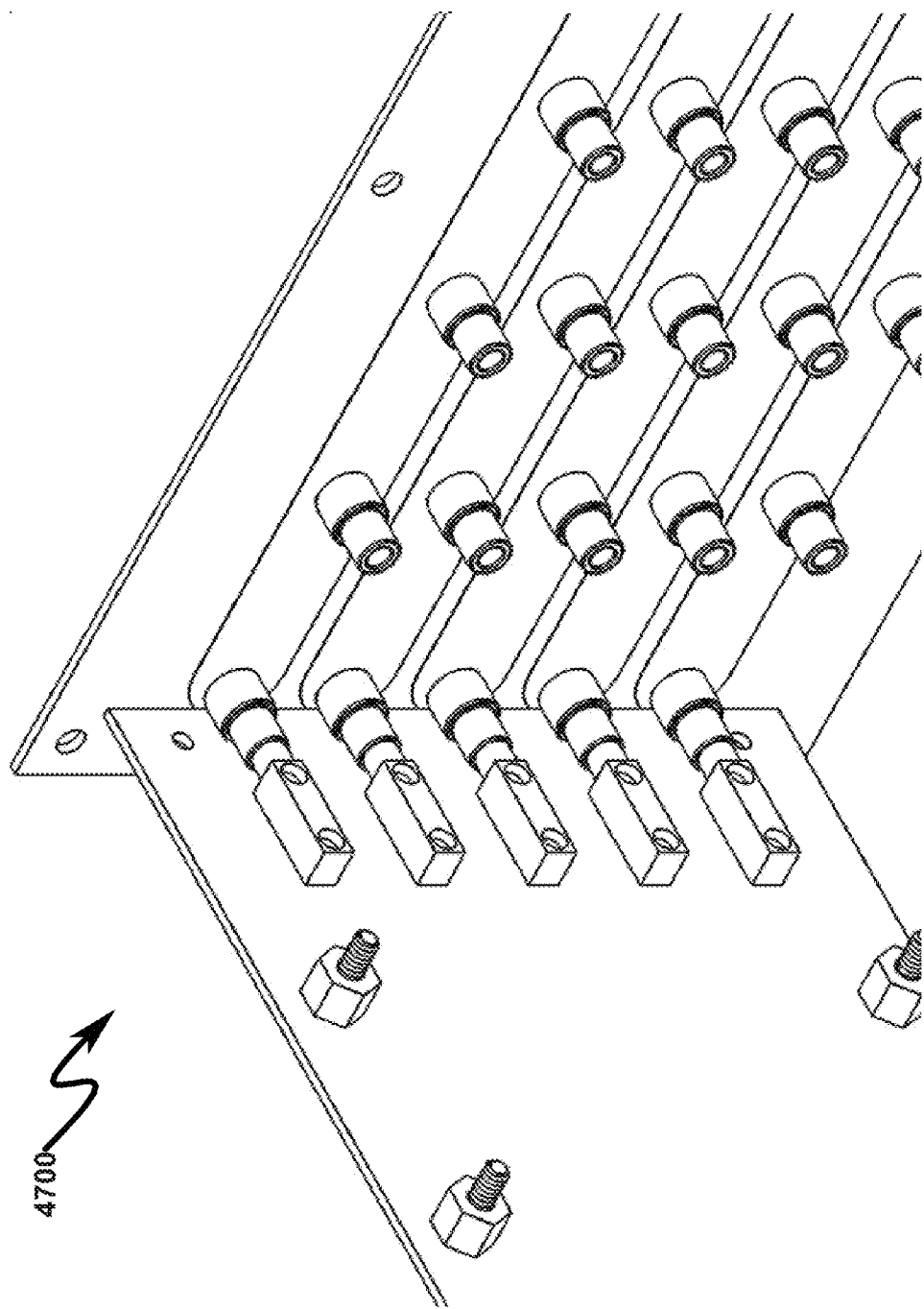
FIG. 47 illustrates a top right front perspective view of a VSC blade module with one VSC blade installed and rack cage and LSM suppressed illustrating power bus insertion detail.

Additional detail of the VSC blade module is depicted in FIG. 41 (4100)-FIG. 48 (4800). The rack module illustrated is a 5U rack unit with one VSC blade installed. Particular detail of the 5-lane power bus on the rack PCB backplane is provided along with insertion details of the VSC blade into the backplane as generally illustrated in FIG. 47 (4700) and FIG. 48 (4800). The high current capability of the banana jacks used in this configuration permits integration of the rack power supply in 1-3 of the reserved slots as previously discussed.

System Summary

The present invention system anticipates a wide variety of variations in the basic theme of construction, but can be generalized as a video streaming system comprising:
(a) first Ethernet PHY (FEP);
(b) Ethernet/SATA bridge (ESB);
(c) SATA MUX (MUX);
(d) local storage media (LSM);
(e) service queue register (SQR);
(f) streaming FIFO controller (SFC);
(g) Ethernet transport encoder (ETE);
(h) second Ethernet PHY (SEP); and (i) computer communication network (CCN);
wherein
the FEP is configured to receive video media content (VMC) over a first Ethernet communication channel (FEC) from a host computer system (HCS);
the FEP is configured to translate signals on the FEC to a first serial data stream (FDS);
the MUX is configured to provide dual port access to the LSM from the ESB via a first SATA port (FSP) to the MUX and the SFC from a second SATA port (SSP) to the MUX;
the ESB is configured to interpret the FDS as a SATA control protocol (SCP) and communicate SATA disk drive commands and data within the SCP to the LSM through the MUX;
the SCP comprises an Ethernet layer 1 protocol frame comprising Ethernet preamble, start-of-field delimiter (SOF), Ethernet target MAC address, Ethernet source MAC address, Ethernet type, ESB version identification, ESB command, ESB command parameter, ESB transfer request identifier, ESB subpacket identifier, ESB starting LBA, ESB byte offset, ESB LBA transfer count, ESB byte count, and transfer data payload;
the SQR comprises hardware registers configured to store a plurality of user service requests (USR), the USR comprising a target IP address, content LBA start address (CLS), content LBA length (CLL), and content LBA active (CLA) registers;
the TIA corresponds to an end-user mobile user device (MUD);
the CLS corresponds to a video media identifier (VMI) of VMC stored on the LMS;
the CLL corresponds to the length of a selected VMC stored on the LMS;
the CLA corresponds to an active display point within the USR;
the SFC is configured to sequence through the USR entries in the SQR and transfer a target Internet Protocol (IP) address (TIP) from the SQR to the ETE;
the SFC is configured to sequence through entries in the SQR and initiate a VMC data transfer (VDT) from the LSM through the SSP to the ETE;
the ETE is configured to serially transfer the target TIP and the VDT in an Ethernet layer 1 protocol frame to the SEP;
the Ethernet layer 1 protocol frame further comprises a TCP/IP payload;
the SEP is electrically coupled to the CCN; and
the CCN is electrically coupled to an end-user mobile user device (MUD) having an IP address corresponding to the TIP.

This general system summary may be augmented by the various elements described herein to produce a wide variety of invention embodiments consistent with this overall design description.

Method Summary

The present invention method anticipates a wide variety of variations in the basic theme of implementation, but can be generalized as a video streaming method comprising:
(1) capturing or collecting video media content (VMC) data with host computer system (HCS);
(2) sending the VMC data to a custom video streaming controller (VSC) blade Ethernet/SATA bridge (ESB) via a first Ethernet PHY (FEP) interface and writing the VMC data directly to a local storage media (LSM) in the VSC using a SATA MUX;
(3) writing a hardware service queue register (SQR) in the VSC with an end-user TCP/IP address and LSM media locator index (MLI) that describes VMC content stored on the LSM by the HCS;
(4) activating a hardware streaming FIFO controller (SFC) in the VFC that is responsible for transferring data via a secondary port of the SATA MUX from the LSM to an Ethernet transport encoder (ETE);
(5) selecting the next (or current) user entry in the SQR for data transport by the SFC;
(6) with the SFC, inspecting registers in the SQR for data to be sent to an end-user mobile user device (MUD) via the ETE;
(7) with the SFC, directly transferring data pointed to by the SQR registers from the LSM to the ETE and triggering an assembled Ethernet packet transmission to the MUD via a second Ethernet PHY interface (SEP);
(8) with the SFC, updating the SQR with a data transfer count of completed data transfer to the MUD;
(9) determining if MLI data to MUD is complete for all register entries in the SQR, and if not, proceeding to step (5); and
(10) notifying the HCS of completed streaming transfer to the MUD and proceeding to step (1).

This general method summary may be augmented by the various elements described herein to produce a wide variety of invention embodiments consistent with this overall design description.

System/Method Variations

The present invention anticipates a wide variety of variations in the basic theme of construction. The examples presented previously do not represent the entire scope of possible usages. They are meant to cite a few of the almost limitless possibilities.

This basic system and method may be augmented with a variety of ancillary embodiments, including but not limited to:

An embodiment wherein the TCP/IP payload consists of an IPv4 protocol payload.
An embodiment wherein the TCP/IP payload consists of an IPv6 protocol payload.
An embodiment wherein the FEP, the ESB, the MUX, the LSM, the SQR, the SFC, the ETE, and the SEP are contained within a single printed circuit board (PCB) configured for installation in a video media streaming (VMS) blade server rack.
An embodiment wherein the VMC comprises compressed video data image encoded with a compressed video communication (CVC) format selected from a group consisting of: MPEG; MPEG-2; MPEG-4; H.264; THEORA; WEBM; DIRAC; REALVIDEO; VP8; and HEVC.
An embodiment wherein the VMC comprises compressed audio/video data image encoded with a compressed video communication (CVC) format selected from a group consisting of: MPEG; MPEG-2; MPEG-4; H.264; THEORA; WEBM; DIRAC; REALVIDEO; VP8; and HEVC.
An embodiment wherein the SFC further comprises a FIFO memory configured to buffer the VDT from the LSM through the SSP to the ETE.

An embodiment wherein the SFC is configured to parallel load the contents of the SQR into the ETE based on an index counter used by the SFC to sequence through entries in the SQR.

An embodiment wherein the ETE is configured to transmit jumbo frames having payloads greater than 1500 octets to the SEP.

An embodiment wherein the SFC is configured to transmit Ethernet packet data to the ETE in real-time as the ETE generates an Ethernet layer 1 packet for transmission to the SEP.

One skilled in the art will recognize that other embodiments are possible based on combinations of elements taught within the above invention description.

Generalized Computer Usable Medium

In various alternate embodiments, the present invention may be implemented as a computer program product for use with a computerized computing system. Those skilled in the art will readily appreciate that programs defining the functions defined by the present invention can be written in any appropriate programming language and delivered to a computer in many forms, including but not limited to: (a) information permanently stored on non-writeable storage media (e.g., read-only memory devices such as ROMs or CD-ROM disks); (b) information alterably stored on writeable storage media (e.g., hard disks and USB thumb drives); and/or (c) information conveyed to a computer through communication media, such as a local area network, a telephone network, or a public network such as the Internet. When carrying computer readable instructions that implement the present invention methods, such computer readable media represent alternate embodiments of the present invention.

As generally illustrated herein, the present invention system embodiments can incorporate a variety of computer readable media that comprise computer usable medium having computer readable code means embodied therein. One skilled in the art will recognize that the software associated with the various processes described herein can be embodied in a wide variety of computer accessible media from which the software is loaded and activated. Pursuant to In re Beauregard, 35 USPQ2d 1383 (U.S. Pat. No. 5,710,578), the present invention anticipates and includes this type of computer readable media within the scope of the invention. Pursuant to In re Nuijten, 500 F. 3d 1346 (Fed. Cir. 2007) (U.S. patent application Ser. No. 09/211,928), the present invention scope is limited to computer readable media wherein the media is both tangible and non-transitory.

CONCLUSION

A system and method implementing simultaneous video streaming to multiple end-user mobile user devices (MUD) has been disclosed. The system/method utilizes an Ethernet/SATA bridge (ESB) to permit a host computer system (HCS) the ability to load video media content (VMC) on a local storage media (LSM) via a SATA multiplexer (MUX) using a hardware MAC-to-LBA transmission decoder (LTD). The HCS is configured to load a hardware service queue register (SQR) with end-user IP target address and VMC addressing information. A streaming FIFO controller (SFC) scans the SQR and retrieves data from the LSM via the SATA MUX and packetizes the IP target address and VMC data with an hardware Ethernet transport encoder (ETE) to transfer the VMC data stream directly from the LSM to the end-user MUD without HCS TCP/IP protocol intervention.

CLAIMS INTERPRETATION

The following rules apply when interpreting the CLAIMS of the present invention:

The CLAIM PREAMBLE should be considered as limiting the scope of the claimed invention.

"WHEREIN" clauses should be considered as limiting the scope of the claimed invention.

"WHEREBY" clauses should be considered as limiting the scope of the claimed invention.

"ADAPTED TO" clauses should be considered as limiting the scope of the claimed invention.

"ADAPTED FOR" clauses should be considered as limiting the scope of the claimed invention.

The term "MEANS" specifically invokes the means-plus-function claims limitation recited in 35 U.S.C. §112(f) and such claim shall be construed to cover the corresponding structure, material, or acts described in the specification and equivalents thereof.

The phrase "MEANS FOR" specifically invokes the means-plus-function claims limitation recited in 35 U.S.C. §112(f) and such claim shall be construed to cover the corresponding structure, material, or acts described in the specification and equivalents thereof.

The phrase "STEP FOR" specifically invokes the step-plus-function claims limitation recited in 35 U.S.C. §112(f) and such claim shall be construed to cover the corresponding structure, material, or acts described in the specification and equivalents thereof.

The phrase "AND/OR" in the context of an expression "X and/or Y" should be interpreted to define the set of "(X and Y)" in union with the set "(X or Y)" as interpreted by Ex Parte Gross (USPTO Patent Trial and Appeal Board, Appeal 2011-004811, Ser. No. 11/565,411, ("'and/or' covers embodiments having element A alone, B alone, or elements A and B taken together").

The claims presented herein are to be interpreted in light of the specification and drawings presented herein with sufficiently narrow scope such as to not preempt any abstract idea.

The claims presented herein are to be interpreted in light of the specification and drawings presented herein with sufficiently narrow scope such as to not preclude every application of any idea.

The claims presented herein are to be interpreted in light of the specification and drawings presented herein with sufficiently narrow scope such as to preclude any basic mental process that could be performed entirely in the human mind.

The claims presented herein are to be interpreted in light of the specification and drawings presented herein with sufficiently narrow scope such as to preclude any process that could be performed entirely by human manual effort.

What is claimed is:

1. A video streaming system comprising:
(a) first Ethernet PHY (FEP);
(b) Ethernet/SATA bridge (ESB);
(c) SATA MUX (MUX);
(d) local storage media (LSM);
(e) service queue register (SQR);
(f) streaming FIFO controller (SFC);
(g) Ethernet transport encoder (ETE);
(h) second Ethernet PHY (SEP); and (i) computer communication network (CCN);
wherein
said FEP is configured to receive video media content (VMC) over a first Ethernet communication channel (FEC) from a host computer system (HCS);
said FEP is configured to translate signals on said FEC to a first serial data stream (FDS);
said MUX is configured to provide dual port access to said LSM from said ESB via a first SATA port (FSP) to said MUX and said SFC from a second SATA port (SSP) to said MUX;
said ESB is configured to interpret said FDS as a SATA control protocol (SCP) and communicate SATA disk drive commands and data within said SCP to said LSM through said MUX;
said SCP comprises an Ethernet layer 1 protocol frame comprising Ethernet preamble, start-of-field delimiter (SOF), Ethernet target MAC address, Ethernet source MAC address, Ethernet type, ESB version identification, ESB command, ESB command parameter, ESB transfer request identifier, ESB subpacket identifier, ESB starting LBA, ESB byte offset, ESB LBA transfer count, ESB byte count, and transfer data payload;
said SQR comprises hardware registers configured to store a plurality of user service requests (USR), said USR comprising a target IP address, content LBA start address (CLS), content LBA length (CLL), and content LBA active (CLA) registers;
said TIA corresponds to an end-user mobile user device (MUD);
said CLS corresponds to a video media identifier (VMI) of VMC stored on said LMS;
said CLL corresponds to the length of a selected VMC stored on said LMS;
said CLA corresponds to an active display point within said USR;
said SFC is configured to sequence through said USR entries in said SQR and transfer a target Internet Protocol (IP) address (TIP) from said SQR to said ETE;
said SFC is configured to sequence through entries in said SQR and initiate a VMC data transfer (VDT) from said LSM through said SSP to said ETE;
said ETE is configured to serially transfer said target TIP and said VDT in an Ethernet layer 1 protocol frame to said SEP;
said Ethernet layer 1 protocol frame further comprises a TCP/IP payload;
said SEP is electrically coupled to said CCN; and
said CCN is electrically coupled to an end-user mobile user device (MUD) having an IP address corresponding to said TIP.

2. The video streaming system of claim 1 wherein said TCP/IP payload consists of an IPv4 protocol payload.

3. The video streaming system of claim 1 wherein said TCP/IP payload consists of an IPv6 protocol payload.

4. The video streaming system of claim 1 wherein said FEP, said ESB, said MUX, said LSM, said SQR, said SFC, said ETE, and said SEP are contained within a single printed circuit board (PCB) configured for installation in a video media streaming (VMS) blade server rack.

5. The video streaming system of claim 1 wherein said VMC comprises compressed video data image encoded with a compressed video communication (CVC) format selected from a group consisting of: MPEG; MPEG-2; MPEG-4; H.264; THEORA; WEBM; DIRAC; REALVIDEO; VP8; and HEVC.

6. The video streaming system of claim 1 wherein said VMC comprises compressed audio/video data image encoded with a compressed video communication (CVC) format selected from a group consisting of: MPEG; MPEG-2; MPEG-4; H.264; THEORA; WEBM; DIRAC; REALVIDEO; VP8; and HEVC.

7. The video streaming system of claim 1 wherein said SFC further comprises a FIFO memory configured to buffer said VDT from said LSM through said SSP to said ETE.

8. The video streaming system of claim 1 wherein said SFC is configured to parallel load the contents of said SQR into said ETE based on an index counter used by said SFC to sequence through entries in said SQR.

9. The video streaming system of claim 1 wherein said ETE is configured to transmit jumbo frames having payloads greater than 1500 octets to said SEP.

10. The video streaming system of claim 1 wherein said SFC is configured to transmit Ethernet packet data to said ETE in real-time as said ETE generates an Ethernet layer 1 packet for transmission to said SEP.

* * * * *